United States Patent
Hashimoto et al.

(10) Patent No.: US 8,458,432 B2
(45) Date of Patent: Jun. 4, 2013

(54) COMPUTER SYSTEM, STORAGE SYSTEM AND METHOD FOR CONTROLLING POWER SUPPLY BASED ON LOGICAL PARTITION

(75) Inventors: Akiyoshi Hashimoto, Kawasaki (JP); Shuji Nakamura, Machida (JP); Kazuhisa Fujimoto, Koganei (JP)

(73) Assignee: Hitachi, Ltd., Tokyo (JP)

( * ) Notice: Subject to any disclaimer, the term of this patent is extended or adjusted under 35 U.S.C. 154(b) by 1063 days.

(21) Appl. No.: 11/622,271

(22) Filed: Jan. 11, 2007

(65) Prior Publication Data

US 2008/0098194 A1   Apr. 24, 2008

(30) Foreign Application Priority Data

Oct. 18, 2006   (JP) .................................. 2006-283571

(51) Int. Cl.
*G06F 13/12* (2006.01)
(52) U.S. Cl.
USPC ................... 711/173; 711/154; 711/E12.084
(58) Field of Classification Search
USPC ................................................. 711/173, 154
See application file for complete search history.

(56) References Cited

U.S. PATENT DOCUMENTS

| | | | |
|---|---|---|---|
| 7,093,035 B2 | 8/2006 | Hashimoto | |
| 2004/0107273 A1 | 6/2004 | Biran et al. | |
| 2004/0111596 A1* | 6/2004 | Rawson, III | 713/1 |
| 2005/0018663 A1* | 1/2005 | Dropps et al. | 370/360 |
| 2005/0060590 A1 | 3/2005 | Bradley et al. | |
| 2005/0091453 A1 | 4/2005 | Shimada et al. | |
| 2005/0144383 A1 | 6/2005 | Higaki et al. | |
| 2005/0160221 A1 | 7/2005 | Yamazaki et al. | |
| 2005/0172040 A1* | 8/2005 | Hashimoto | 710/1 |
| 2005/0246499 A1* | 11/2005 | Saida et al. | 711/128 |
| 2005/0283679 A1* | 12/2005 | Heller et al. | 714/39 |
| 2006/0057967 A1 | 3/2006 | Shimada | |
| 2006/0174087 A1 | 8/2006 | Hashimoto | |
| 2007/0079088 A1* | 4/2007 | Deguchi et al. | 711/162 |

FOREIGN PATENT DOCUMENTS

| | | |
|---|---|---|
| GB | 2419703 A | 5/2006 |
| JP | 09282057 | 10/1997 |
| JP | 11202988 | 7/1999 |
| JP | 2004192612 | 7/2004 |
| JP | 2005190036 | 7/2005 |

(Continued)

OTHER PUBLICATIONS

U.S. Appl. No. 11/251,213, filed Oct. 2005, Hashimoto.
European Search Report for corresponding European Patent Application No. 07 25 2262, dated Sep. 23, 2011.

(Continued)

*Primary Examiner* — Kenneth Lo
(74) *Attorney, Agent, or Firm* — Brundidge & Stanger, P.C.

(57) ABSTRACT

Provided is a computer system, in which a storage system includes a first control module for logically dividing first resources of the storage system and operating them as independent virtual storage systems. A computer includes a second control module for logically dividing second resources of the computer and operating them as independent virtual machines. The computer system holds first information indicating a correlation among the virtual machine, the virtual storage system, and the first resources. The first control module specifies the first resource allocated to the virtual storage system whose power is cut based on the first information, and powers off the specified first resource. Thus, system power consumption can be reduced by managing power of the storage system shared by a plurality of virtual machines in a virtualization environment.

14 Claims, 57 Drawing Sheets

FOREIGN PATENT DOCUMENTS

| | | |
|---|---|---|
| JP | 2005222123 | 8/2005 |
| JP | 2005228288 | 8/2005 |
| JP | 2006085503 | 3/2006 |
| JP | 2006508445 | 3/2006 |
| JP | 2006172355 | 6/2006 |

OTHER PUBLICATIONS

Office Action mailed Jun. 7, 2011, issued in corresponding Japanese Patent Application No. 2006-238571 with English language concise explanation.

* cited by examiner

POWER SUPPLY SYSTEM DIAGRAM OF SERVER SYSTEMS (0) AND (1)

POWER SUPPLY SYSTEM DIAGRAM OF STORAGE SYSTEM

POWER SUPPLY SYSTEM DIAGRAM OF CHANNEL BOARDS (0) AND (1)

POWER SUPPLY SYSTEM DIAGRAM OF DISK BOARDS (0) AND (1)

| VIRTUAL MACHINE NUMBER (701) | CPU UTILIZATION RATE (702) | MEMORY CAPACITY (703) | VIRTUAL I/O ADAPTOR NUMBER (704) | I/O ADAPTOR NUMBER (705) |
|---|---|---|---|---|
| 0 | 20% | 512MB | 0 | 0 |
| | | | 1 | 1 |
| 1 | 30% | 128MB | 2 | 0 |
| | | | 3 | 1 |
| ⋮ | ⋮ | ⋮ | ⋮ | ⋮ |

SERVER RESOURCES CONTROL TABLE

FIG. 7

| VIRTUAL MACHINE NUMBER (801) | VIRTUAL STORAGE NUMBER (802) | LOGICAL UNIT NUMBER (803) | VIRTUAL DISK NUMBER (804) |
|---|---|---|---|
| 0 | 0 | 0 | 121 |
| | | 1 | 122 |
| | | 2 | 123 |
| 1 | 1 | 3 | 16 |
| | | 4 | 17 |
| | | 5 | 18 |
| ⋮ | ⋮ | ⋮ | ⋮ |

VIRTUAL DISK CONTROL TABLE

FIG. 8

| | 901 | 902 | 903 | 904 |
|---|---|---|---|---|
| | VIRTUAL DISK NUMBER | VIRTUAL BLOCK ADDRESS | PHYSICAL DISK NUMBER | PHYSICAL BLOCK ADDRESS |
| | 121 | 0x00000000 | 8 | 0x00000000 |
| | | 0x80000000 | 9 | 0x00000000 |
| | 122 | 0x00000000 | 10 | 0x00000000 |
| | 123 | 0x00000000 | 11 | 0x00000000 |
| | 16 | 0x00000000 | 11 | 0x10000000 |
| | ⋮ | ⋮ | ⋮ | ⋮ |

DISK ADDRESS TRANSLATION TABLE

*FIG. 9*

| VIRTUAL MACHINE NUMBER 1001 | VIRTUAL STORAGE SYSTEM NUMBER 1002 | VIRTUAL DISK NUMBER 1003 | DISK CACHE CAPACITY 1004 | CPU IN CHARGE 1005 | INTERNAL BANDWIDTH 1006 | VIRTUAL CHANNEL ADAPTOR 1007 | CHANNEL ADAPTOR 1008 | I/O ADAPTOR 1009 | VIRTUAL I/O ADAPTOR 1010 |
|---|---|---|---|---|---|---|---|---|---|
| 0 | 0 | 121<br>122<br>123 | 4GB | 4<br>6<br>8<br>10 | 20% | 0<br>1 | 0<br>2 | 0<br>1 | 0<br>1 |
| 1 | 1 | 16<br>17<br>18 | 1GB | 5<br>7<br>9<br>11 | 20% | 2<br>3 | 0<br>2 | 0<br>1 | 2<br>3 |
| 2 | 2 | 121<br>122<br>123 | 2GB | 4<br>6<br>8<br>10 | 20% | 4<br>5 | 1<br>3 | 2<br>3 | 4<br>5 |
| 3 | 3 | 401<br>402<br>403 | 8GB | 5<br>7<br>9<br>11 | 20% | 6<br>7 | 1<br>3 | 2<br>3 | 6<br>7 |
| ... | ... | ... | ... | ... | ... | ... | ... | ... | ... |

STORAGE RESOURCES CONTROL TABLE

*FIG. 10*

| 1101 | 1102 | 1103 | 1104 |
|---|---|---|---|
| RESOURCE CLASSIFICATION | RESOURCE | POWER STATE | USED VIRTUAL MACHINE NUMBER |
| P | CPU(0) | FULL ON | 0,1 |
| P | CPU(1) | FULL ON | 0,1 |
| P | I/O ADAPTOR (0) | FULL ON | 0,1 |
| P | I/O ADAPTOR (1) | FULL ON | 0,1 |
| ⋮ | ⋮ | ⋮ | |
| V | VIRTUAL MACHINE (0) | FULL ON | N/A |
| V | VIRTUAL MACHINE (1) | FULL ON | N/A |
| V | VIRTUAL I/O ADAPTOR (0) | FULL ON | N/A |
| ⋮ | ⋮ | ⋮ | ⋮ |

P : PHYSICAL RESOURCE
V : VIRTUAL RESOURCE

SERVER POWER CONTROL TABLE

*FIG. 11*

| 1201 | 1202 | 1203 | 1204 |
|---|---|---|---|
| RESOURCE CLASSIFICATION | RESOURCE | POWER STATE | USED VIRTUAL STORAGE SYSTEM NUMBER |
| P | CPU(4) | FULL ON | 0,2 |
| ⋮ | ⋮ | ⋮ | ⋮ |
| P | CHANNEL ADAPTOR (0) | FULL ON | 0,2 |
| ⋮ | ⋮ | ⋮ | ⋮ |
| P | I/O ADAPTOR (4) | FULL ON | 0,1,2,3 |
| P | I/O ADAPTOR (5) | FULL ON | 0,1,2,3 |
| P | PHYSICAL DISK (0) | FULL ON | 0 |
| ⋮ | ⋮ | ⋮ | ⋮ |
| P | DISK CACHE (0) | FULL ON | 0,1,2,3 |
| P | DISK CACHE (1) | FULL ON | 0,1,2,3 |
| ⋮ | ⋮ | ⋮ | ⋮ |
| V | VIRTUAL STORAGE SYSTEM (0) | FULL ON | N/A |
| V | VIRTUAL CHANNEL ADAPTOR (0) | FULL ON | N/A |
| ⋮ | ⋮ | ⋮ | N/A |

P : PHYSICAL RESOURCE
V : VIRTUAL RESOURCE

STORAGE POWER CONTROL TABLE

FIG. 12

FLOW OF RESOURCE ALLOCATION SETTINGS

PROCESSING FLOW AT TIME OF CABLE CONNECTION

POWER SUPPLY SYSTEM DIAGRAM OF CHANNEL BOARDS (0) AND (1)

BOOT FLOW OF VIRTUAL MACHINE

FLOW OF RESOURCE ALLOCATION SETTINGS

STOP FLOW OF VIRTUAL MACHINE

POWER SUPPLY SYSTEM DIAGRAM OF I/O CHANNEL SWITCH

ROUTING TABLE

| | 0 | 1 | ... | n |
|---|---|---|---|---|
| 0 | | ○ | | × |
| 1 | ○ | | | ○ |
| ⋮ | | | | |
| n-1 | × | × | | × |
| n | × | ○ | | |

OUTPUT PORT NUMBER (top), INPUT PORT NUMBER (left), 2802, 2801

FIG. 28

| 1001 VIRTUAL MACHINE NUMBER | 1002 VIRTUAL STORAGE SYSTEM NUMBER | 1003 VIRTUAL DISK NUMBER | 1004 DISK CACHE CAPACITY | 1005 CPU IN CHARGE | 1006 INTERNAL BAND-WIDTH | 1007 VIRTUAL CHANNEL ADAPTOR | 1008 CHANNEL ADAPTOR | 2901 STORAGE PORT | 2902 SERVER PORT | 1009 I/O ADAPTOR | 1010 VIRTUAL I/O ADAPTOR |
|---|---|---|---|---|---|---|---|---|---|---|---|
| 0 | 0 | 121<br>122<br>123 | 4GB | 4<br>6<br>8<br>10 | 20% | 0 | 0 | 10 | 2 | 0 | 0 |
| 1 | 1 | 16<br>17<br>18 | 1GB | 5<br>7<br>9<br>11 | 20% | 1 | 2 | 8 | 5 | 1 | 1 |
|  |  |  |  |  |  | 2 | 0 | 10 | 2 | 0 | 2 |
|  |  |  |  |  |  | 3 | 2 | 8 | 5 | 1 | 3 |
| 2 | 2 | 121<br>122<br>123 | 2GB | 4<br>6<br>8<br>10 | 20% | 4 | 1 | 3 | 1 | 2 | 4 |
|  |  |  |  |  |  | 5 | 3 | 9 | 6 | 3 | 5 |
| 3 | 3 | 401<br>402<br>403 | 8GB | 5<br>7<br>9<br>11 | 20% | 6 | 1 | 3 | 1 | 2 | 6 |
|  |  |  |  |  |  | 7 | 3 | 9 | 6 | 3 | 7 |
| ••• | ••• | ••• | ••• | ••• | ••• | ••• | ••• | ••• | ••• | ••• | ••• |

STORAGE RESOURCES CONTROL TABLE

FIG. 29

BOOT FLOW OF VIRTUAL MACHINE

PROCESSING FLOW AT TIME OF CABLE CONNECTION

| 701 | 702 | 703 | 704 | 705 | 3501 | 3502 |
|---|---|---|---|---|---|---|
| VIRTUAL MACHINE NUMBER | CPU UTILIZATION RATE | MEMORY CAPACITY | VIRTUAL I/O ADAPTOR NUMBER | I/O ADAPTOR NUMBER | VIRTUAL LAN ADAPTOR NUMBER | LAN ADAPTOR NUMBER |
| 0 | 20% | 512MB | 0 | 0 | 0 | 0 |
| | | | 1 | 1 | 1 | 1 |
| 1 | 30% | 128MB | 2 | 0 | 2 | 0 |
| | | | 3 | 1 | 3 | 1 |
| ⋮ | ⋮ | ⋮ | ⋮ | ⋮ | ⋮ | ⋮ |

SERVER RESOURCES CONTROL TABLE

STOP FLOW OF VIRTUAL MACHINE

| 4101 | 4102 |
|---|---|
| VIRTUAL MACHINE NUMBER | POWER SAVING PRIORITY MODE |
| 0 | ON |
| 1 | OFF |
| ⋮ | ⋮ |

SERVER SYSTEM POWER SAVING MODE TABLE

FIG. 41

| 4201 | 4202 |
|---|---|
| VIRTUAL STORAGE SYSTEM NUMBER | POWER SAVING PRIORITY MODE |
| 0 | ON |
| 1 | OFF |
| ⋮ | ⋮ |

STORAGE SYSTEM POWER SAVING MODE TABLE

FIG. 42

VIRTUAL MACHINE (1)

VIRTUAL MACHINE (0)
DETAILED DISK SETTING

| | |
|---|---|
| CPU | 3 CPU'S |
| DISK CACHE | 2GB |
| INTERNAL BANDWIDTH | 20% |
| DISK | 3 DISKS |
| POWER SAVING PRIORITY MODE | ON |

*FIG. 43*

| VIRTUAL MACHINE NUMBER | VIRTUAL STORAGE NUMBER | LOGICAL UNIT NUMBER | VIRTUAL DISK NUMBER | PAIR STATE | SECONDARY VIRTUAL STORAGE NUMBER | SECONDARY VIRTUAL DISK NUMBER |
|---|---|---|---|---|---|---|
| 0 | 0 | 0 | 121 | 0 | N/A | N/A |
|   |   | 1 | 122 | 0 | N/A | N/A |
|   |   | 2 | 123 | 0 | N/A | N/A |
| 1 | 1 | 3 | 16 | 1 | 1' | 16' |
|   |   | 4 | 17 | 1 | 1' | 17' |
|   |   | 5 | 18 | 1 | 1' | 18' |
| ⋮ | ⋮ | ⋮ | ⋮ | ⋮ | ⋮ | ⋮ |

VIRTUAL DISK CONTROL TABLE

0: NO PAIR
1: PAIR STATE (PRIMARY)
2: PAIR STATE (SECONDARY)

| VIRTUAL STORAGE SYSTEM NUMBER 5001 | VIRTUAL DISK NUMBER 901 | VIRTUAL BLOCK ADDRESS 902 | PHYSICAL DISK NUMBER 903 | PHYSICAL BLOCK ADDRESS 904 | EXTERNAL DISK FLAG 5002 |
|---|---|---|---|---|---|
| n | 121 | 0x00000000 | 8 | 0x00000000 | 0 |
|  |  | 0x80000000 | 9 | 0x00000000 | 0 |
|  | 122 | 0x00000000 | 10 | 0x00000000 | 0 |
|  | 300 | 0x00000000 | 500 | 0x00000000 | 1 |
|  | 301 | 0x00000000 | 501 | 0x00000000 | 1 |
| ⋮ | ⋮ | ⋮ | ⋮ | ⋮ | ⋮ |

DISK ADDRESS TRANSLATION TABLE

EXTERNAL DISK FLAG:
0: BUILT-IN DISK
1: EXTERNAL DISK

FIG. 50

| VIRTUAL MACHINE NUMBER 1001 | VIRTUAL STORAGE SYSTEM NUMBER 1002 | VIRTUAL DISK NUMBER 1003 | DISK CACHE CAPACITY 1004 | CPU IN CHARGE 1005 | INTERNAL BANDWIDTH 1006 | VIRTUAL CHANNEL ADAPTOR 1007 | CHANNEL ADAPTOR 1008 | I/O ADAPTOR 1009 | VIRTUAL I/O ADAPTOR 1010 |
|---|---|---|---|---|---|---|---|---|---|
| 0 | n | 121 | 4GB | 4 | 20% | 0 | 0 | 0 | 0 |
|   |   | 122 |   | 6 |   |   |   |   |   |
|   |   | 300 |   | 8 |   | 1 | 2 | 1 | 1 |
|   |   | 301 |   | 10 |   |   |   |   |   |
| 0 | n+1 | 500 | 512MB | 100 | 20% | 20 | 8 | 2 | 6 |
|   |   | 501 |   | 102 |   |   |   |   |   |
| ... | ... | ... | ... | ... | ... | ... | ... | ... | ... |

STORAGE RESOURCES CONTROL TABLE

*FIG. 51*

COMPUTER SYSTEM, STORAGE SYSTEM AND METHOD FOR CONTROLLING POWER SUPPLY BASED ON LOGICAL PARTITION

CLAIM OF PRIORITY

The present application claims priority from Japanese application JP 2006-283571 filed on Oct. 18, 2006, the content of which is hereby incorporated by reference into this application.

BACKGROUND

A technology disclosed by this invention relates to a power management for a computer system, and more particularly, to a power management for each logical partition in a computer system which includes a storage system.

Logical partitioning technology has been proposed as a method of realizing a high-performance information processing system while suppressing increases in foot print, power consumption, and management cost of a computer system. Logical Partitioning technology realizes multiple virtual machines in a computer system by means of dividing resources of the computer system and allot them to each virtual machine. We can also call a virtual machine a logical partition. By controlling allocation of resources to each of the virtual machines, performance can be guaranteed for each of the virtual machines. An operating system may be installed in each virtual machine. The virtual machines can independently run, stop, do error handling, or the like. Thus, the logical partitioning technology enables a flexible operation of the computer system.

In recent years, in order to prevent from global warming, industrial products need to reduce their power consumption. Because of such a requirement, in computer systems, reduction in power consumption has been becoming an important performance measure.

U.S. 2004/0111596 discloses an exemplary technology of reducing power consumption in an environment where one computer is divided into a plurality of virtual machines. According to this technology, server resources not allocated to any logical partitions are powered off. Resource allocation is controlled so that an amount of resources not allocated to any logical partitions is maximum. Additionally, a physical disk not allocated to any logical partition is powered off.

SUMMARY

As data in computer systems increasing, a technology which interconnects among computer systems and storage systems via dedicated networks is proposed. The dedicated network is called a storage area network (SAN). By connecting the storage system and computer systems which uses the same to the SAN, a plurality of computer systems can easily share a storage system.

When the logical partitioning technology is applied to the computer systems including the SAN, a plurality of virtual machines can share one storage system. In this case, even when one virtual machine shuts down, there is a possibility that the other virtual machines use the storage system. Accordingly, to power off resources of the storage system, a correlation between each virtual machine and resources of the storage system must be managed.

However, U.S. 2004/0111596 discloses no specific mechanism for correlating the storage system and the virtual machines connected to the SAN with each other. Besides, U.S. 2004/0111596 discloses no structure in which one storage system connected to the SAN is shared by a plurality of servers. Thus, even when the virtual machine shuts down, it is impossible to power off the resources of the storage system.

According to a representative embodiment of this invention, there is provided a computer system including: a computer; and a storage system for storing data, in which: the storage system includes a first control module for logically dividing first resources of the storage system and operating the divided first resources as independent virtual storage systems; the computer includes a second control module for logically dividing second resources of the computer and operating the divided second resources as independent virtual machines; the computer system holds first information indicating a correlation among the virtual machines, the virtual storage systems allocated to the virtual machines, and the first resources allocated to the virtual storage systems; and the first control module specifies the first resource allocated to the virtual storage system which is to be powered off based on the first information, and powers off the specified first resource.

According to the embodiment of this invention, it is possible to reduce power consumption by managing a power source of the entire computer system including the storage system based on the logical partition.

BRIEF DESCRIPTION OF THE DRAWINGS

FIG. 7 is an explanatory diagram of a server resources control table according to the first embodiment of this invention.

FIG. 8 is an explanatory diagram of a virtual disk control table according to the first embodiment of this invention.

FIG. 9 is an explanatory diagram of a disk address translation table according to the first embodiment of this invention.

FIG. 10 is an explanatory diagram of a storage resources control table according to the first embodiment of this invention.

FIG. 11 is an explanatory diagram of a server power control table according to the first embodiment of this invention.

FIG. 12 is an explanatory diagram of a storage power control table according to the first embodiment of this invention.

FIG. 28 is an explanatory diagram of a routing table held by the I/O channel switch according to the fourth embodiment of this invention.

FIG. 29 is an explanatory diagram of a storage resources control table according to the fourth embodiment of this invention.

FIG. 41 is an explanatory diagram of a server system power saving mode table according to the sixth embodiment of this invention.

FIG. 42 is an explanatory diagram of a storage system power saving mode table according to the sixth embodiment of this invention.

FIG. 43 is an explanatory diagram of an input screen used for allocating resources according to the sixth embodiment of this invention.

FIG. 50 is an explanatory diagram of a disk address translation table according to the ninth embodiment of this invention.

FIG. 51 is an explanatory diagram of a storage resources control table according to the ninth embodiment of this invention.

DETAILED DESCRIPTION OF THE PREFERRED EMBODIMENTS

Preferred embodiments of this invention will be described below in detail with reference to the drawings.

Figure 1A:
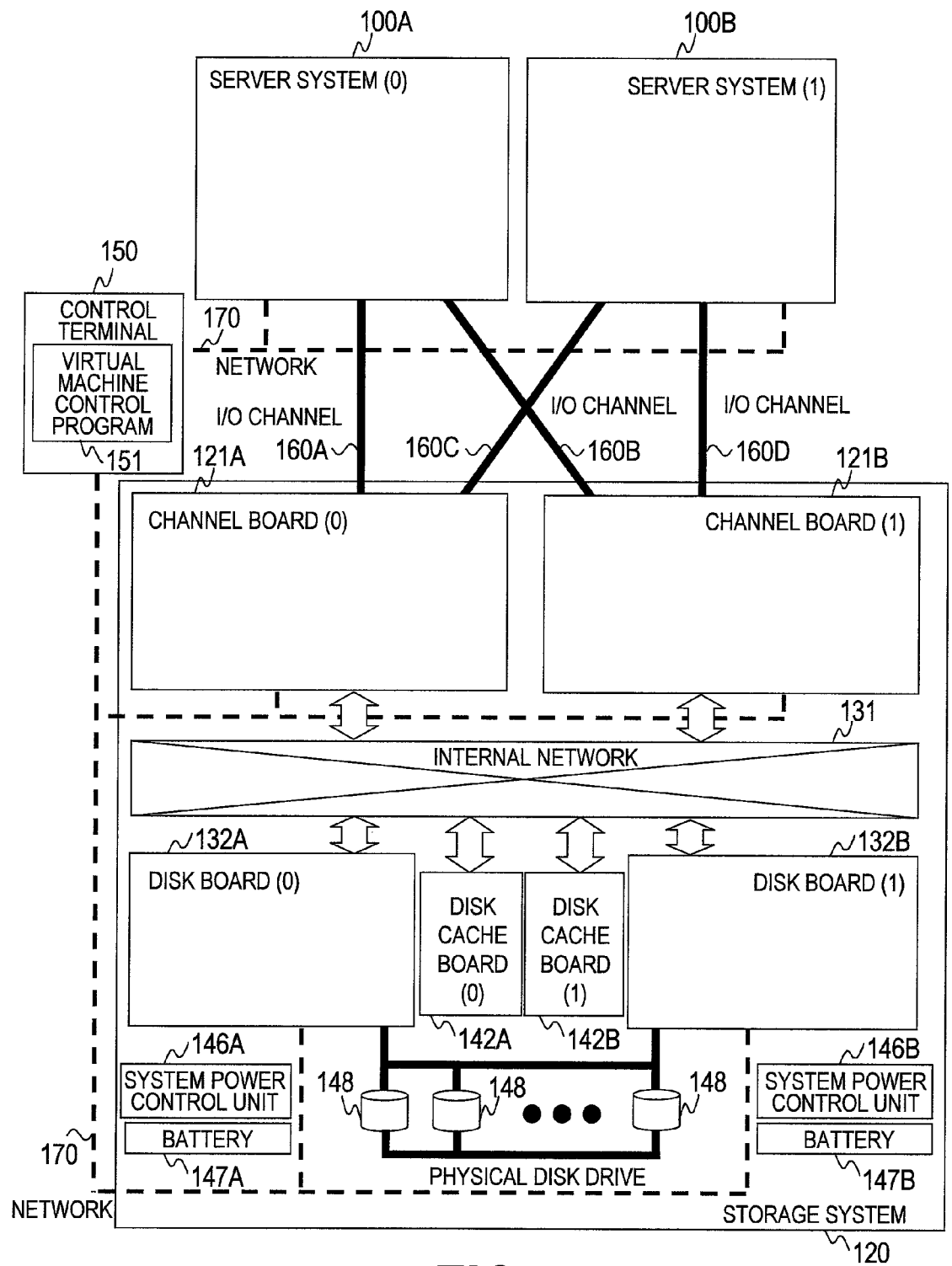
FIG. 1A is a block diagram showing a hardware configuration of a computer system according to a first embodiment of this invention.

FIG. 1A is a block diagram showing a hardware configuration of a computer system according to a first embodiment of this invention.

The computer system of this embodiment includes a server system (0) 100A, a server system (1) 100B, a storage system 120, and a control terminal 150.

In the server systems (0) 100A and (1) 100B, application programs (not shown) are operated. A parenthesized numeral such as (0) added after a name of a physical resource (e.g., "server system") is an identifier of each physical resource. In the description below, in the case of making description common to the server systems (0) 100A and (1) 100B, those server systems will be generically termed a server system 100. Similarly, when physical resources other than the server 100 are generically termed, they will be described by omitting identifiers of the physical resources and alphabets such as "A".

The storage system 120 stores data necessary for operating the server system 100. The storage system 120 is connected to the server system (0) 100A via I/O channels 160A and 160B, and to the server system (1) 100B via I/O channels 160C and 16D.

The storage system 120 includes physical resources such as channel boards (0) 121A and (1) 121B, an internal network 131, disk boards (0) 132A and (1) 132B, disk cache boards (0) 142A and (1) 142B, system power control units 146A and 146B, batteries 147A and 147B, and one or more physical disk drives 148.

Figure 1B:
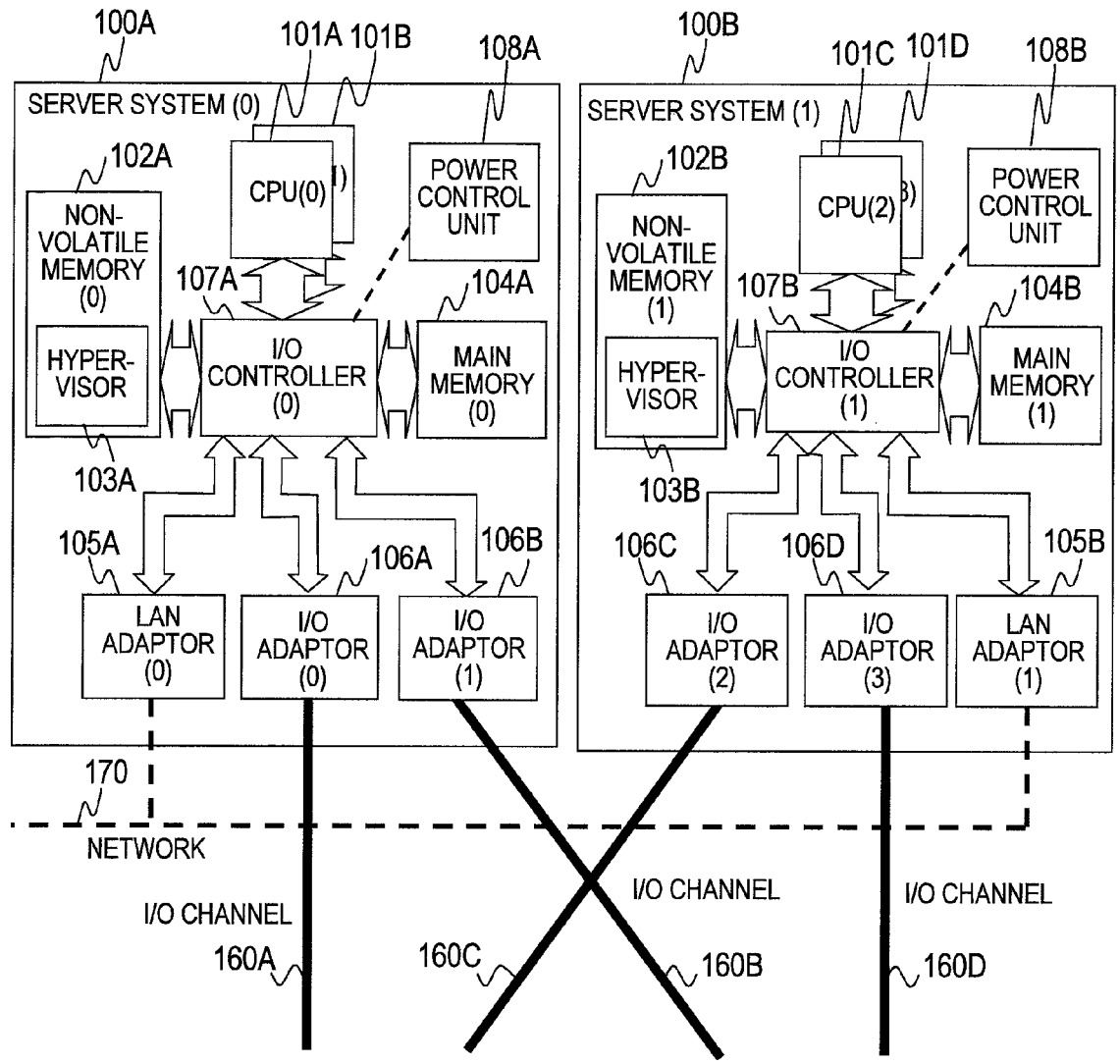
FIG. 1B is a block diagram showing a hardware configuration of a server system according to the first embodiment of this invention.
Figure 1C:
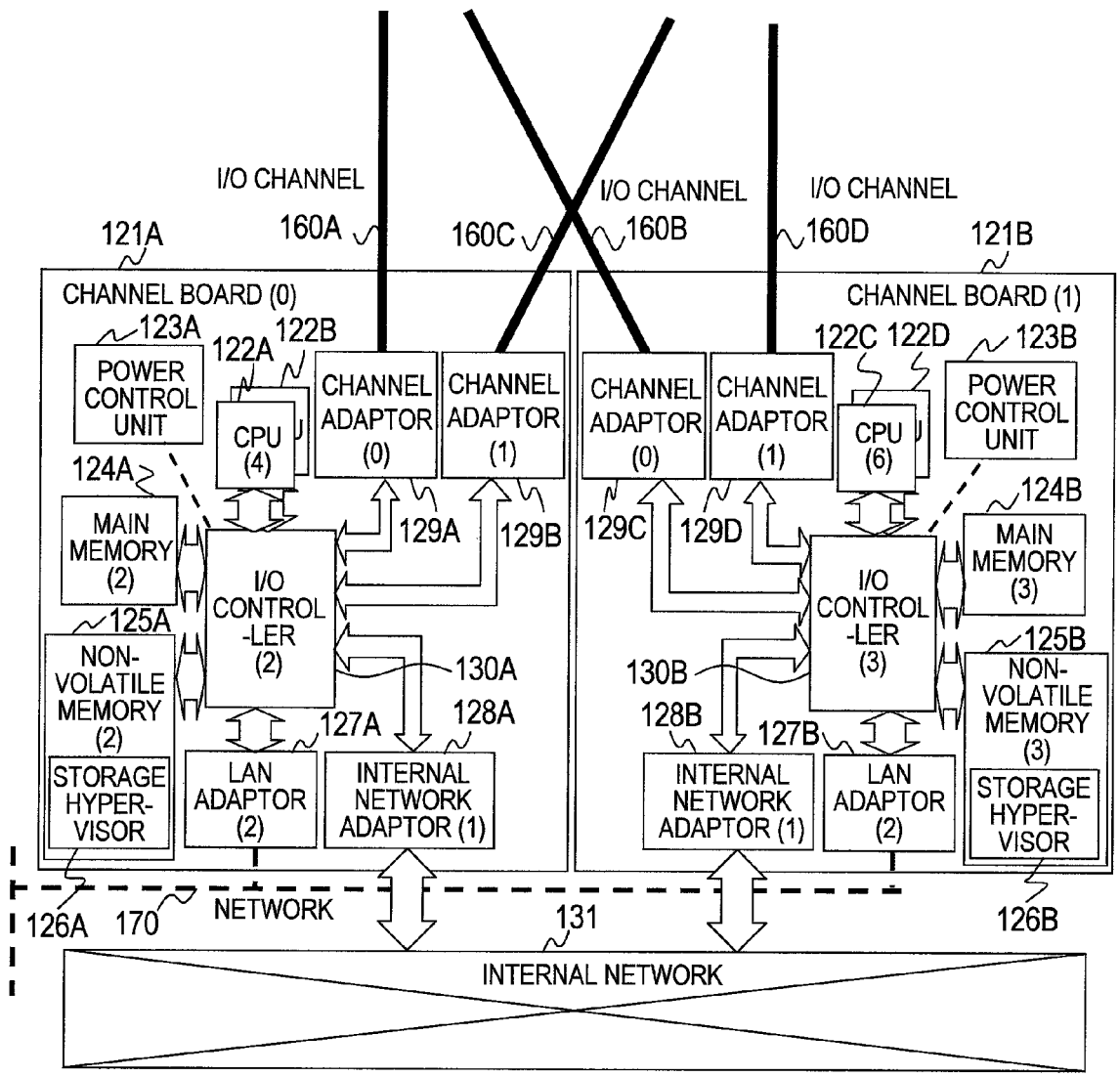
FIG. 1C is a block diagram showing a hardware configuration of a channel board in a storage system according to the first embodiment of this invention.

For example, the I/O channels 160A, 160B, 160C, and 160D are fibre channels (FC). The I/O channels 160A, 160B, 160C, and 160D constitute a storage area network (SAN) for connecting one or more storage systems 120 with one or more server systems 100. The I/O channels 160A, 160B, 160C, and 160D are implemented by cables for interconnecting ports (not shown) of an I/O adaptor 106 and a channel adaptor 129. Referring to FIGS. 1B and 1C, the I/O adaptor 106 and the channel adaptor 129 will be described below.

The internal network 131 interconnects the channel boards 121, the disk boards 132, and the disk cache boards 142. For example, the internal network 131 may be constituted of a bus or a crossbar switch.

The control terminal 150 is a computer for managing an operation of the entire computer system by executing a virtual machine control program 151. As described below, the virtual machine control program 151 contains computer system management information. The control terminal 150 is connected to the server systems 100 and the storage system 120 via a network 170.

For example, the network 170 is a local area network (LAN), but other types of networks may be employed.

The physical disk drive 148 is a storage medium for storing data. In general, this storage medium is a magnetic disk, but another type of medium such as an optical disk or a flash memory may be employed. A plurality of physical disk drives 148 may constitute redundant arrays of independent disks (RAID) so that redundancy can be added to the stored data. As a result, even when troubles occurs in some of the physical disk drives 148, the store data is not lost.

The system power control units 146A and 146B control power supply to the physical resources in the storage system 120.

The batteries 147A and 147B are backup power sources for the storage system 120. For example, when a power failure occurs, the batteries 147A and 147B supply power to the storage system 120.

A configuration of each device of the computer system shown in FIG. 1A will be described below.

FIG. 1B is a block diagram showing a hardware configuration of the server system 100 according to the first embodiment of this invention.

The server system (0) 100A is a computer which includes CPU's (0) and 101A and (1) 101B, a non-volatile memory (0) 102A, a main memory (0) 104A, a LAN adaptor (0) 105A, I/O adaptors (0) 106A and (1) 106B, and an I/O controller (0) 107A. Additionally, the server system (0) 100A includes a power control unit 108A for controlling power supply to each of the physical resources.

The CPU's (0) 101A and (1) 101B execute operation regarding an operating system (OS) and an application program executed by the server system (0) 100A. As an example, the server system (0) 100A shown in FIG. 1B includes two CPU's (0) 101A and (1) 101B. However, the server system (0) 100A may include only one CPU 101, or three or more CPU's 101.

The main memory (0) 104A stores programs and data necessary for operating the CPU's (0) 101A and (1) 101B.

The I/O controller (0) 107A interconnects the CPU's (0) 101A and (1) 101B, the non-volatile memory (0) 102A, the main memory (0) 104A, the LAN adaptor (0) 105A, and the I/O adaptors (0) 106A and (1) 106B to transfer data and a control signal.

The I/O adaptors (0) 106A and (1) 106B are connected to the storage system 120 respectively via the I/O channels 160A and 160B. The I/O adaptors (0) 106A and (1) 106B transmit data input/output requests to the storage system 120 and receive data stored in the storage system 120. FIG. 1B shows the two I/O adaptors 106 for each server system 100. However, each server system 100 may include more I/O adaptors 106.

These two I/O adaptors (0) 106A and (1) 106B are operated independently to duplicate a processing system. Accordingly, even when a trouble occurs in one I/O adaptor 106, access from the server system (0) 100A to the storage system 120 is not stopped.

The LAN adaptor (0) 105A is connected to the other server system (1) 100B, the storage system 120, and the control terminal 150 via the network 170. The LAN adaptor (0) 105A transfers control information and management information with the devices connected via the network 170.

The non-volatile memory (0) 102A stores a hypervisor 103A. The hypervisor 103A is implemented by processing executed by the CPU 101 to implement logical partitions of the physical resources of the server system (0) 100A.

The hypervisor 103A is read by executing a dedicated program from the non-volatile memory 102A when power is turned on for the server system (0) 100A. Then, the hypervisor 103A is started by executing the program to manage resources of the server system (0) 100A. In other words, the hypervisor 103A is a management program for generating virtual machines which are operated independently by constituting logical partitions in the server system (0) 100A.

In place of starting the hypervisor 103A when the power is turned on for the server system (0) 100A, at the starting of the OS of the server system (0) 100A, a virtualization engine may be started and a hypervisor may be configured by the OS and the virtualization engine. In this case, the OS started when the power is turned on for the server system (0) 100A reads the virtualization engine to execute it. This virtualization engine may be stored in the non-volatile memory 102A or the storage system 120.

In most cases below, software will be described as a subject of operations. In reality, however, the CPU 101 or the like executes software to operate the hypervisor 103 or the like.

The hypervisor 103A may be constituted of not software but hardware. For example, the server system (0) 100A may include a hypervisor dedicated chip, or the CPU 101 may include a hypervisor unit for managing a virtual machine.

As the server system (1) 100B is similar in configuration to the server system (0) 100A, description thereof will be omitted. Specifically, CPU's (2) 101C and (3) 101D, a non-volatile memory (1) 102B, a main memory (1) 104B, a LAN adaptor (1) 105B, I/O adaptors (2) 106C and (3) 106D, an I/O controller (1) 107B, and a power control unit 108B correspond to the CPU's (0) 101A and (1) 101B, the non-volatile memory (0) 102A, the main memory (0) 104A, the LAN adaptor (0) 105A, the I/O adaptors (0) 106A and (1) 106B, the I/O controller (0) 107A, and the power control unit 108A, respectively.

FIG. 1C is a block diagram showing a hardware configuration of the channel board 121 in the storage system 120 according to the first embodiment of this invention.

The channel board (0) 121A includes physical resources such as CPU's (4) 122A and (5) 122B, a main memory (2) 124A, a non-volatile memory (2) 125A, a LAN adaptor (2) 127A, an internal network adaptor (0) 128A, channel adaptors (0) 129A and (1) 129B, and an I/O controller (2) 130A. Additionally, the channel board (0) 121A includes a power control unit 123A for controlling power supply to each of the physical resources.

The CPU's (4) 122A and (5) 122B execute operation regarding various management programs executed by the storage system 120.

The main memory (2) 124A stores programs and data necessary for operating the CPU's (4) 122A and (5) 122B.

The non-volatile memory (2) 125A stores a storage hypervisor 126A. As in the case of the hypervisor 103, the storage hypervisor 126A is implemented by processing executed by the CPU 122 to implement logical partitions of the physical resources of the storage system 120.

The storage hypervisor 126A is implemented by a management program for constituting logical partitions in the storage system 120 and generating virtual storage systems which are operated independently. To implement the storage hypervisor 126A, as in the case of the hypervisor 103 of the server system (0) 100A, various methods can be employed.

The LAN adaptor (2) 127A is connected to the server system 100, the control terminal 150, the disk board 132, and the other channel board 121 via the network 170. The LAN adaptor (2) 127A transfers a control signal and management information with the devices connected via the network 170.

The internal network adaptor (0) 128A is connected to the disk board 132, the disk cache board 142, and the other channel board 121 via the internal network 131. The internal network adaptor (0) 128A transfers data or the like with each unit connected via the internal network 131.

The channel adaptors (0) 129A and (1) 129B are connected to the server systems (0) 100A and (1) 100B respectively via the I/O channels 160A and 160C. The channel adaptors (0) 129A and (1) 129B receive a data input/output request from the server system 100 and transmit data stored in the storage system 120. FIG. 1C shows two channel adaptors 129 for each channel board 121. However, each channel board 121 may include more channel adaptors 129.

The I/O controller (2) 130A interconnects the CPU's (4) 122A and (5) 122B, the main memory (2) 124A, the non-volatile memory (2) 125A, the LAN adaptor (2) 127A, the internal network adaptor (0) 128A, and the channel adaptors (0) 129A and (1) 129B to transfer data and a control signal.

As the channel board (1) 121B is similar in configuration to the channel board (0) 121A, description thereof will be omitted. Specifically, CPU's (6) 122C and (7) 122D, a power control unit 123B, a main memory (3) 124B, a non-volatile memory (3) 125B, a LAN adaptor (3) 127B, an internal network adaptor (1) 128B, channel adaptors (2) 129C and (3) 129D, and an I/O controller (3) 130B correspond to the CPU's (4) 122A and (5) 122B, the power control unit 123A, the main memory (2) 124A, the non-volatile memory (2) 125A, the LAN adaptor (2) 127A, the internal network adaptor (0) 128A, the channel adaptors (0) 129A and (1) 129B, and the I/O controller (2) 130A, respectively.

The channel boards (0) 121A and (1) 121B are operated independently to duplicate a processing system. Accordingly, even when a trouble occurs in one channel board 121, the storage system 120 is not stopped. The storage system 120 may include more channel boards 121.

Figure 1D:
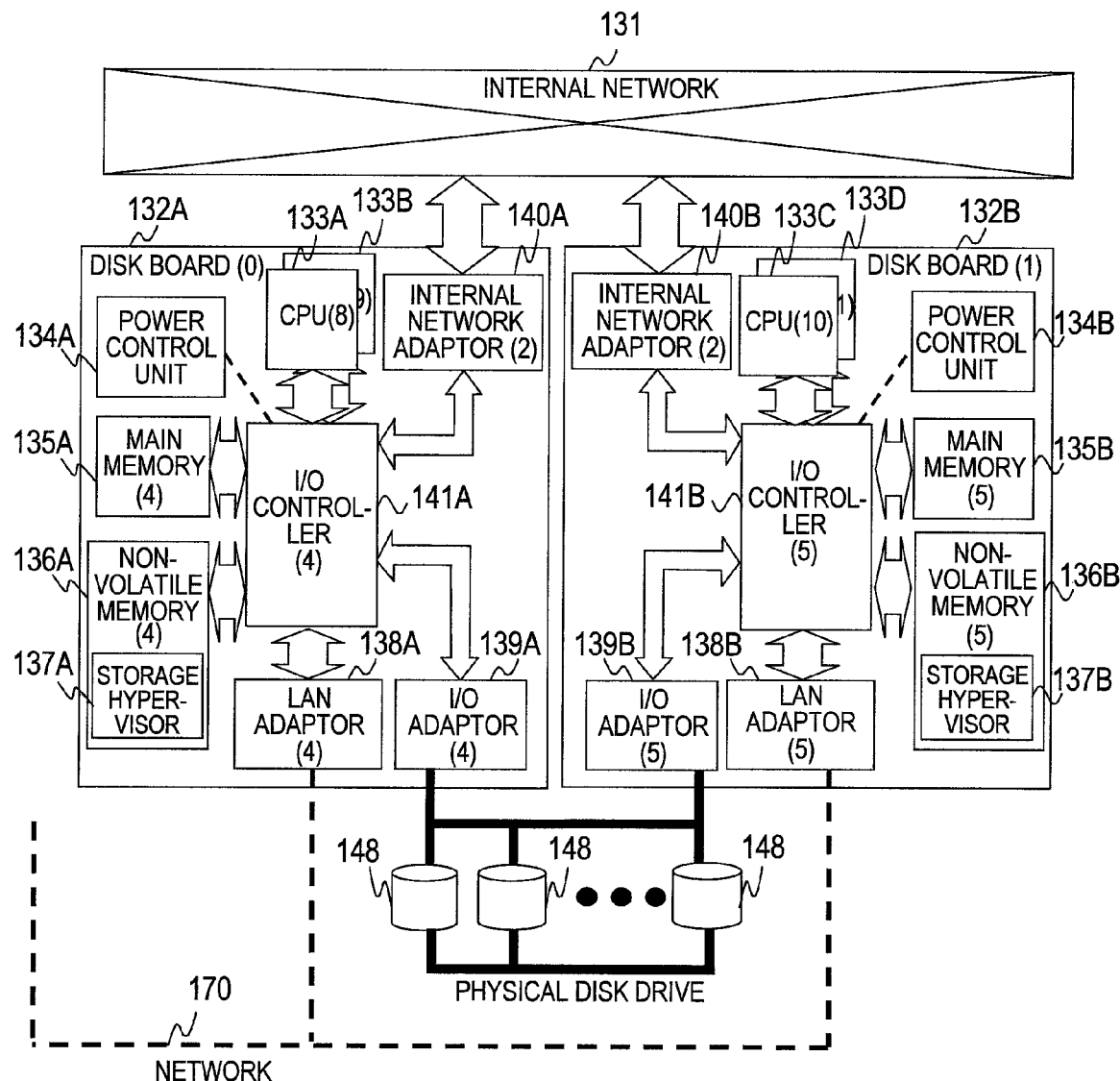
FIG. 1D is a block diagram showing a hardware configuration of a disk board in the storage system according to the first embodiment of this invention.

FIG. 1D is a block diagram showing a hardware configuration of the disk board 132 in the storage system 120 according to the first embodiment of this invention.

The disk board (0) 132A includes physical resources of a CPU (8) 133A, a CPU (9) 133B, a main memory (4) 135A, a non-volatile memory (4) 136A, a LAN adaptor (4) 138A, an I/O adaptor (4) 139A, an internal network adaptor (2) 140A, and an I/O controller (4) 141A. Additionally, the disk board (0) 132A includes a power control unit 134A for controlling power supply to each of the physical resources.

The CPU's (8) 133A and (9) 133B execute operation regarding various programs executed in the storage system 120.

The main memory (4) 135A stores programs and data necessary for operating the CPU's (8) 133A and (9) 133B.

The non-volatile memory (4) 136A stores a storage hypervisor 137A. As in the case of the hypervisor 103, the storage hypervisor 137A is implemented by processing executed by the CPU 133 to implement logical division of the physical resources of the storage system 120.

The storage hypervisor 137A is implemented by a management program for constituting logical partitions of the storage system 120 and generating a virtual storage system which is operated independently. To implement the storage hypervisor 137A, various methods can be employed as in the case of the hypervisor 103A of the server system (0) 100A.

The LAN adaptor (4) 138A is connected to the server system 100, the control terminal 150, the channel board 121, and the other disk board 132 via the network 170. The LAN adaptor (4) 138A transfers a control signal and management information with the devices connected via the network 170.

The I/O adaptor (4) 139A is connected to the physical disk drive 148. The I/O adaptor (4) 139A transmits a data input/output request to the physical disk drive 148 and receive data stored in the physical disk drive 148.

The internal network adaptor (2) 140A is connected to the channel board 121, the disk cache board 142, and the other disk board 132 via the internal network 131. The internal network adaptor (2) 140A transfers data or the like with the units connected via the internal network 131.

The I/O controller (4) 141A interconnects the CPU's (8) 133A and (9) 133B, the main memory (4) 135A, the non-volatile memory (4) 136A, the LAN adaptor (4) 138A, the I/O adaptor (4) 139A, and the internal network adaptor (2) 140A to transfer data and a control signal.

As the disk board (1) 132B is similar in configuration to the disk board (0) 132A, description thereof will be omitted. Specifically, a CPU (10) 133C, a CPU (11) 133D, a power control unit 134B, a main memory (5) 135B, a non-volatile memory (5) 136B, a LAN adaptor (5) 138B, an I/O adaptor (5) 139B, an internal network adaptor (3) 140B, and an I/O controller (5) 141B correspond to the CPU's (8) 133A and (9) 133B, the power control unit 134A, the main memory (4) 135A, the non-volatile memory (4) 136A, the LAN adaptor (4) 138A, the I/O adaptor (4) 139A, the internal network adaptor (2) 140A, and the I/O controller (4) 141A, respectively.

The disk boards (0) 132A and (1) 132B are operated independently to duplicate the processing system. Accordingly, even when a trouble occurs in one disk board 132, the storage system 120 is not stopped. The storage system 120 may include more disk boards 132.

Figure 1E:
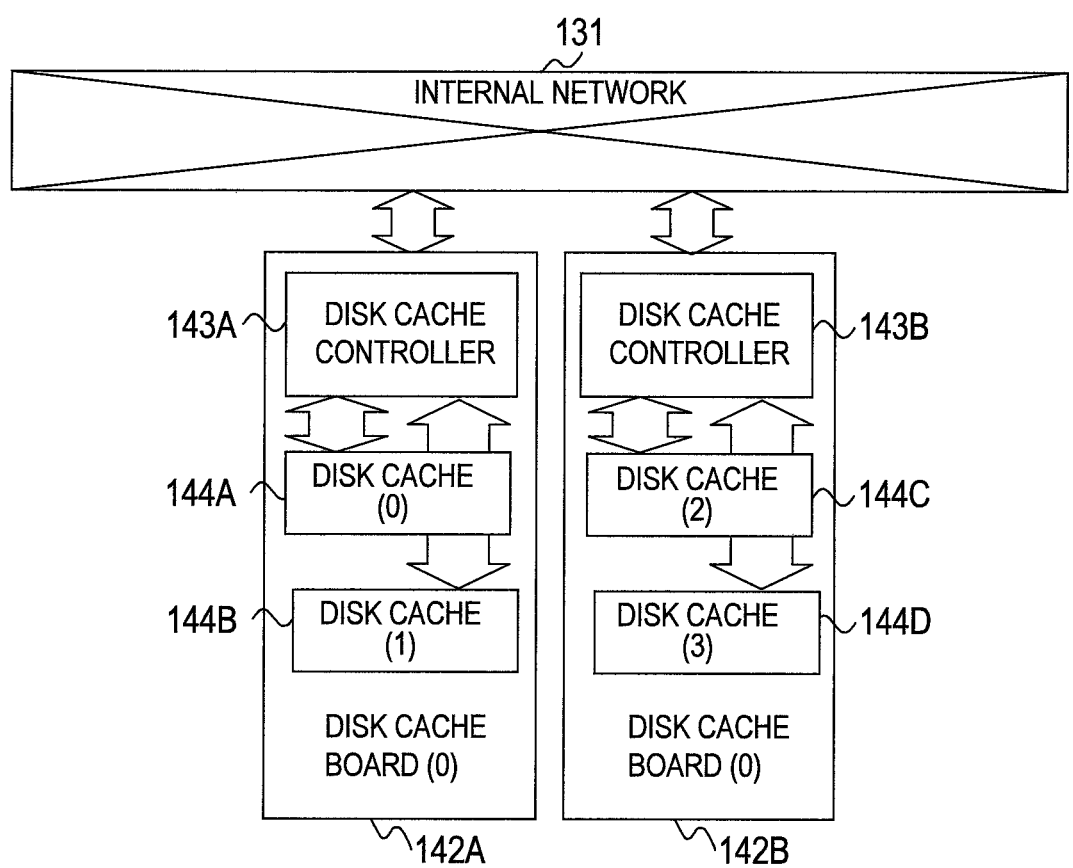
FIG. 1E is a block diagram showing a hardware configuration of a disk cache board in the storage system according to the first embodiment of this invention.

FIG. 1E is a block diagram showing a hardware configuration of the disk cache board 142 in the storage system 120 according to the first embodiment of this invention.

The disk cache board (0) 142A includes a disk cache controller 143A, and disk caches (0) 144A and (1) 144B.

The disk caches (0) 144A and (1) 144B are memories for temporarily storing data read/written in the physical disk drive 148. By temporarily storing data in the disk cache 144, access performance from the server system 100 to the storage system 120 is improved. The disk cache controller 143A controls writing/reading of data in/from the disk caches (0) 144A and (1) 144B.

As the disk cache board (1) 142B is similar in configuration to the disk cache board (0) 142A, description thereof will be omitted. Specifically, a disk cache controller 143B, and disk caches (2) 144C and (3) 144D respectively correspond to the disk cache controller 143A, and the disk caches (0) 144A and (1) 144B.

Figure 2:
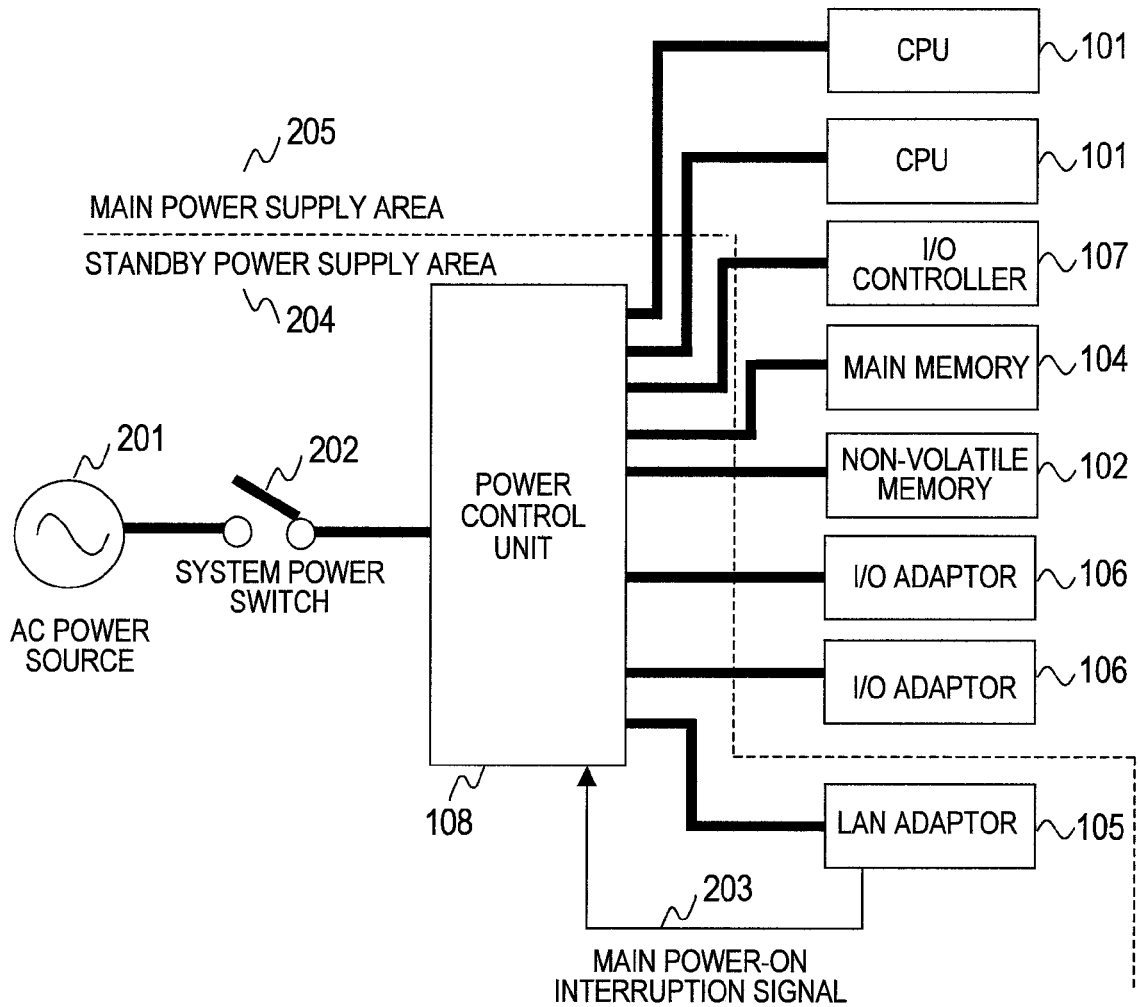
FIG. 2 is an explanatory diagram of a power supply system of the server system according to the first embodiment of this invention.

FIG. 2 is an explanatory diagram of a power supply system of the server system 100 according to the first embodiment of this invention.

The power supply system of the server system 100 includes an AC power source 201, a system power switch 202, a power control unit 108, and physical resources (i.e., CPU 101, I/O controller 107, main memory 104, non-volatile memory 102, I/O adaptor 106, and LAN adaptor 105) for receiving power supply.

The AC power source 201 is a source of power supplied to the server system 100. For example, the AC power source 201 may be commercial power supplied from a power company or any other types of AC power source.

The system power switch 202 switches inputting (i.e., start of power supplying) and cutting-off (i.e., end of power supplying) of power supplied from the AC power source 201 to the sever system 100. When the system power switch 202 is turned off, power supply to the entire server system 100 is completely stopped.

The power supply system of the server system 100 is divided into two areas, i.e., a standby power supply area 204 and a main power supply area 205. The power control unit 108 and the LAN adaptor 105 belong to the standby power supply area 204, while the CPUs 101, the I/O controller 107, the main memory 104, the non-volatile memory 102, and the I/O adaptors 106 belong to the main power supply area 205.

Power is supplied to the standby power supply area 204 as long as the AC power source 201 is operated and the system power switch 202 is turned on. In other words, the power supplied to the standby power supply area 204 is not cut by the power control unit 108.

On the other hand, power supplied to the main power supply area 205 is controlled by the power control unit 108. In other words, the power control unit 108 controls inputting and cutting of power to the physical resources belonging to the main power supply area 205.

The power control unit 108 can control power supply to the physical resources in response to a request which the LAN adaptor 105 receives via the network 170. For example, upon reception of a request of supplying power to the main power supply area 205, the LAN adaptor 105 transmits a main power on interruption signal 203 to the power control unit 108. The power control unit 108 that has received the main power on interruption signal 203 supplies power to the main power supply area 205. Alternatively, the CPU 101 can instruct the power control unit 108 to turn on/off power to the resources such as the I/O adaptor 106.

Figure 3:
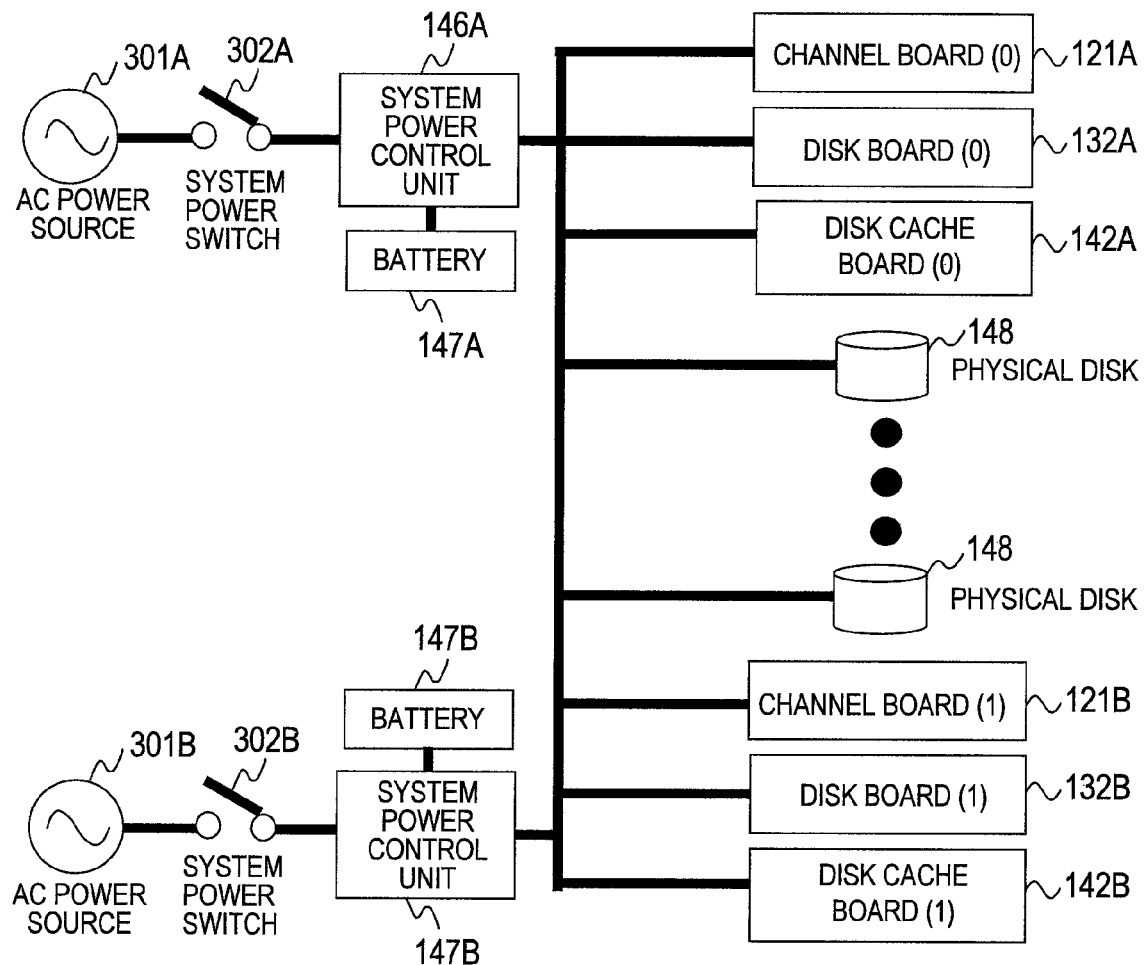
FIG. 3 is an explanatory diagram of a power supply system of the storage system according to the first embodiment of this invention.

FIG. 3 is an explanatory diagram of a power supply system of the storage system 120 according to the first embodiment of this invention.

The power supply system of the storage system 120 includes AC power sources 301A and 301B, system power switches 302A and 302B, system power control units 146A and 146B, batteries 147A and 147B, and physical resources (i.e., channel board 121, disk board 132, disk cache board 142, and physical disk 148) for receiving power supply.

Each of the AC power sources 301A and 301B are sources of power supplied to the storage system 120. As in the case of the AC power source 201 of FIG. 2, the AC power sources 301A and 301B may be any types of AC power sources.

The system power switches 302A and 302B are similar to the system power switch 202 of FIG. 2.

The system power control units 146A and 146B, the batteries 147A and 147B, and the physical resources are as described above referring to FIG. 1A, and thus description thereof will be omitted. Alternatively, the channel board 121A and the disk board 132A can instruct the power control units 146A and 146B to turn on/off power to the resources such as the disk caches 144 and 148.

As shown in FIG. 3, the power supply system of the storage system 120 includes the AC power source 301, the system power switch 302, the system power control unit 146 and the battery 147 respectively by two independently. Accordingly, even when a trouble occurs in one of the two, the other can supply power.

Figure 4:
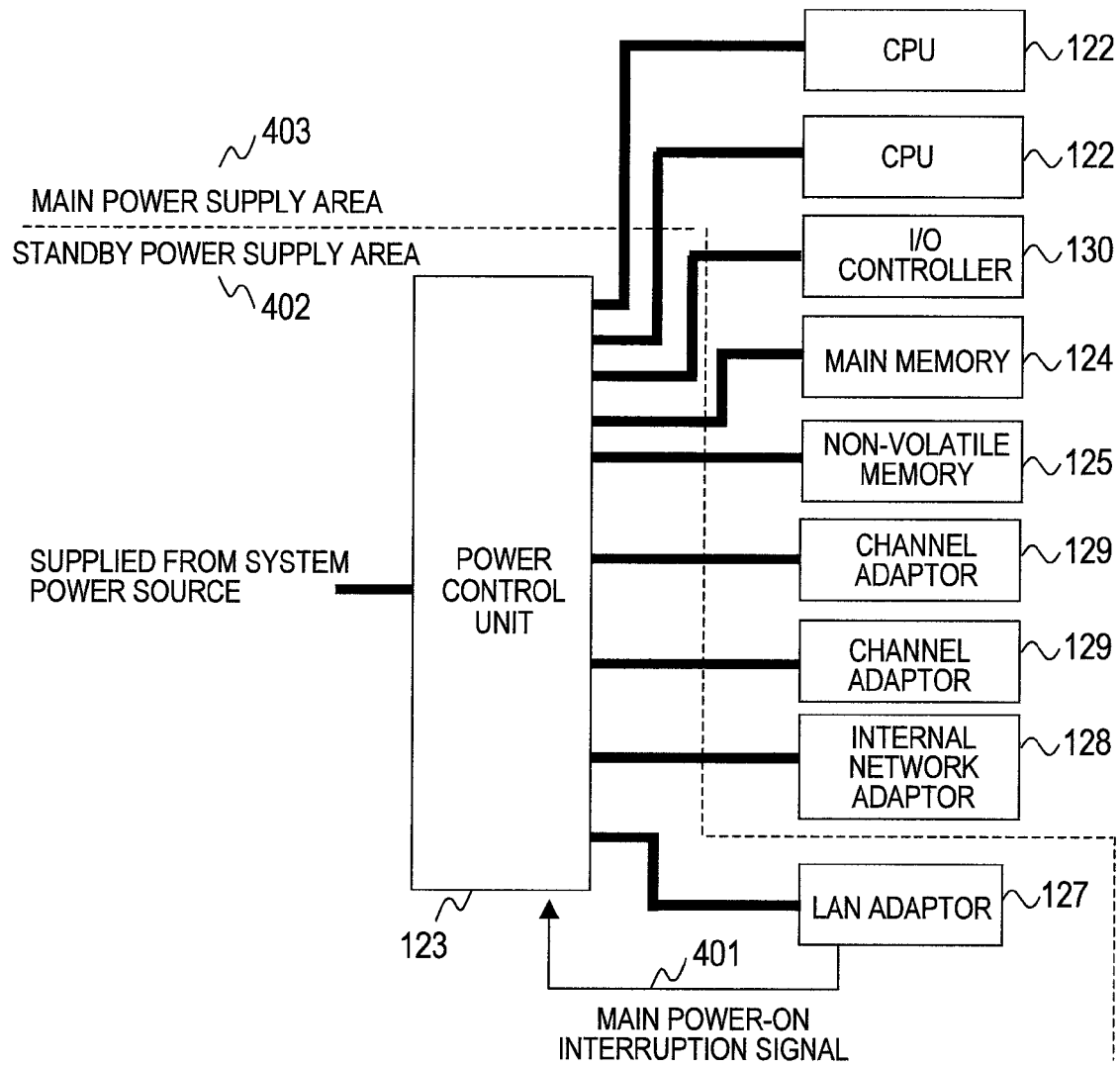
FIG. 4 is an explanatory diagram of a power supply system of the channel board of the storage system according to the first embodiment of this invention.

FIG. 4 is an explanatory diagram of a power supply system of the channel board 121 of the storage system 120 according to the first embodiment of this invention.

The power supply system of the channel board 121 includes a power control unit 123 and physical resources (i.e., CPU 122, I/O controller 130, main memory 124, non-volatile memory 125, channel adaptor 129, internal network adaptor 128, and LAN adaptor 127) for receiving power supply.

Upon reception of power supplied from the system power control units 146A and 146B, the power control unit 123 controls supplying of power to the physical resources.

The power supply system of the channel board 121 is divided into two areas, i.e., a standby power supply area 402 and a main power supply area 403. The power control unit 123 and the LAN adaptor 127 belong to the standby power supply area 402, while the CPUs 122, the I/O controller 130, the main memory 124, the non-volatile memory 125, the channel adaptors 129, and the internal network adaptor 128 belong to the main power supply area 403.

As in the case of the standby power supply area 204 shown in FIG. 2, power supplied to the standby power supply area 402 is not cut off by the power control unit 123. In other words, power is supplied to the standby power supply area 402 as longs as power is supplied from at least one of the system power control units 146A and 146B.

On the other hand, power supplied to the main power supply area 403 is controlled by the power control unit 123. In other words, the power control unit 123 controls inputting and cutting of power to the physical resources belonging to the main power supply area 403.

The power control unit 123 can control power supply to the physical resources in response to a request which the LAN adaptor 127 receives via the network 170. For example, upon reception of a request of supplying power to the main power supply area 403, the LAN adaptor 127 transmits a main power on interruption signal 401 to the power control unit 123. The power control unit 123 that has received the main power on interruption signal 401 supplies power to the main power supply area 403. Alternatively, the CPU 122 can instruct the power control unit 123 to turn on/off power to the resources such as the I/O controller 130, the main memory 124, the non-volatile memory 125, the channel adaptor 129 and the internal network adaptor 128.

Figure 5:
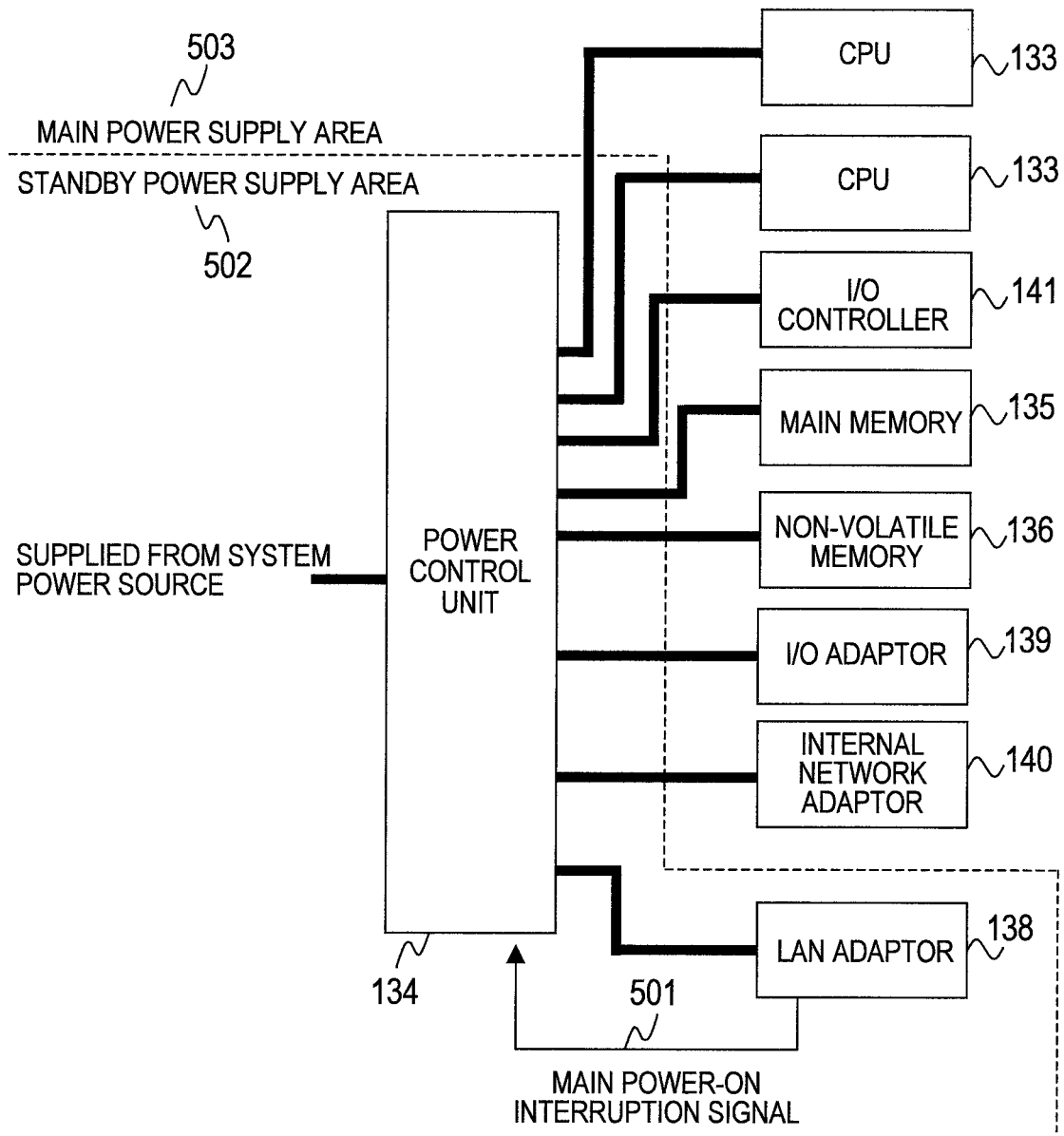
FIG. 5 is an explanatory diagram of a power supply system of the disk board in the storage system according to the first embodiment of this invention.

FIG. 5 is an explanatory diagram of a power supply system of the disk board 132 of the storage system 120 according to the first embodiment of this invention.

The power supply system of the disk board 132 includes a power control unit 134 and physical resources (i.e., CPU 133, I/O controller 141, main memory 135, non-volatile memory 136, I/O adaptor 139, internal network adaptor 140, and LAN adaptor 138) for receiving power supply.

Upon reception of power supplied from the system power control units 146A and 146B, the power control unit 134 controls supplying of power to the physical resources.

The power supply system of the disk board 132 is divided into two areas, i.e., a standby power supply area 502 and a main power supply area 503. The power control unit 134 and the LAN adaptor 138 belong to the standby power supply area 502, while the CPUs 133, the I/O controller 141, the main memory 135, the non-volatile memory 136, the I/O adaptor 139, and the internal network adaptor 140 belong to the main power supply area 503.

As in the case of the standby power supply area 204 shown in FIG. 2, power supplied to the standby power supply area 502 is not cut off by the power control unit 134. In other words, power is supplied to the standby power supply area 502 as longs as power is supplied from at least one of the system power control units 146A and 146B.

On the other hand, power supplied to the main power supply area 503 is controlled by the power control unit 134. In other words, the power control unit 134 controls inputting and cutting of power to the physical resources belonging to the main power supply area 503.

The power control unit 134 can control power supply to the physical resources in response to a request which the LAN adaptor 138 receives via the network 170. For example, upon reception of a request of supplying power to the main power supply area 503, the LAN adaptor 138 transmits a main power on interruption signal 501 to the power control unit 134. The power control unit 134 that has received the main power on interruption signal 501 supplies power to the main power supply area 503. Alternatively, the CPU 133 can instruct the power control unit 134 to turn on/off power to the resources such as the I/O controller 141, the main memory 135, the non-volatile memory 136, the I/O adaptor 139 and the internal network adaptor 140.

Figure 6A:
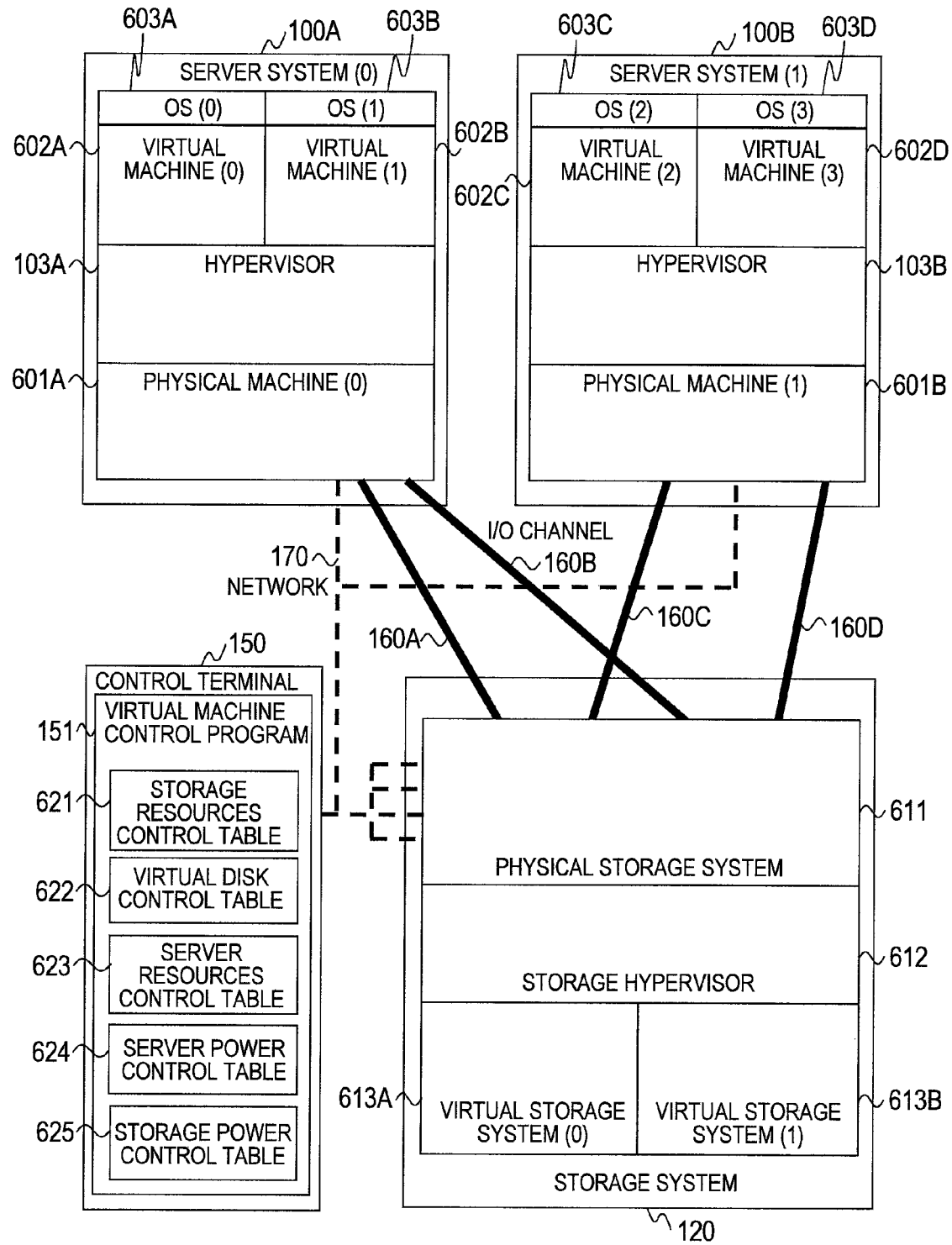
FIG. 6A is a functional block diagram of the computer system according to the first embodiment of this invention.

FIG. 6A is a functional block diagram of the computer system according to the first embodiment of this invention.

Focusing on functions, the server system (0) 100A includes a physical layer, a hypervisor layer, and a virtual machine layer.

The physical layer of the server system (0) 100A is a physical machine (0) 601A which includes server resources such as a CPU, a LAN, and an I/O adaptor.

The hypervisor layer is implemented by the hypervisor 103A. The server resources of the physical machine (0) 100A are managed by the hypervisor 103A.

Bracketed numerals added after the physical resources are identifiers of the physical resources. Bracketed numerals added after virtual resources are identifiers of the virtual resources.

The virtual machine layer includes virtual machines (0) 602A and (1) 602B. These virtual machines are generated by dividing server resources of the physical machine (0) 601A into logical partitions by the hypervisor 103A. OS's (0) 603A and (1) 603B operate in the virtual machines (0) 602A and (1) 602B. The OS (0) 603A executes operation by using server resources allocated to the virtual machine (0) 602A. The OS (1) 603B executes operation by using server resources allocated to the virtual machine (1) 602B.

The server system (1) 100B has the same configuration as that of the server system (0) 100A. The explanation of the layers of the server system (0) 100A can be applied to a physical machine (1) 601B, a hypervisor 103B, virtual machines (2) 602C and (3) 602D, and OS's (2) 603C and (3) 603D of the server system (1) 100B.

Focusing on functions, the storage system 120 includes a physical layer, a hypervisor layer, and a virtual storage layer.

The physical layer of the storage system 120 is a physical storage system 611 which includes storage resources such as a physical disk drive, a CPU, a disk cache, a LAN adaptor, and a channel adaptor.

The hypervisor layer is implemented by a storage hypervisor 612. The storage hypervisor 612 corresponds to the storage hypervisors 126A, 126B, 137A, and 137B shown in FIG. 1C.

The virtual storage layer includes virtual storage systems (0) 613A and (1) 613B. These virtual storage systems are generated by dividing storage resources of the physical storage system 611 into logical partitions by the storage hypervisor 612.

Figure 6B:
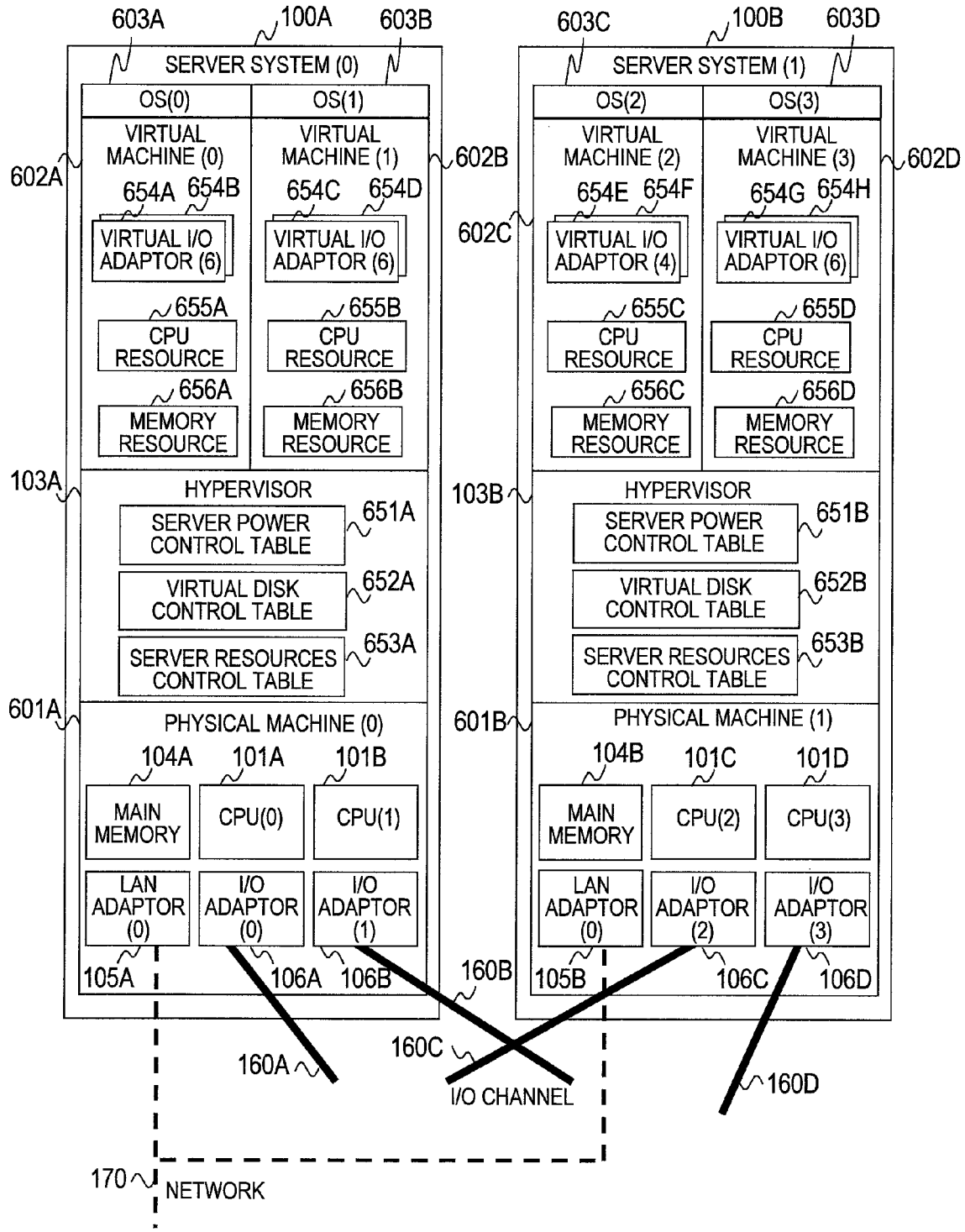
FIG. 6B is a functional block diagram of the server system according to the first embodiment of this invention.
Figure 6C:
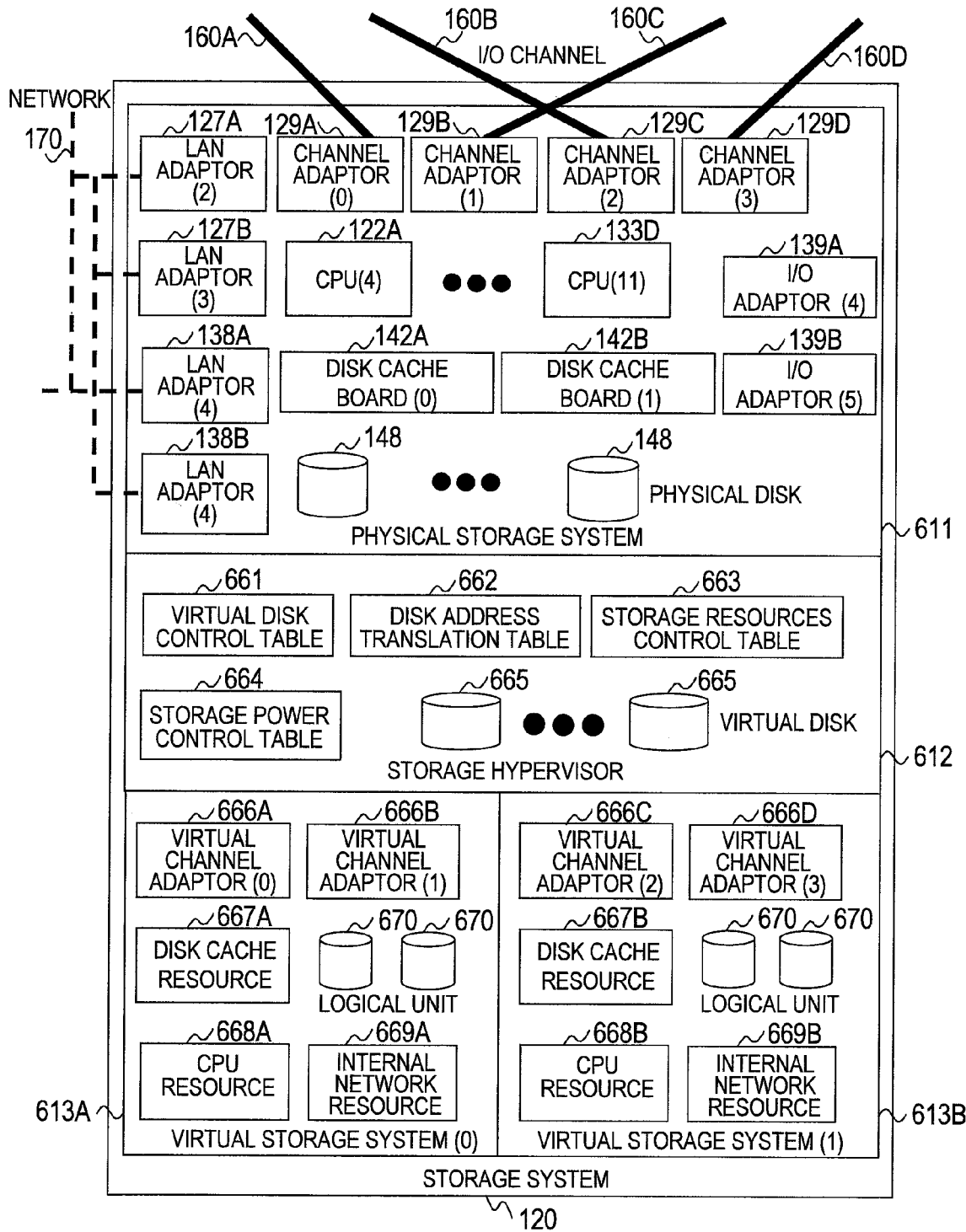
FIG. 6C is a functional block diagram of the storage system according to the first embodiment of this invention.

Referring to FIGS. 6B and 6C, the layers of the server system 100 and the storage system 120 will be described below in detail.

A virtual machine control program 151 of the control terminal 150 is a program for managing the virtual machine 602 in the computer system. In the description below, processing executed by the control terminal 150 is actually realized when a CPU (not shown) of the control terminal 150 executes the virtual machine control program 151 stored in a memory (not shown).

The virtual machine control program 151 includes at least a storage resources control table 621 shown in FIG. 10, a virtual disk control table 622 shown in FIG. 8, a server resources control table 623 shown in FIG. 7, a server power control table 624 shown in FIG. 11, and a storage power control table 625 shown in FIG. 12. These tables will be described below in detail.

FIG. 6B is a functional block diagram of the server system 100 according to the first embodiment of this invention.

The physical machine (0) 601A of the server system (0) 100A includes physical resources of at least CPU's (0) 101A and (1) 101B, a main memory (0) 104A, a LAN adaptor (0) 105A, and I/O adaptors (0) 106A and (1) 106B. These are similar to those described above referring to FIG. 1B. The physical machine (0) 601A may further include other physical resources. However, as they are unnecessary for explanation of FIG. 6B, they are omitted.

The hypervisor 103A includes a server power control table 651A, a virtual disk control table 652A, and a server resources control table 653A. These tables may respectively be similar to the server power control table 624, the virtual disk control table 622, and the server resources control table 623.

According to this embodiment, the tables 651A, 652A, and 653A may hold information only regarding the server system (0) 100A. Similarly, tables 651B, 652B, and 653B of the server system (1) 100B described below may hold information only regarding the server system (1) 100B. The control terminal 150 may collect pieces of information held in the tables of the hypervisors of the server system 100 and the storage system 120 to generate tables 621 to 625 for holding information regarding the entire computer system.

The virtual machine (0) 602A includes virtual I/O adaptors (0) 654A and (1) 654B, CPU resources 655A, and memory resources 656A. Similarly, the virtual machine (1) 602B includes virtual I/O adaptors (2) 654C and (3) 654D, CPU resources 655B, and memory resources 656B. These are virtual resources generated by dividing physical resources of the physical machine (0) 601A into logical partitions by the hypervisor 103A.

A configuration of each layer of the server system (1) 100B is similar to that of the server system (0) 100A. In other words, the physical machine (1) 601B includes physical resources of at least CPU's (2) 100C and (3) 100D, a main memory (1) 104B, a LAN adaptor (1) 105B, and I/O adaptors (2) 106C and (3) 106D. The hypervisor 103B includes a server power control table 651B, a virtual disk control table 652B, and a server resources control table 653B.

The virtual machine (2) 602C includes virtual I/O adaptors (4) 654E and (5) 654F, CPU resources 655C, and memory resources 656C. Similarly, the virtual machine (3) 602D includes virtual I/O adaptors (6) 654G and (7) 654H, CPU resources 655D, and memory resources 656D. These are virtual resources generated by dividing physical resources of the physical machine (1) 601B into logical partitions by the hypervisor 103B.

FIG. 6C is a functional block diagram of the storage system 120 according to the first embodiment of this invention.

The physical storage system 611 of the storage system 120 includes at least CPU's (4) 122A to (7) 122D, CPU's (8) 133A to (11) 133D, channel adaptors (0) 129A to (3) 129D, LAN adaptors (2) 127A, (3) 127B, (4) 138A, and (5) 138B, I/O adaptors (4) 139A and (5) 139B, disk cache boards (0) 142A and (1) 142B, and a physical disk drive 148. These are similar to those described above referring to FIGS. 1C to 1E. The physical storage system 611 may include other physical resources. However, as they are unnecessary for explanation of FIG. 6C, they are omitted.

The storage hypervisor 612 includes at least a virtual disk control table 661, a disk address translation table 662, a storage resources control table 663, a storage power control table 664, and one or more virtual disks 665. The virtual disk control table 661, the storage resources control table 663, and the storage power control table 664 may respectively be similar to the virtual disk control table 622, the storage resources control table 621, and the storage power control table 625 managed by the control terminal 150. The control terminal 150 may collect pieces of information held in the tables of the storage hypervisor 612, and may hold the collected pieces of information in the tables of the control terminal 150.

Referring to FIG. 9, the virtual disk 662 will be described below in detail.

The virtual disk 665 is generated by dividing storage resources of the physical storage system 611 into logical partitions by the storage hypervisor 612.

The virtual storage system (0) 613A includes at least virtual channel adaptors (0) 666A and (1) 666B, disk cache resources 667A, CPU resources 668A, internal network resources 669A, and one or more logical units 670. Similarly, the virtual storage system (1) 613B includes at least virtual channel adaptors (2) 666C and (3) 666D, disk cache resources 667B, CPU resources 668B, internal network resources 669B, and one or more logical units 670. These are virtual resources generated by dividing physical resources of the physical storage system 611 into logical partitions by the storage hypervisor 612.

The logical unit 670 is a logical storage area provided to the server system 100. The OS 603 of the server system 100 recognizes each logical unit 670 as one disk. The logical unit 670 is correlated with the virtual disk 665.

FIG. 6C shows two virtual storage systems 613. However, the storage system 120 may include more virtual storage systems 613 (e.g., virtual storage systems (2) and (3) (not shown)).

FIG. 7 is an explanatory diagram of the server resources control table 623 according to the first embodiment of this invention. The server resources control table 623 holds information for controlling allocation of physical resources to virtual resources of the server system 100.

Specifically, the server resources control table 623 includes five columns of a virtual machine number 701, a CPU utilization rate 702, a memory capacity 703, a virtual I/O adaptor number 704, and I/O adaptor number 705.

An identifier (i.e., parenthesized numeral in FIG. 6A) of the virtual machine 602 is registered in the virtual machine number 701.

The CPU utilization rate 702 and the memory capacity 703 respectively indicate CPU resources 655 and memory resources 656 allocated to each virtual machine 602. For example, in FIG. 7, "20%" and "512 MB" are respectively registered as the CPU utilization rate 702 and the memory capacity 703 corresponding to a value "0" of the virtual machine number 701. This means that 20% of the CPU's (0) 101A and (1) 101B among the physical resources of the physical machine (0) 601A is allocated as the CPU resources 655A of the virtual machine (0) 602A, and a storage area of 512 megabytes (MB) of the main memory 104A is allocated as the memory resources 656A.

An identifier of the virtual I/O adaptor 654 included in each virtual machine 602 is registered in the virtual I/O adaptor number 704.

In the example of FIG. 7, "0" and "1" are registered as the virtual I/O adaptor number 704 corresponding to the value "0" of the virtual machine number 701. "2" and "3" are registered as the virtual I/O adaptor number 704 corresponding to a value "1" of the virtual machine number 701. This means that as shown in FIG. 6B, the virtual machine (0) 602A includes virtual I/O adaptors (0) 654A and (1) 654B, and the virtual machine (1) 602B includes virtual I/O adaptors (2) 654C and (3) 654C.

An identifier of the I/O adaptor 106 allocated to each virtual I/O adaptor 654 is registered in the I/O adaptor 705.

In the example of FIG. 7, "0", "1", "0", and "1" are registered as I/O adaptors 106 corresponding to values "0", "1", "2", and "3" of the virtual I/O adaptor number 704, respectively. This means that the I/O adaptor (0) 106A is allocated to the virtual I/O adaptors (0) 654A and (2) 654C, and the I/O adaptor (1) 106B is allocated to the virtual I/O adaptors (1) 654B and (3) 654D. Accordingly, by allocating one physical resource to a plurality of virtual resources, it is possible to provide more virtual resources than physical resources.

In FIG. 7, information regarding the virtual machines (2) 602C and (3) 602D included in the server system (1) 100B is omitted. However, the server resources control table 623 holds information regarding all the virtual machines 602 in the computer system.

The server resources control table 653 of each server system 100 holds information similar to that shown in FIG. 7. However, the server resources control table 653 may hold information only regarding the virtual machine 602 included in the sever system 100 which holds the table. For example, the server resources control table 653A of the server system (0) 100A may hold information only regarding the virtual machines (0) 602A and (1) 602B.

FIG. 8 is an explanatory diagram of the virtual disk control table 622 according to the first embodiment of this invention.

The virtual disk control table 622 holds information for controlling allocation of a virtual disk 665 to the virtual machine 602.

Specifically, the virtual disk control table 622 includes four columns of a virtual machine number 801, a virtual storage number 802, a logical unit number 803, and a virtual disk number 804.

An identifier of the virtual machine 602 is registered in the virtual machine number 801 as in the case of the virtual machine number 701 of FIG. 7.

An identifier of the virtual disk 665 allocated to the virtual machine 602 is registered in the virtual disk number 804.

An identifier of the logical unit 670 correlated with the virtual disk 665 allocated to the virtual machine 602 is registered in the logical unit number 803.

An identifier of the virtual storage system 613 to which the logical unit 670 allocated to the virtual machine 602 belongs is registered in the virtual storage system 802.

In the example of FIG. 8, the three logical units 670 of the virtual storage system (0) 613A are allocated to the virtual machine (0) 602A. Identifiers of these logical units 670 are respectively "0", "1" and "2". The logical units 670 are correlated with the virtual disks 665 respectively having identifiers "121", "122", and "123".

In the example of FIG. 8, one virtual storage system 613 is allocated to one virtual machine 602. However, a plurality of virtual machines 602 may share one virtual storage system 613. In this case, a plurality of values (identifiers) are registered as virtual storage numbers 802 corresponding to a value of one virtual machine number 801.

In the example of FIG. 8, one virtual disk 665 is correlated with one logical unit 670. However, a plurality of virtual disks 665 may be correlated with one logical unit 670. In this case, a plurality of values (identifiers) are registered as virtual disk numbers 804 corresponding to a value of one logical unit number 803.

In FIG. 8, information regarding the virtual machines (2) 602C and (3) 602D included in the server system (1) 100B is omitted. However, the virtual disk control table 622 holds information for managing allocation of the virtual disk 665 regarding all the virtual machines 602 in the computer system.

The virtual disk control table 652 of each server system 100 also holds information similar to that shown in FIG. 8. However, the virtual disk control table 652 may hold information only regarding the virtual machine 602 included in the sever system 100 which holds the table. For example, the virtual disk control table 652A of the server system (0) 100A may hold information only regarding the virtual disks 665 allocated to the virtual machines (0) 602A and (1) 602B.

The virtual disk control table 661 of the storage system 120 also holds information similar to that shown in FIG. 8. When the computer system includes a plurality of storage systems 120, the virtual disk control table 661 may hold information only regarding the virtual disk 665 of the storage system 120 which holds the table.

FIG. 9 is an explanatory diagram of the disk address translation table 662 according to the first embodiment of this invention.

The disk address translation table 662 holds information for managing a correlation between the virtual disk 665 and the physical disk drive 148 allocated to the virtual disk 665.

Specifically, the disk address translation table 662 includes four columns of a virtual disk number 901, a virtual block address 902, a physical disk number 903, and a physical block address 904.

An identifier of the virtual disk 665 is registered in the virtual disk number 901.

A virtual block address for uniquely, in each virtual disk 665, identifying a logical block of the virtual disk 665 is registered in the virtual block address 902.

An identifier of the physical disk drive 148 allocated to the virtual disk 665 is registered in the physical disk number 903.

A physical block address for uniquely, in each physical disk drive 148, identifying a logical block of the physical disk drive 148 allocated to the virtual disk 665 is registered in the physical block address 904.

The logical block is an area of a predetermined size treated as a management unit of a storage area. For example, when SCSI Standard is applied, the logical block is a storage area of 512 bytes.

In the example of FIG. 9, "0x00000000" and "0x80000000" are registered as virtual block addresses 902 corresponding to a value "121" of the virtual disk number 901. "8" and "9" are respectively registered as physical disk numbers 903 corresponding to the values "0x00000000" and "0x80000000" of the virtual block addresses 902. "0x00000000" and "0x00000000" are registered as physical block addresses 904 corresponding to the values "0x00000000" and "0x80000000" of the virtual block addresses 902.

This means that an area starting from the address "0x00000000" of the physical disk drive 148 having the identifier "8" is allocated to an area starting from the address "0x00000000" of the virtual disk 665 having the identifier "121", and an area starting from the address "0x00000000" of the physical disk block address 148 having the identifier "9" is allocated to an area starting from the address "0x80000000" of the virtual disk 665 having the identifier "121".

FIG. 10 is an explanatory diagram of the storage resources control table 621 according to the first embodiment of this invention.

The storage resources control table 621 holds information for controlling allocation of a virtual storage system 613 to the virtual machine 602 and physical resources to virtual resources of the storage system 120.

Specifically, the storage resources control table 621 includes ten columns of a virtual machine number 1001, a virtual storage system number 1002, a virtual disk number 1003, a disk cache capacity 1004, a CPU 1005 in charge, an internal bandwidth 1006, a virtual channel adaptor 1007, a channel adaptor 1008, an I/O adaptor 1009, and a virtual I/O adaptor 1010.

The virtual machine number 1001, the virtual storage system number 1002, and the virtual disk number 1003 are respectively similar to the virtual machine number 801, the virtual storage number 802, and the virtual disk number 804 of FIG. 8, and thus description thereof will be omitted.

A capacity of the disk cache 144 allocated as a disk cache resource 667 of each virtual storage system 613 is registered in the disk cache capacity 1004.

Identifiers of the CPU's 122 and 133 allocated as CPU resources 668 of each virtual storage system 613 are registered in the CPU 1005 in charge.

A bandwidth of the internal network 131 allocated as an internal network resource 669 included in each virtual storage system 613 is registered in the internal bandwidth 1006.

An identifier of the virtual channel adaptor 666 included in each virtual storage system 613 is registered in the virtual channel adaptor 1007.

An identifier of the channel adaptor 129 allocated as a virtual channel adaptor 666 of each virtual storage system 613 is registered in the channel adaptor 1008.

An identifier of the virtual I/O adaptor included in each virtual storage system 613 is registered in the virtual I/O adaptor 1010.

An identifier of the I/O adaptor 139 allocated as a virtual I/O adaptor of each virtual storage system 613 is registered in the I/O adaptor 1009.

The storage resources control table 663 of the storage system 120 also holds information similar to that shown in FIG. 10. However, when the computer system includes a plurality of storage systems 120, the storage resources control table 663 of each storage system 120 may hold information only regarding the storage system 120. In this case, the storage resources control table 621 may hold information regarding all the storage systems collected from all the storage systems 120 of the computer system.

FIG. 11 is an explanatory diagram of the server power control table 624 according to the first embodiment of this invention.

The server power control table 624 holds information for controlling a power state of each resource of the server system 100.

Specifically, the server power control table 624 includes four columns of a resource classification 1101, a resource 1102, a power state 1103, and a used virtual machine number 1104.

The resource classification 1101 indicates that each resource registered in the server power control table 624 is a physical or virtual resource. A value "P" of the resource classification 1101 indicates a physical resource, and a value "V" indicates a virtual resource.

Names and identifiers of physical and virtual resources included in the server system 100 are registered in the resource 1102.

A value of indicating power state of each resource such as "full on" or "off" is registered in the power state 1103. "Full on" means that power is input to a resource and the resource is fully running. "Off" means cutting of power supplied to the resource. Alternatively, "sleep" indicating partial cutting of power supplied to the resource, "power saving mode" for lowering a performance and suppressing power consumption, or the like may be registered in the power state 1103. "Off" may be distinguished between so-called mechanical off and soft off.

An identifier of the virtual machine 602 using each physical resource (i.e., virtual machine 602 to which each physical resource is allocated) is registered in the used virtual machine number 1104. "none (n/a)" is set in the used virtual machine number 1104 corresponding to the virtual resource.

In FIG. 11, information regarding resources included in the server system (1) 100B is omitted. However, the server power control table 624 holds information for managing power states of resources included in all the server systems 100 of the computer system.

The server power control table 651 of each server system 100 holds information similar to that shown in FIG. 11. However, the server power control table 651 may hold information only regarding resources included in the sever system 100 which holds the table. For example, the server power control table 651 of the server system (0) 100A may hold information only regarding resources included in the server system (0) 100A.

FIG. 12 is an explanatory diagram of the storage power control table 625 according to the first embodiment of this invention.

The storage power control table 625 holds information for controlling a power state of each resource of the storage system 120.

Specifically, the storage power control table 625 includes four columns of a resource classification 1201, a resource 1202, a power state 1203, and a used virtual machine number 1204.

As in the case of the resource classification 1101, the resource classification 1201 indicates that each resource registered in the storage power control table 625 is a physical or virtual resource.

Names and identifiers of physical and virtual resources included in the storage system 120 are registered in the resource 1202.

The power state 1203 indicates a power state of each resource as in the case of the power state 1103.

An identifier of the virtual storage system 613 using each physical resource (i.e., virtual storage system 613 to which each physical resource is allocated) is registered in the used virtual storage system number 1204. "none (n/a)" is set in the used virtual storage system number 1204 corresponding to the virtual resource.

The storage power control table 664 of the storage system 120 also holds information similar to that shown in FIG. 12. However, when the computer system includes a plurality of storage systems 120, the storage power control table 664 of each storage system 120 may hold information only regarding the storage system 120.

Figure 13:
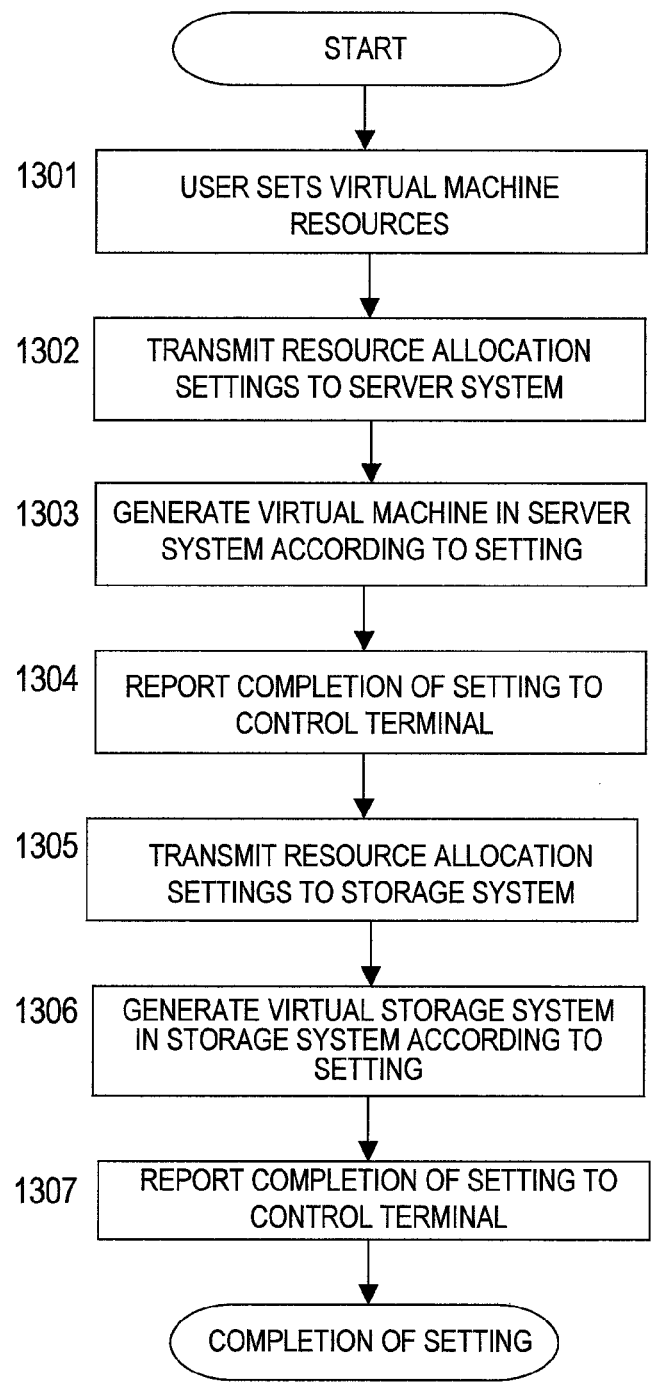
FIG. 13 is a flowchart of resource allocation setting processing executed according to the first embodiment of this invention.

FIG. 13 is a flowchart showing resource allocation setting processing executed according to the first embodiment of this invention.

First, the user operates the control terminal 150 to set physical resources to be allocated to the virtual machine 602 and the virtual storage system 613 (1301).

The control terminal 150 transmits contents set for the virtual machine 602 in Step 1301 to the server system 100 (1302).

The hypervisor 103 of the server system 100 generates a virtual machine 602 according to the setting transmitted from the control terminal 150 (1303).

Then, the server system 100 reports setting completion to the control terminal 150 (1304).

Next, the control terminal 150 transmits contents set for the virtual storage system 613 in Step 1301 to the storage system 120 (1305).

The storage hypervisor 612 of the storage system 120 generates a virtual storage system 613 according to the setting transmitted from the control terminal 150 (1306).

Then, the storage system 120 reports setting completion to the control terminal 150 (1307).

Thus, the resource allocation setting processing is finished.

Figure 14:
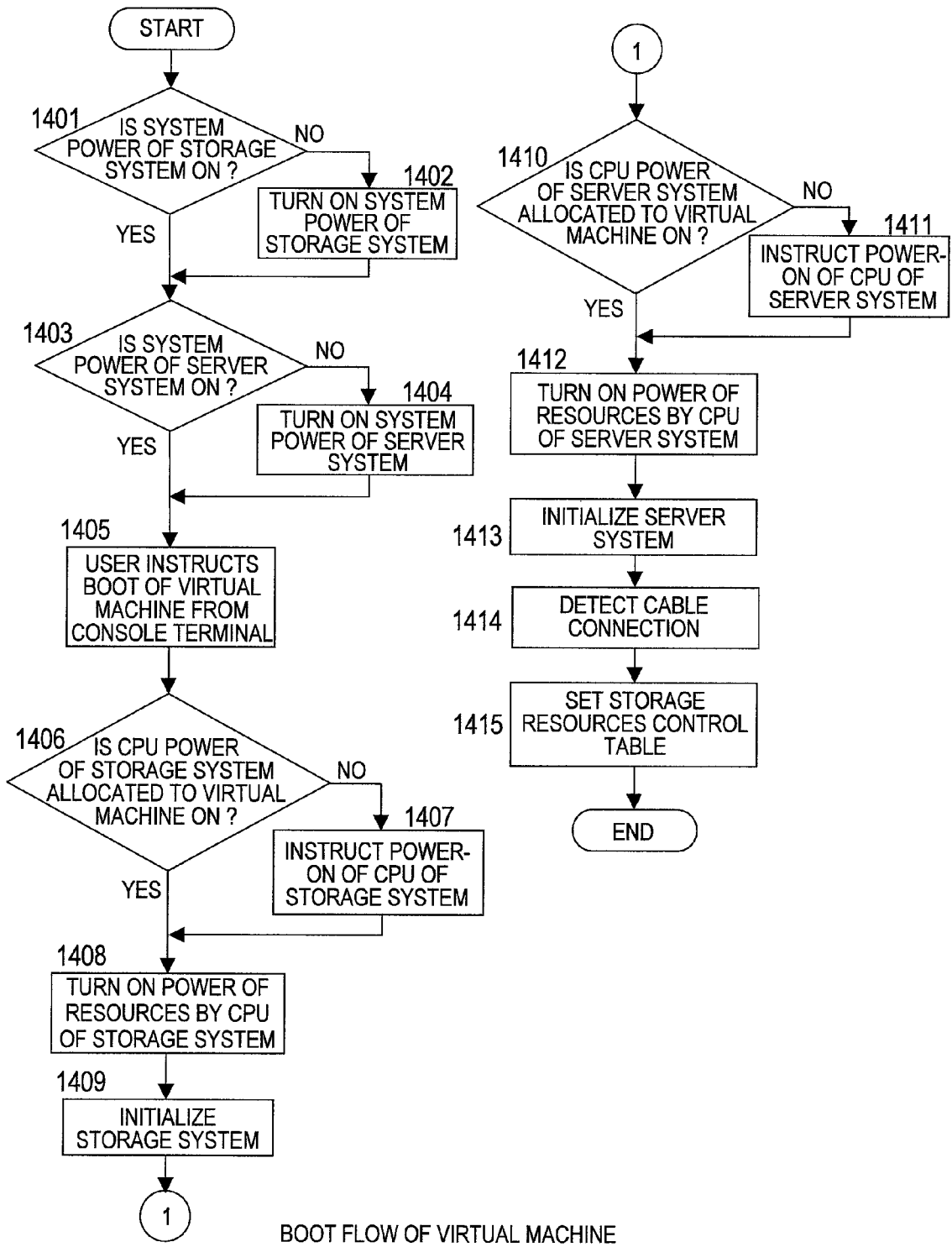
FIG. 14 is a flowchart of boot processing of a virtual machine executed according to the first embodiment of this invention.

FIG. 14 is a flowchart of boot processing of the virtual machine 602 executed according to the first embodiment of this invention.

First, the user determines whether the system power switch 302 of the storage system 120 has been turned on (1401).

If it is determined in Step 1401 that the system power switch 302 has been turned on, the process proceeds to Step 1403. On the other hand, if it is determined in Step 1401 that the system power switch 302 has not been turned on (i.e., power has been cut), the user turns on the system power switch 302 (1402).

Next, the user determines whether the system power switch 202 of the server system 100 has been turned on (1403).

If it is determined in Step 1403 that the system power switch 202 has been turned on, the process proceeds to Step 1405. On the other hand, if it is determined in Step 1403 that the system power switch 202 has not been turned on, the user turns on the system power switch 202 (1404).

Then, the user operates a console terminal to instruct boot of the virtual machine 602 (1405). The console terminal is a computer connected to each server system 100 to operate each server system 100. According to the first embodiment, the control terminal 150 is used as a console terminal.

The control terminal 150 determines whether the CPU 122 or the like allocated to the virtual machine 602 to be booted among the CPU 122 and the like of the storage system 120 has been turned on (1406). For this determination, the storage power control table 625 is referred to. In the explanation of FIG. 14, the CPU 122 or the like (i.e., the CPU 122 or the CPU 133) allocated to the virtual machine 602 to be booted is described as a relevant CPU 122 or the like. The allocation of the CPU 122 or the like is set by processing shown in FIG. 13.

If it is determined in Step 1406 that the relevant CPU 122 or the like has been turned on, the process proceeds to Step 1408. On the other hand, if it is determined in Step 1406 that the relevant CPU 122 or the like has not been turned on, the control terminal 150 transmits an instruction to turn on the relevant CPU 122 or the like to the storage system 120 (1407). This instruction reaches the LAN adaptors 127 and 138 of the storage system 120 via the network 170. Alternatively, the following method may be employed. When the system power is turned on, at least one CPU 122 is operated. The CPU 122 executes the storage hypervisor 137, the control terminal 150 transmits a booting command of the relevant CPU to the CPU 122, and the storage hypervisor 137 boots the relevant CPU 122.

Next, the relevant CPU 122 or the like turns on each resource of the storage system 120 (1408). This power-on is executed by the power control units 123 and 134 of the storage system 120 which has received the instruction of Step 1407.

The storage system 120 executes initial setting processing of the storage system 120 (1409).

Then, the control terminal 150 determines whether the CPU 101 allocated to the virtual machine 602 to be booted among the CPU's 101 of the server system 100 has been turned on (1410). For this determination, the server power control table 624 is referred to. In the explanation of FIG. 14, the CPU 101 allocated to the virtual machine 602 to be booted is described as a relevant CPU 101. The allocation of the CPU 101 is set by the processing shown in FIG. 13.

If it is determined in Step 1410 that the relevant CPU 101 has been turned on, the process proceeds to Step 1412. On the other hand, if it is determined in Step 1410 that the relevant CPU 101 has not been turned on, the control terminal 150 transmits an instruction to turn on the relevant CPU 101 to the server system 100 (1411). This instruction reaches the LAN adaptor 105 of the server system 100 via the network 170. Alternatively, the following method may be employed. When the system power is turned on, at least one CPU 105 is operated. The CPU 101 in operation executes the hypervisor 103. the control terminal 150 transmits a booting command of the relevant CPU to the CPU 101 in operation, and the storage hypervisor 103 starts the relevant CPU 101.

Next, the relevant CPU 101 turns on each resource of the server system 100 (1412). This power-on is executed by the power control unit 108 of the server system 100 which has received the instruction of Step 1411.

Next, the server system 100 executes initial setting processing of the server system 100 (1413).

Then, the server system 100 detects how a cable constituting the I/O channel 160 has been connected (Step 1414). This processing may be executed by a method shown in FIG. 15. As a result, it is discovered which of the channel adaptors 129 are connected to which of the I/O adaptors 106 by the I/O channel 160.

Next, referring to FIG. 10, the control terminal 150 creates a storage resources control table 621 based on contents set in FIG. 13 and contents detected in Step 1414 (1415).

Thus, the boot processing of the virtual machine 602 is finished.

Figure 15:
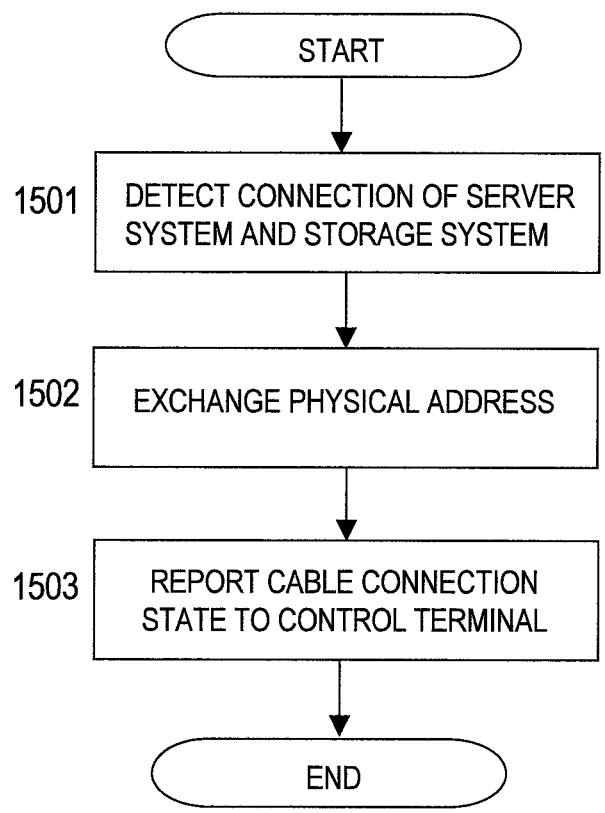
FIG. 15 is a flowchart of processing executed at the time of cable connection according to the first embodiment of this invention.

FIG. 15 is a flowchart of processing executed at the time of cable connection according to the first embodiment of this invention.

The processing of FIG. 15 is executed in each server system 100 and the storage system 120. In the description below, execution by the server 100 is taken as an example, but the storage system 120 executes similar processing.

First, the I/O adaptor 106 of the server system 100 detects connection of the cable (i.e., I/O channel 160) (1501).

Next, the server system 100 exchanges a physical address with an apparatus (e.g., storage system 120 in the examples of FIGS. 1A, 1B, and 1C) communicable via the detected cable (1502). Referring to FIG. 1A, for example, when the server system 100 is connected to the storage system 120, the server system 100 makes an inquiry about a physical address to the storage system 120 to obtain a physical address of the channel adaptor 129 of the storage system 120.

Any physical address may be used for exchanging in Step 1502 as long as a port to connect the cable is uniquely specified. For example, when a fibre channel protocol is applied, the physical address may be a world wide name (WWN). Alternatively, when an iSCSI protocol is applied, the physical address may be a MAC address. The I/O adaptor 106 notifies the physical address obtained by the exchanging to the hypervisor 103.

The hypervisor 103 transmits the obtained cable connection state (i.e., set of physical addresses of mutually connected I/O adaptor 106 and channel adaptor 129) to the control terminal 150 via the network 170 (1503).

Thus, the processing executed at the time of cable connection is finished.

Figure 16:
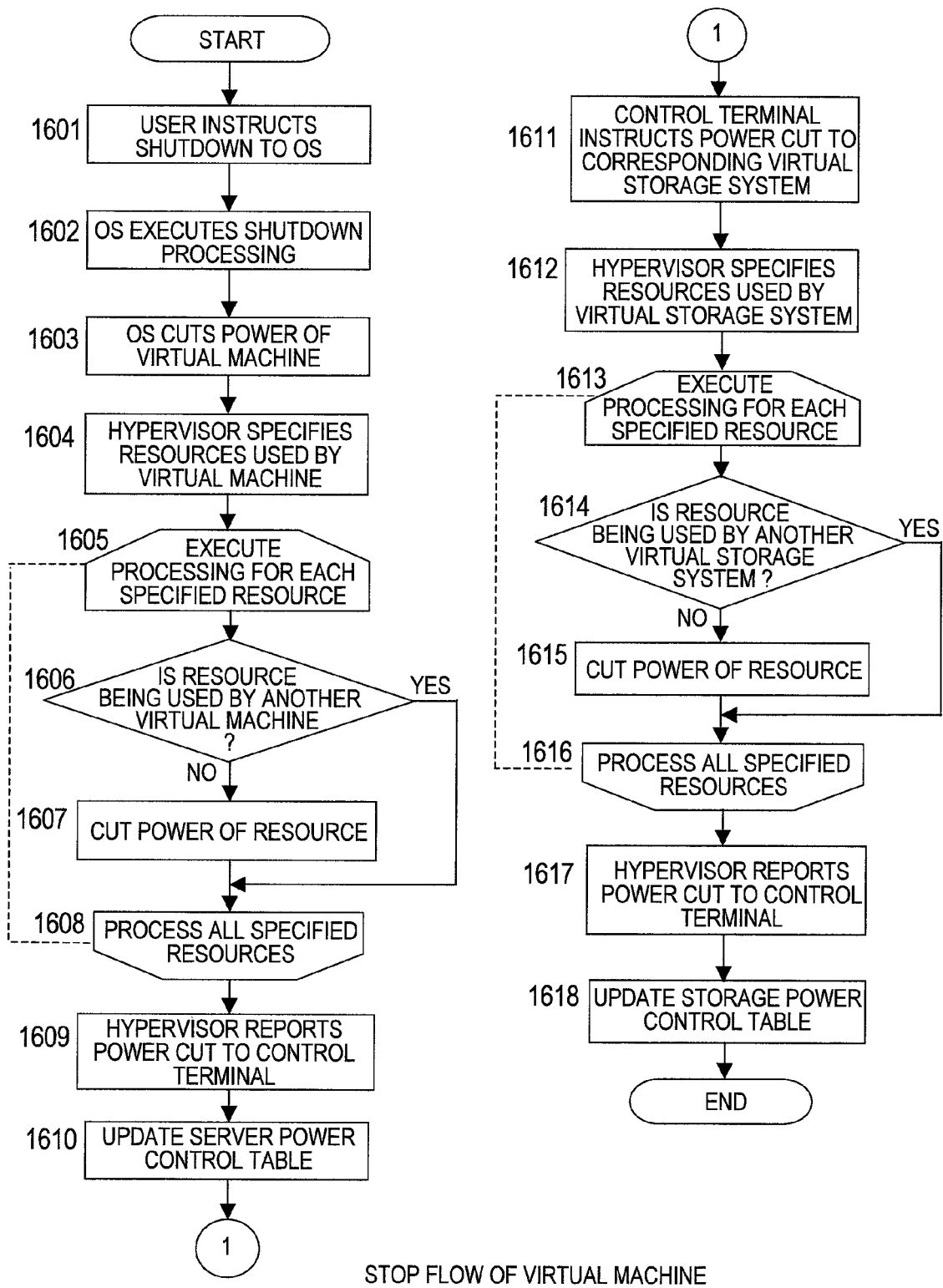
FIG. 16 is a flowchart of shutdown processing of the virtual machine according to the first embodiment of this invention.

FIG. 16 is a flowchart of shutdown processing of the virtual machine 602 executed according to the first embodiment of this invention.

The processing of FIG. 16 is executed when the user powers off one of the virtual machines 602. In the description of FIG. 16, the virtual machine 602 which is to be powered off by the user is described as a relevant virtual machine 602.

First, the user operates the control terminal 150 to instruct shutting-down to the OS 603 operating on the relevant virtual machine 602 (1601).

Next, the OS 603 executes the instructed shutting-down processing (1602).

Then, the OS 603 cuts off power of the relevant virtual machine 602 (1603). However, at this time, the OS 603 only issues a command of cutting of power. In reality, the power has not been cut off.

Next, the hypervisor 103 specifies resources used by the relevant virtual machine 602 (i.e., resources allocated to the relevant virtual machine) (1604).

Then, the hypervisor 103 executes loop processing (1605 to 1608) for each resource specified in Step 1604. In this case, each resource specified in Step 1604 is described as a relevant resource.

In Step 1606, the hypervisor 103 determines whether the relevant resource is used by the other virtual machine 602. In other words, the hypervisor 103 determines whether the relevant resource has also been allocated to the virtual machine 602 other than the relevant virtual machine 602. Specifically, the hypervisor 103 refers to the server power control table 651 to determine whether a used virtual machine number 1104 of an entry corresponding to the relevant resource includes an identifier other than that of the relevant virtual machine 602.

Now, for example, description will be made of a case where the relevant virtual machine 602 is a virtual machine (0) 602A and the relevant resource is a CPU (0) 101A. In this case, the hypervisor 103 refers to an entry where a resource 1102 is "CPU (0)" in the server power control table 651 to determine whether the used virtual machine number 1104 of the entry includes a value other than "0". If the server power control table 651 is as shown in FIG. 11, the used virtual machine number 1104 corresponding to the CPU (0) includes both "0" and "1". In this case, the CPU (0) 101A is also used by the virtual machine (1) 602B. Accordingly, in Step 1606, it is determined that the relevant resource has also been allocated to the virtual machine 602 in addition to the relevant virtual machine 602 (YES).

If it is determined in Step 1606 that the relevant resource has also been allocated to the virtual machine 602 other than the relevant virtual machine, the relevant resource is still used by one of the virtual machines 602. Accordingly, the power of the relevant resource cannot be cut off. In this case, the process proceeds to Step 1608 without cutting off the power of the relevant resource.

On the other hand, if it is determined in Step 1606 that the relevant resource has not been allocated to the virtual machine in addition to the relevant virtual machine 602, after the relevant virtual machine 602 shuts down, the relevant resource is not used by any virtual machines 602. Thus, the hypervisor 103 cuts off power of the relevant resource (1607). In other words, the hypervisor 103 instructs to cut off power to the power control unit 108, and the power control unit 108 cuts off power of the relevant resource.

When the loop processing has not been finished for all the relevant resources, the process returns to Step 1606 to execute processing for remaining relevant resources (1608).

When power of one or more resources is cut off as a result of finishing the loop processing for all the relevant resources, the hypervisor 103 reports the cutting of the power of the resources to the control terminal 150 (1609).

Next, to reflect the reported cutting of power, the control terminal 150 updates the server power control table 624 (1610). Further, to reflect the reported cutting of power, the hypervisor 103 updates the server power control table 651.

Then, the control terminal 150 refers to the storage resources control table 621 to instruct to cut off power to the virtual storage system 613 allocated to the relevant virtual machine 602 (1611). At this time, the control terminal 150 specifies a virtual storage system 613 allocated to the relevant virtual machine 602. The virtual storage system 613 which is to be powered off by that instruction is described as a relevant virtual storage system 613 in the explanation of FIG. 16.

The virtual storage system 613 allocated to the relevant virtual machine 602 is specified by referring to the virtual machine number 1001 and the virtual storage system number 1002 of the storage resources control table 663 (or storage resources control table 621) as shown in FIG. 10. For example, when the relevant virtual machine 602 is a virtual machine (0) 602A, "0" is registered in the virtual storage system number 1002 corresponding to a value "0" of the virtual machine number 1001. Accordingly, in this case, the virtual storage system (0) 613A is specified as a relevant virtual storage system 613.

Next, the storage hypervisor 612 specifies resources allocated to the relevant virtual storage system 613 (1612). To this end, the storage hypervisor 612 refers to the virtual disk control table 661, the disk address translation table 662, and the storage resources control table 663. By referring to the virtual disk control table 661 and the disk address translation table 662, a physical disk drive 148 allocated to the relevant virtual storage system 613 can be specified. By referring to the storage resources control table 663, CPU's 122 and 133, a channel adaptor 129, and an I/O adaptor 139 that are allocated to the relevant virtual storage system 613 can be specified.

Next, the storage hypervisor 612 executes loop processing (1613 to 1616) for each resource specified in Step 1612. In this case, each resource specified in Step 1612 is described as a relevant resource.

In Step 1614, the storage hypervisor 612 determines whether the relevant resource has also been allocated to the virtual storage system 613 other than the relevant virtual storage system 613. This determination is executed by the same method as that shown in Step 1606. Specifically, the storage hypervisor 612 refers to the storage power control table 664 to determine whether a used virtual storage system number 1204 of an entry corresponding to the relevant resource includes an identifier other than that of the relevant virtual storage system 613.

For example, when the relevant virtual storage system 613 is a virtual storage system (0) 613A and the relevant resource is a CPU (4) 122A, by referring to the resource 1202 and the used virtual storage system number 1204 of FIG. 10, it is determined that the CPU (4) 122A is used by both the virtual storage system (0) 613A and the virtual storage system (2) (not shown).

Alternatively, the storage hypervisor 612 may execute determination of Step 1614 by referring to the storage resources control table 663. For example, by referring to the virtual storage system number 1002 and the CPU 1005 in charge shown in FIG. 10, it is discovered that the CPU (4) 122A is used by both the virtual storage system (0) 613A and the virtual storage system (2) (not shown).

If it is determined in Step 1614 that the relevant resource has been allocated to the virtual storage system 613 in addition to the relevant virtual storage system 613, the relevant resource is still used by one of the virtual storage systems 613. Accordingly, the power of the relevant resource cannot be cut off. In this case, the process proceeds to Step 1616 without cutting off the power of the relevant resource.

On the other hand, if it is determined in Step 1614 that the relevant resource has not been allocated to the virtual storage system 613 other than the relevant virtual storage system 613, after the relevant virtual storage system 613 stops, the relevant resource is not used by any virtual storage systems 613. Thus, the storage hypervisor 612 cuts off power of the relevant resource (1615). In other words, the storage hypervisor 137 instructs to cut off power to the power control units 123 and 134, and the power control unit 123 and 134 cuts off power of the relevant resource.

When the loop processing has not been finished for all the relevant resources, the process returns to Step 1604 to execute processing for remaining relevant resources (1616).

When power of one or more resources is cut off as a result of finishing the loop processing for all the relevant resources, the storage hypervisor 612 reports the cutting of the power of the resources to the control terminal 150 (1617).

Next, to reflect the reported cutting of power, the control terminal 150 updates the storage power control table 625 (1618). Further, to reflect the reported cutting of power, the storage hypervisor 612 updates the storage power control table 664.

Thus, the shutdown processing of the virtual machine 602 is finished.

By executing the processing shown in FIG. 16, when the virtual machine 602 shuts down, the power of the physical resources allocated to the virtual machine 602 alone is cut off. Additionally, when the virtual storage system 613 is allocated to the virtual machine 602, the power of the physical resources allocated to the virtual storage system 613 alone is cut off. As a result, power consumption can be reduced in the entire computer system including the server system 100 and the storage system 120.

Next, a second embodiment of this invention will be described. Differences of the second embodiment from the first embodiment will mainly be described below. Thus, points of the second embodiment not described are similar to those of the first embodiment.

Figure 17A:
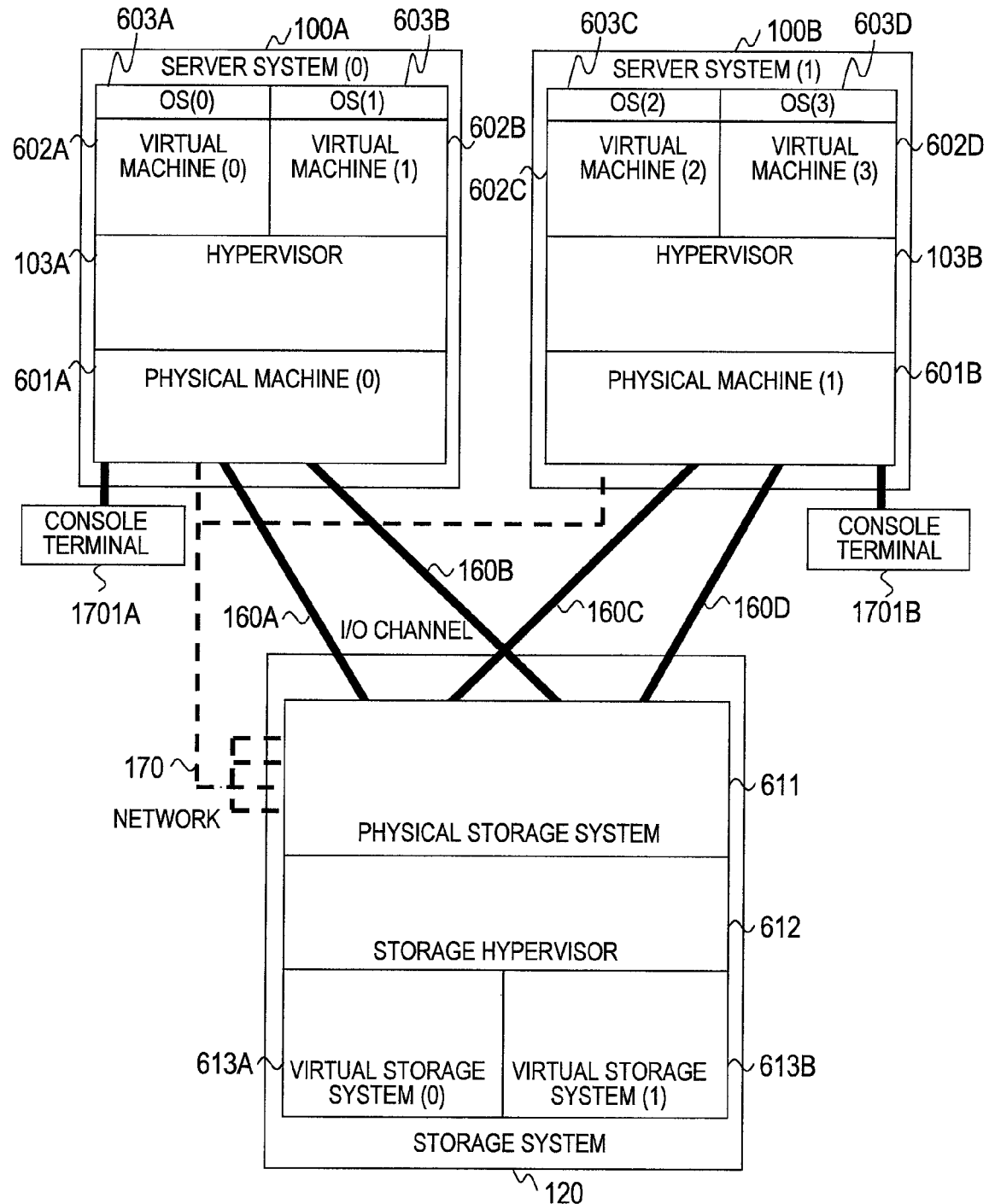
FIG. 17A is a functional block diagram of a computer system according to a second embodiment of this invention.

FIG. 17A is a functional block diagram of a computer system according to the second embodiment of this invention.

According to the first embodiment, the control terminal 150 holds the information for controlling the entire computer system, and controls the entire computer system. According to the second embodiment, however, one of server systems 100 holds information for controlling the entire computer system, and controls the entire computer system.

Thus, the computer system of the second embodiment includes no control terminal 150 unlike the first embodiment. Instead, console terminals 1701A and 1701B are respectively connected to the server systems (0) 100A and (1) 100B. The console terminal 1701 is a computer for operating each server system 100.

A storage system 120, an I/O channel 160, and a network 170 of the second embodiment are similar to those of the first embodiment, and thus description thereof will be omitted.

Figure 17B:
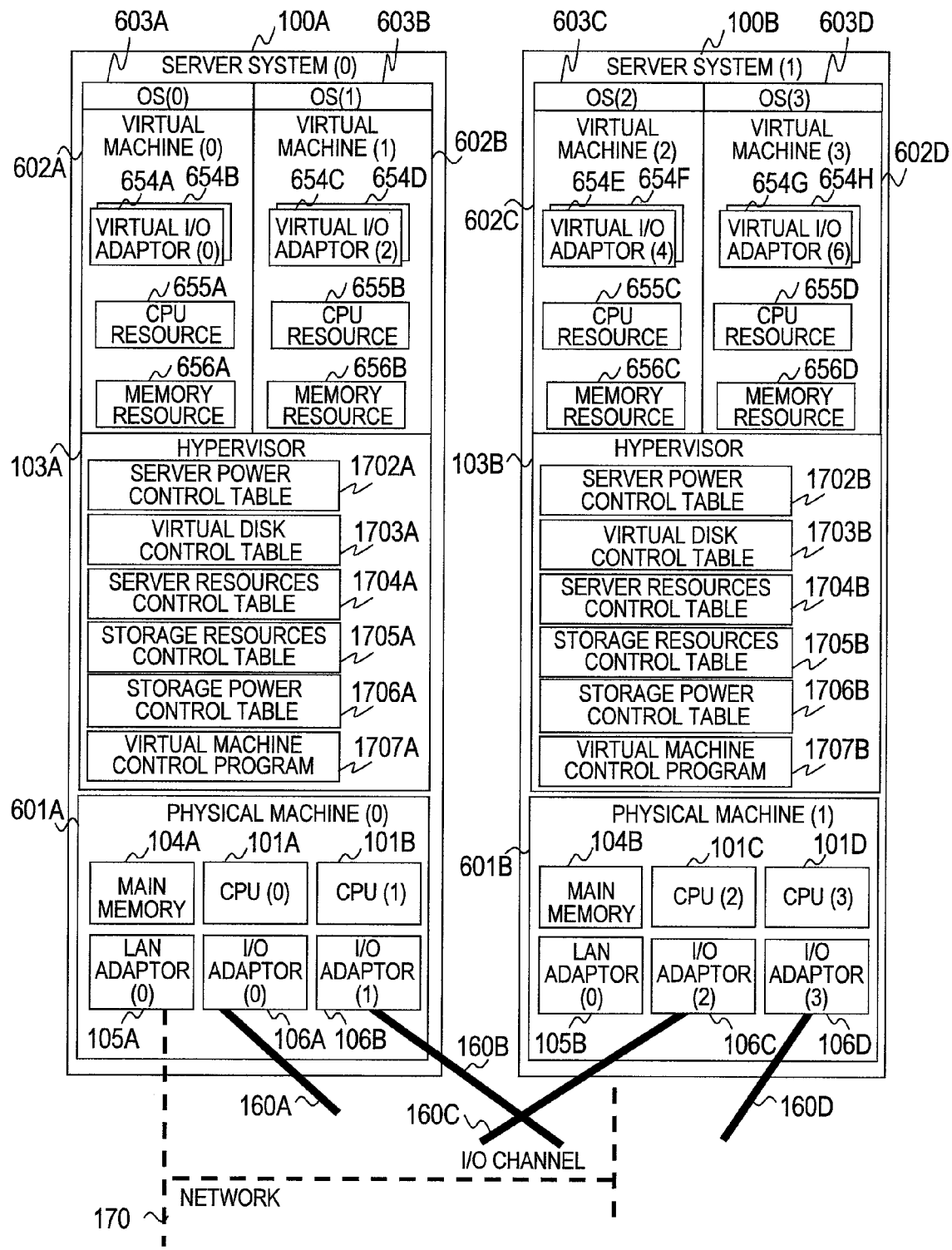
FIG. 17B is a functional block diagram of a server system according to the second embodiment of this invention.

FIG. 17B is a functional block diagram of the server system 100 according to the second embodiment of this invention.

The server system 100 of the second embodiment is similar to that of the first embodiment except for tables and programs included in a hypervisor 103.

The hypervisor 103 of the second embodiment includes a server power control table 1702, a virtual disk control table 1703, a server resources control table 1704, a storage resources control table 1705, a storage power control table 1706, and a virtual machine control program 1707. The server power control table 1702, the virtual disk control table 1703, the server resources control table 1704, the storage resources control table 1705, and the storage power control table 1706 hold information for controlling the entire computer system. These tables are respectively similar to the server power control table 624, the virtual disk control table 622, the server resources control table 623, the storage resources control table 621, and the storage power control table 625 of the first embodiment, and thus description thereof will be omitted.

As in the case of the first embodiment, one of the server systems (0) 100A and (1) 100B may include a hypervisor 103 which includes a server power control table 651, a virtual disk control table 652, and a server resources control table 653. This is because at least one of a plurality of server systems 100 needs to control the computer system. To increase fault tolerance of the computer system, however, as shown in FIG. 17B, the plurality of server systems 100 preferably hold information for controlling the entire computer system.

Hereinafter, according to the second embodiment described below, the sever system 100 means one of one or more server systems 100 which hold information for controlling the entire computer system.

A hardware configuration of the computer system of the second embodiment is similar to that of the computer system of the first embodiment except for the console terminal 1701 disposed in place of the control terminal 150 as shown in FIGS. 1A, 1B, 1C, 1D, and 1E. Thus, description of the hardware configuration of the computer system of the second embodiment will be omitted.

Figure 18:
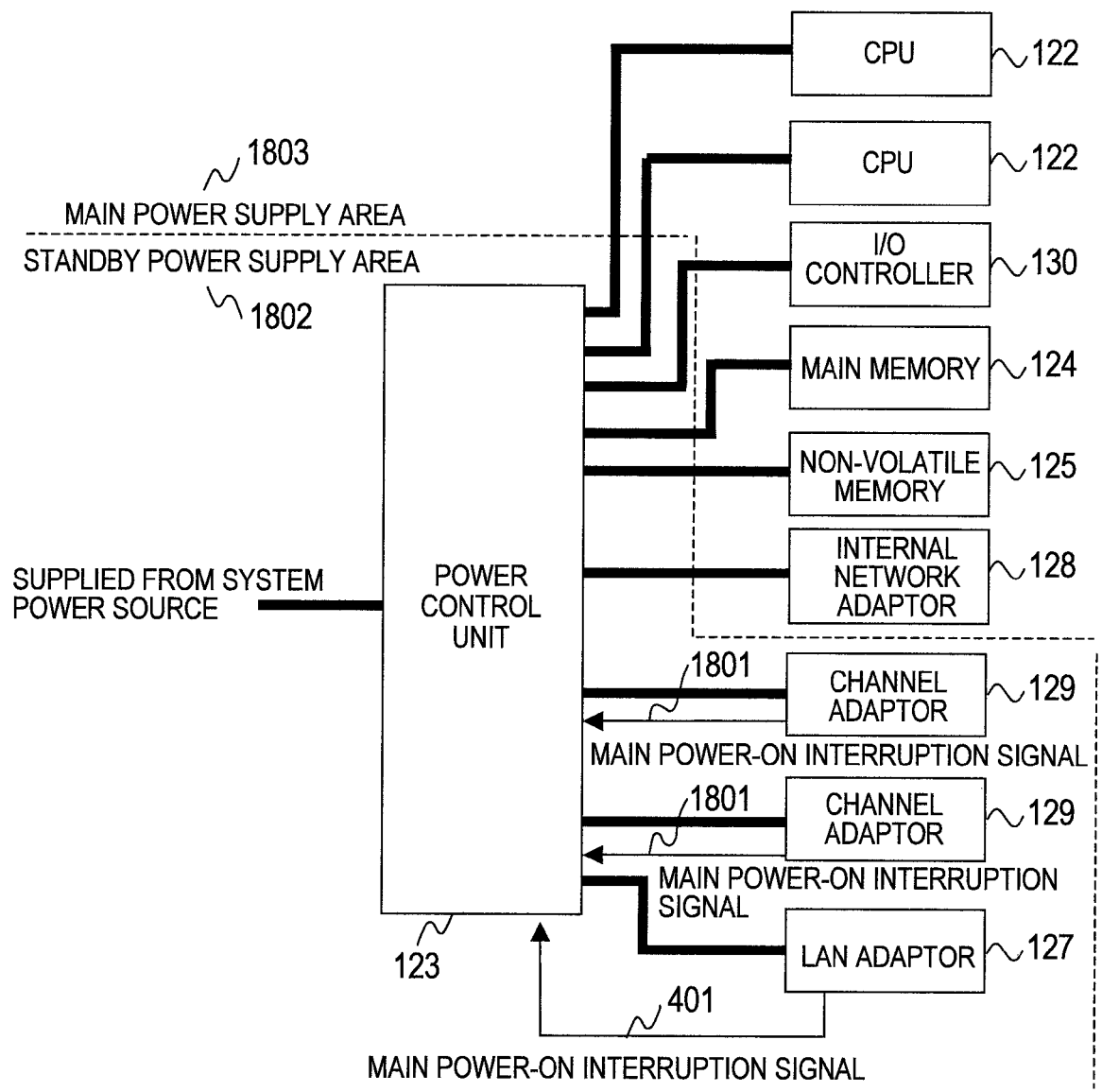
FIG. 18 is an explanatory diagram of a power supply system of a channel board of a storage system according to the second embodiment of this invention.

FIG. 18 is an explanatory diagram of a power supply system of a channel board 121 of the storage system 120 according to the second embodiment of this invention.

The power supply system of the channel board 121 of the storage system 120 of the second embodiment is almost similar to that of the first embodiment as shown in FIG. 4. However, a boundary between a main power supply area and a standby power supply area is different. Hereinafter, only differences of FIG. 18 from FIG. 4 will be described.

CPUs 122, an I/O controller 130, a main memory 124, a non-volatile memory 125, and an internal network adaptor 128 of the second embodiment belong to a main power supply area 1803. On the other hand, channel adaptors 129 and a LAN adaptor 127 belong to a standby power supply area 1802. Power of the standby power supply area 1802 is not cut off by a power control unit 123. On the other hand, power of the main power supply area 1803 is controlled by the power control unit 123.

According to the first embodiment, the instruction of supplying/cutting of power is transmitted from the control terminal 150 to the server system 100 and the storage system 120 via the network 170 (so-called out-band). On the other hand, according to the second embodiment, an instruction of supplying/cutting of power is transmitted from the server system 100 to the storage system 120. In this case, the instruction may be transmitted via a network 170 (so-called out-band), or via the I/O channel 160 (so-called in-band).

When the instruction of power-on is transmitted via the I/O channel 160, the channel adaptor 129 must belong to the standby power supply area 1802 so that the instruction of power-on can be received while the power of the main power supply area 1803 is cut-off. Upon reception of the instruction of power-on, the channel adaptor 129 transmits a main power-on interruption signal 1801 to the power control unit 123. The main power-on interruption signal 1801 is a signal similar to the main power-on interruption signal 401.

Figure 19:
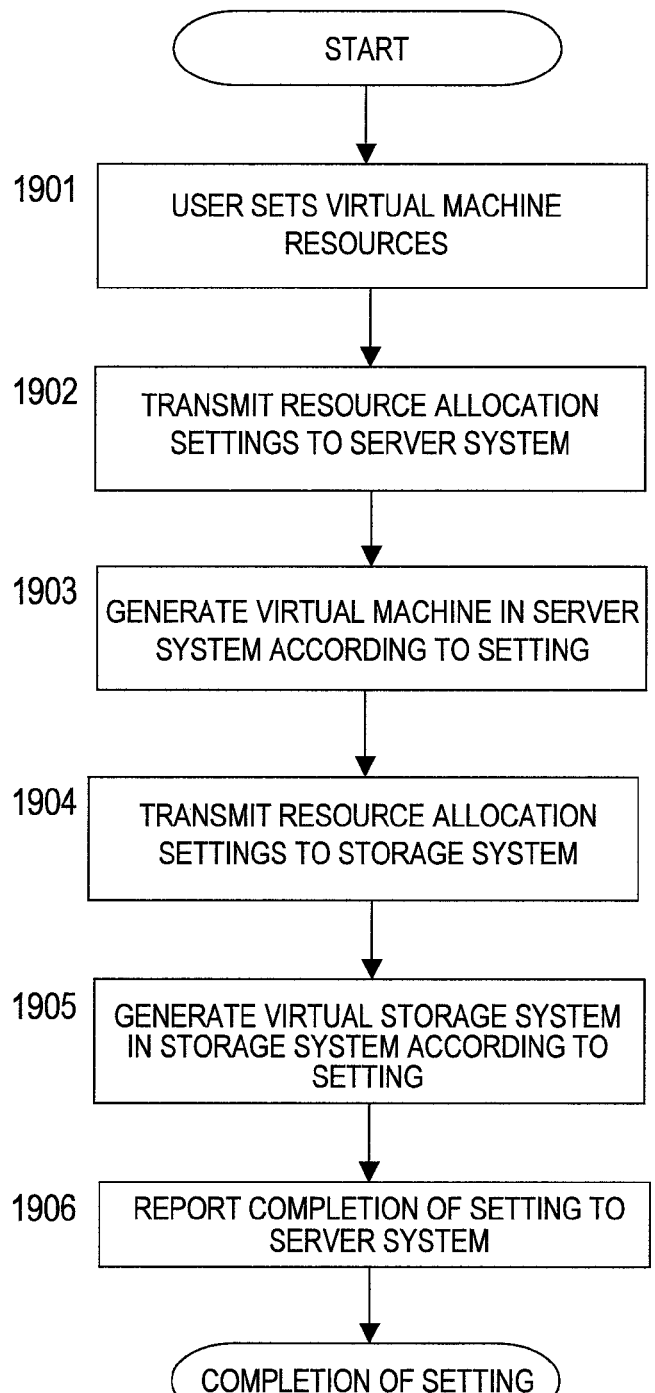
FIG. 19 is a flowchart of resource allocation setting processing executed according to the second embodiment of this invention.

FIG. 19 is a flowchart of resource allocation setting processing executed according to the second embodiment of this invention.

The resource allocation setting processing executed according to the second embodiment is similar to that executed according to the first embodiment shown in FIG. 13 except for some Steps. Differences of the processing of FIG. 19 from the processing of FIG. 13 will be described.

Steps 1901 to 1903 of FIG. 19 respectively correspond to Steps 1301 to 1303 of FIG. 13. Steps 1904 to 1906 of FIG. 19 respectively correspond to Steps 1305 to 1307 of FIG. 13.

The computer system of the second embodiment includes no control terminal 150. Accordingly, in Step 1901, the user operates the console terminal 1701 to set physical resources to be allocated to the virtual machine 602 and the virtual storage system 613. In Step 1902, the console terminal 1701 transmits set contents to the server system 100. In Step 1904, the server system 100 transmits contents set for the virtual storage system 613 to the storage system 120. In Step 1906, the storage system 120 reports setting completion to the server system 100.

Figure 20:
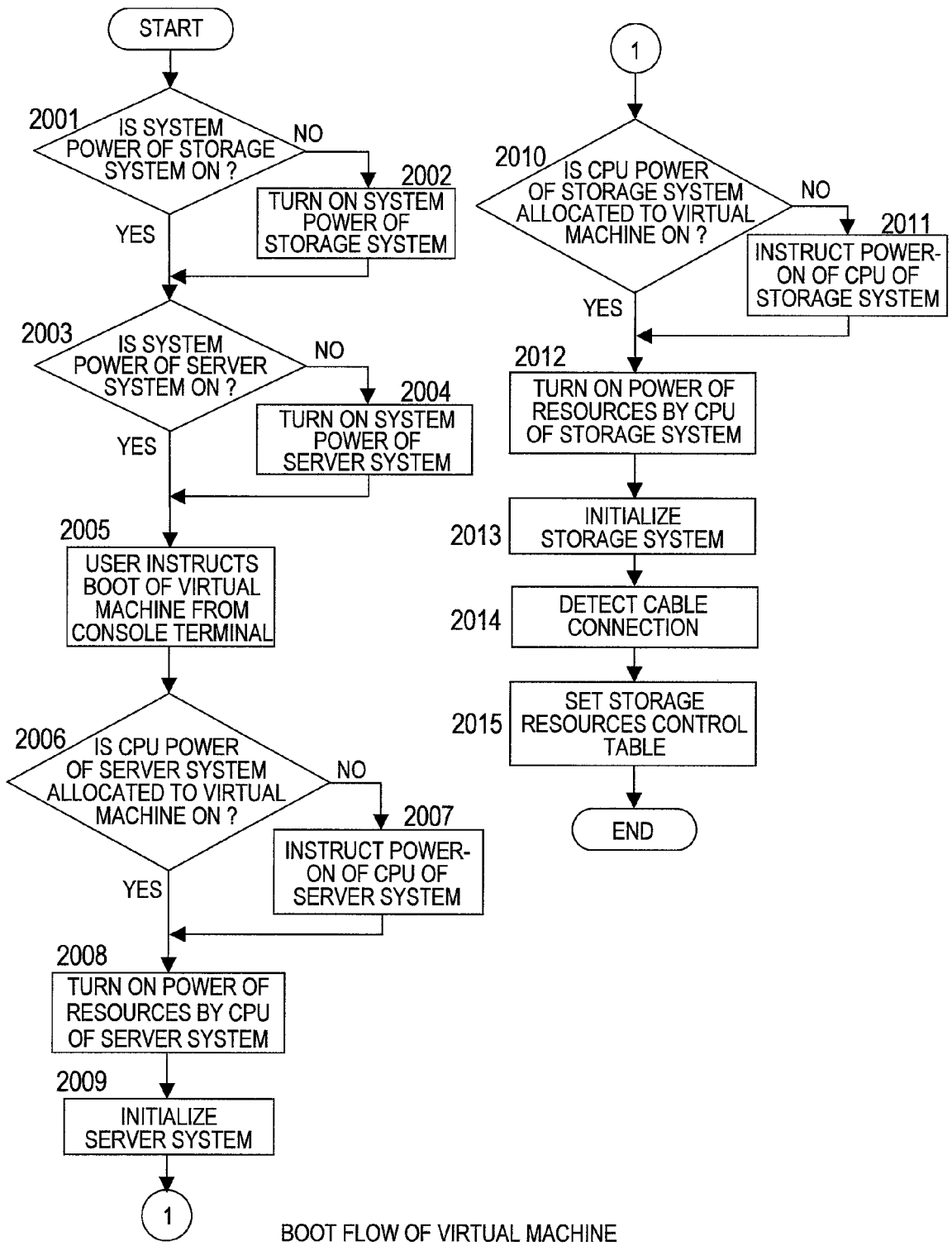
FIG. 20 is a flowchart of boot processing of a virtual machine executed according to the second embodiment of this invention.

FIG. 20 is a flowchart of boot processing of the virtual machine 602 executed according to the second embodiment of this invention.

In FIG. 20, processing of Steps 2001 to 2004 is similar to that of Steps 1401 to 1404 of FIG. 14. Thus, description of these Steps will be omitted.

In Step 2005, the user operates the console terminal 1701 to instruct booting of the virtual machine 602.

Then, a hypervisor 103 determines whether power of a CPU 101 (in the explanation of FIG. 20, described as relevant CPU 101) allocated to the virtual machine 602 to be booted among CPU's 101 of the server system has been turned on (2006). For this determination, a server power control table 1702 is referred to. The allocation of the CPU 101 is set by processing shown in FIG. 19.

If it is determined in Step 2006 that the relevant CPU 101 has been turned on, the process proceeds to Step 2008. On the other hand, if it is determined in Step 2006 that the relevant CPU 101 has not been turned on, the hypervisor 103 issues an instruction of power-on of the relevant CPU 101 to the relevant CPU 101 (2007).

Next, the relevant CPU 101 turns on each resource of the server system 100 (2008).

Then, the server system 100 executes initial setting processing of the server system 100 (2009).

Then, the hypervisor 103 determines whether the CPU 122 or the like (in the explanation of FIG. 20, described as relevant CPU 122 or the like) allocated to the virtual machine 602 to be booted among the CPU's 122 and 133 of the storage system 120 has been turned on (2010). For this determination, the storage power control table 1706 is referred to. The allocation of the CPU 122 or the like is set by processing shown in FIG. 19.

If it is determined in Step 2010 that the relevant CPU 122 or the like has been turned on, the process proceeds to Step 2012. On the other hand, if it is determined in Step 2010 that the relevant CPU 122 or the like has not been turned on, the hypervisor 103 transmits an instruction of power-on of the relevant CPU 122 or the like to the storage system 120 (2011). This instruction reaches LAN adaptors 127 and 138 of the storage system 120 via the network 170.

Next, the relevant CPU 122 or the like turns on each resource of the storage system 120 (2012).

Then, the storage system 120 executes initial setting processing of the storage system 120 (2013).

Then, the hypervisor 103 detects how a cable constituting the I/O channel 160 has been connected (2014). This processing may be executed by a method shown in FIG. 15. As a result, it is discovered which of the channel adaptors 129 are connected to which of the I/O adaptors 106 by the I/O channel 160.

Next, the virtual machine control program 1707 of the hypervisor 103 creates a storage resources control table 1705 based on contents set in FIG. 19 and contents detected in Step 2014 (2015).

Thus, the boot processing of the virtual machine 602 is finished.

In Step 2011, the instruction of power-on of the CPU 122 or the like is transmitted to the storage system 120 via the network 170. It is because data cannot be transmitted via the I/O channel 160 before the connection state of the cable is detected in Step 2014. On the other hand, after it has been discovered which of the I/O adaptors 106 is connected to which of the channel adaptors 129 as a result of detecting the connection state of the cable, the server system 100 can transmit the instruction of supplying/cutting of power to the storage system 120 via the I/O channel 160 (i.e., so-called in-band).

Figure 21:
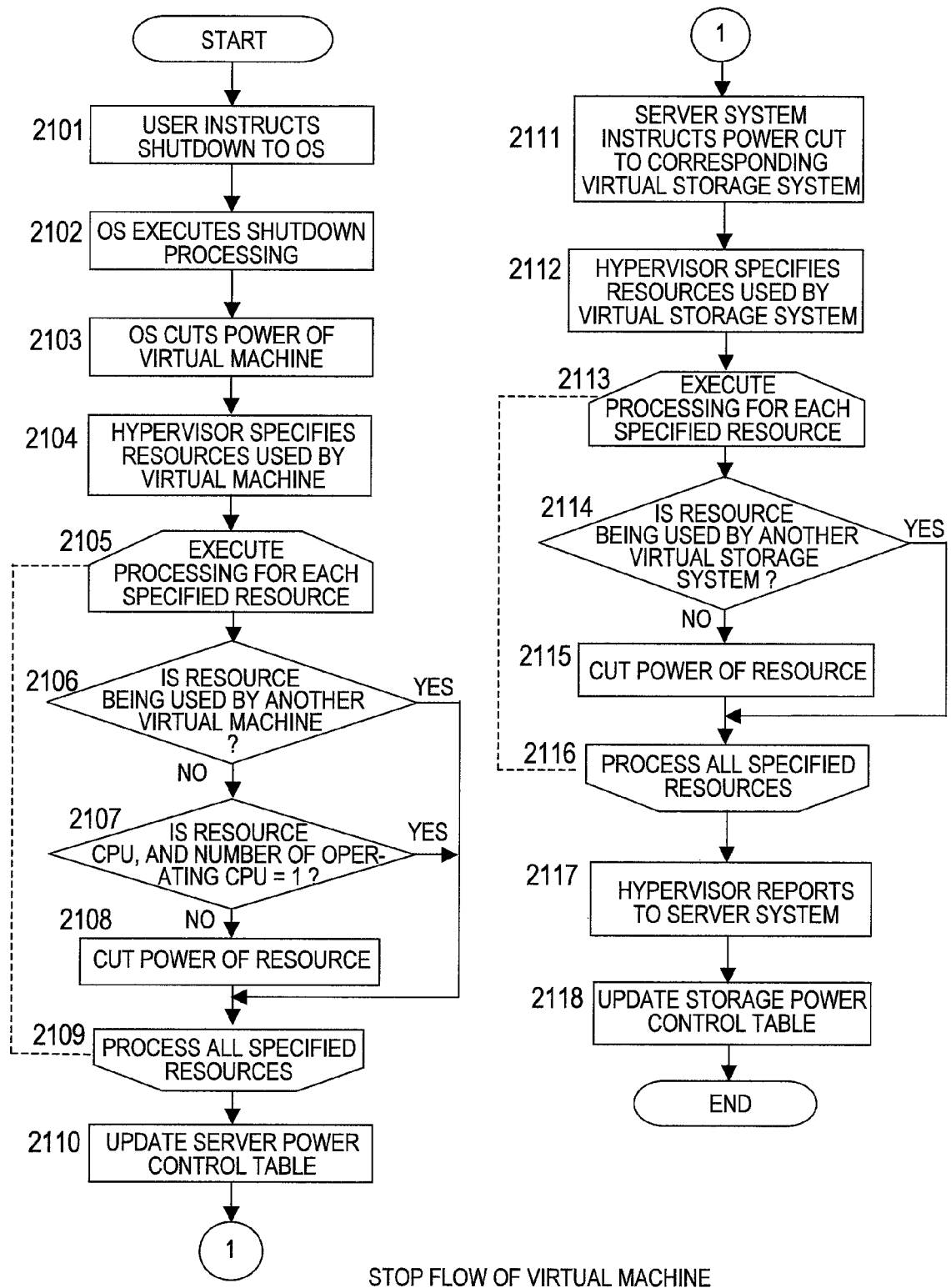
FIG. 21 is a flowchart of shutdown processing of the virtual machine executed according to the second embodiment of this invention.

FIG. 21 is a flowchart of shutdown processing of the virtual machine 602 executed according to the second embodiment of this invention.

The processing of FIG. 21 is executed when power of one of the virtual machines 602 is cut off. In the description of FIG. 21, the virtual machine 602 which is to be powered off by the user is described as a relevant virtual machine 602.

First, the user operates the console terminal 1701 to instruct shutting-down to the OS 603 operating on the relevant virtual machine 602 (2101).

Steps 2102 to 2104 are respectively similar to Steps 1602 to 1604 of FIG. 16, and thus description thereof will be omitted.

Next, the hypervisor 103 executes loop processing (2105 to 2109) for each resource specified in Step 2104. In this case, each resource specified in Step 2104 is described as a relevant resource.

In Step 2106, the hypervisor 103 determines whether the relevant resource is used by the other virtual machine 602. This determination is executed by the same method as that of Step 1606 of FIG. 16.

If it is determined in Step 2106 that the relevant resource has been allocated to the virtual machine 602 in addition to the relevant virtual machine 602, the relevant resource is still used by one of the virtual machines 602. Accordingly, the power of the relevant resource cannot be cut off. In this case, the process proceeds to Step 2109 without cutting off the power of the relevant resource.

On the other hand, if it is determined in Step 2106 that the relevant resource has not been allocated to the virtual machine 602 other than to the relevant virtual machine 602, after the relevant virtual machine 602 shuts down, the relevant resource is not used by any virtual machines 602. Thus, power of the relevant resource can be cut off. However, according to the second embodiment, supplying/cutting of power of the server system 100 and the storage system 120 is controlled by the CPU 101 which executes the hypervisor 103 of the server system 100. Accordingly, when power of all the CPU's 101 of the server system 100 is cut off, it becomes impossible to turn on the CPU's 101 any more. Thus, when the relevant resource is the only currently operating CPU 101, the power thereof cannot be cut off.

Thus, if it is determined in Step 2106 that the relevant resource has not been allocated to the virtual machine 602 other than the relevant virtual machine 602, the hypervisor 103 determines whether the relevant resource is a CPU 101 and the number of currently operating CPU's 101 is one (2107).

If it is determined in Step 2107 that the relevant resource is a CPU 101, and the number of currently operating CPU's 101 is 1, the relevant resource is the only currently operating CPU 101. In this case, the process proceeds to Step 2109 without cutting off power of the resource.

If it is determined in Step 2107 that the relevant resource is not a CPU 101 or the number of currently operating CPU's 101 is not 1, the relevant resource is not the only currently operating CPU 101. In this case, the hypervisor 103 cuts off power of the relevant resource (2108).

When the server system 100 includes a CPU (not shown) which is not a power control target of the hypervisor 103, and this CPU is used only for controlling power of each resource, it is not necessary to execute the determination of Step 2107. In this case, when "no" is determined in Step 2106, Step 2108 is executed.

When the loop processing has not been finished for all the relevant resources, the process returns to Step 2106 to execute processing for remaining relevant resources (2109).

When power of one or more resources is cut off as a result of finishing the loop processing for all the relevant resources, the hypervisor 103 updates the server power control table 1702 to reflect the cutting of the power (2110).

Next, the server system 100 instructs to cut off power to the virtual storage system 613 allocated to the relevant computer (2111). The virtual storage system 613 which is to be powered off in response to the instruction is described as a relevant virtual storage system 613 in the description of FIG. 21. There are various instruction methods. When the I/O channel 160 is a fibre channel, a method in which a "logout" message of a fibre channel protocol is a power cutting-off instruction may be used.

Referring to FIG. 10, the virtual storage system 613 allocated to the relevant virtual machine 602 is specified by referring to the virtual machine number 1001 and the virtual storage system number 1002 of the storage resources control table 663 (or storage resources control table 1705).

Processing of next Steps 2112 to 2116 is similar to that of Steps 1612 to 1616 of FIG. 16, and thus description thereof will be omitted.

When power of one or more resources is cut off as a result of finishing the loop processing of Steps 2113 to 2116 for all the relevant resources, the storage hypervisor 612 reports the cutting of the power of the resources to the server system 100 (2117).

Next, to reflect the reported cutting of power, the server system 100 updates the storage power control table 1706 (2118). Further, to reflect the reported cutting of power, the storage hypervisor 612 updates the storage power control table 664.

Thus, the shutdown processing of the virtual machine 602 is finished.

Next, a third embodiment of this invention will be described. Differences of the third embodiment from the first embodiment will mainly be described below. Thus, points of the third embodiment not described are similar to those of the first embodiment.

Figure 22A:
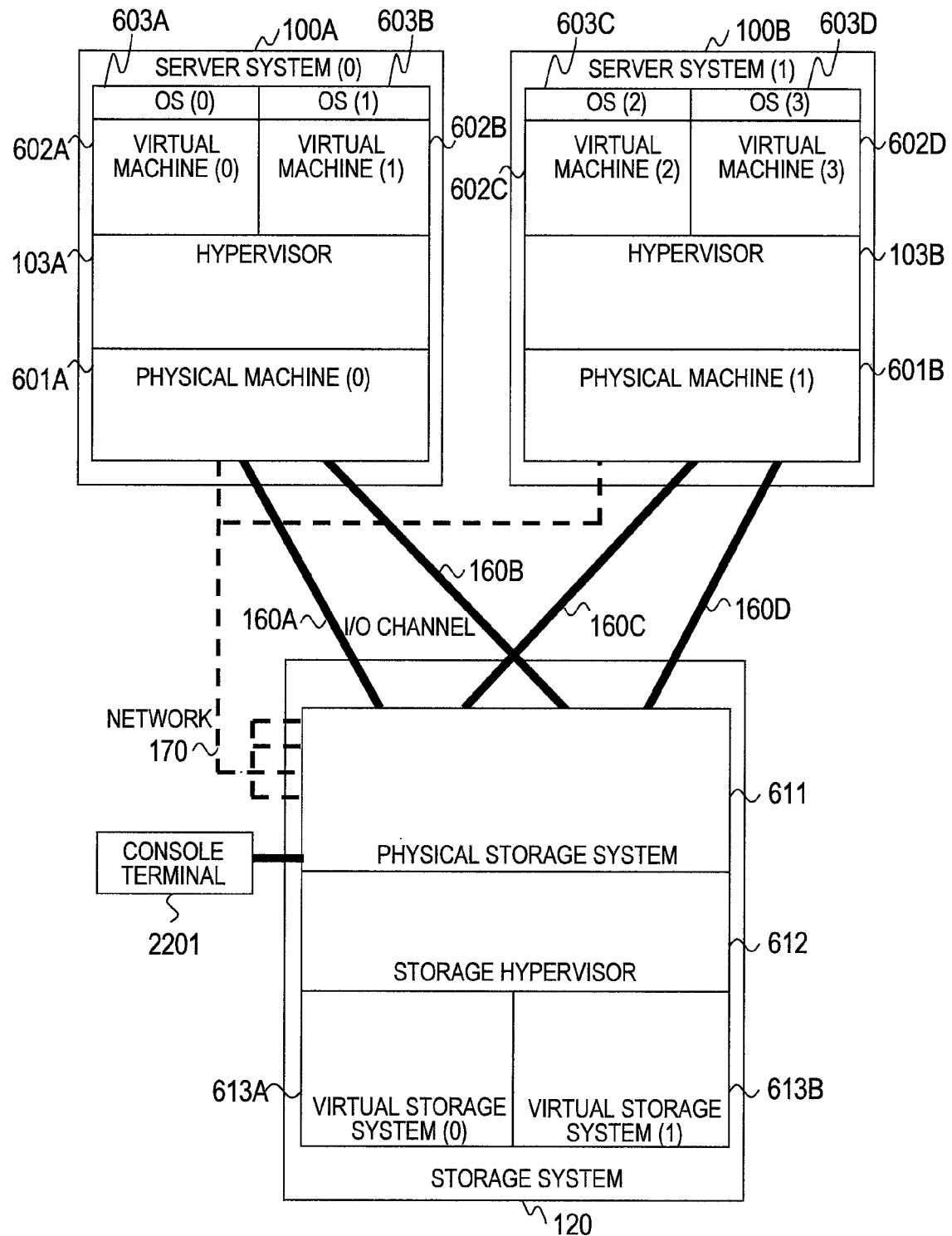
FIG. 22A is a functional block diagram of a computer system according to a third embodiment of this invention.

FIG. 22A is a functional block diagram of a computer system according to the third embodiment of this invention.

According to the first embodiment, the control terminal 150 holds the information for controlling the entire computer system, and controls the entire computer system. According to the second embodiment, one of server systems 100 holds information for controlling the entire computer system, and controls the entire computer system. However, according to the third embodiment, a storage system 120 holds information for controlling the entire computer system, and controls the entire computer system.

Thus, the computer system of the third embodiment includes no control terminal 150 unlike the first embodiment. Instead, a console terminal 2201 is connected to the storage system 120. The console terminal 2201 is a computer for operating the storage system 120.

A server system 100, an I/O channel 160, and a network 170 of the third embodiment are similar to those of the first embodiment, and thus description thereof will be omitted.

Figure 22B:
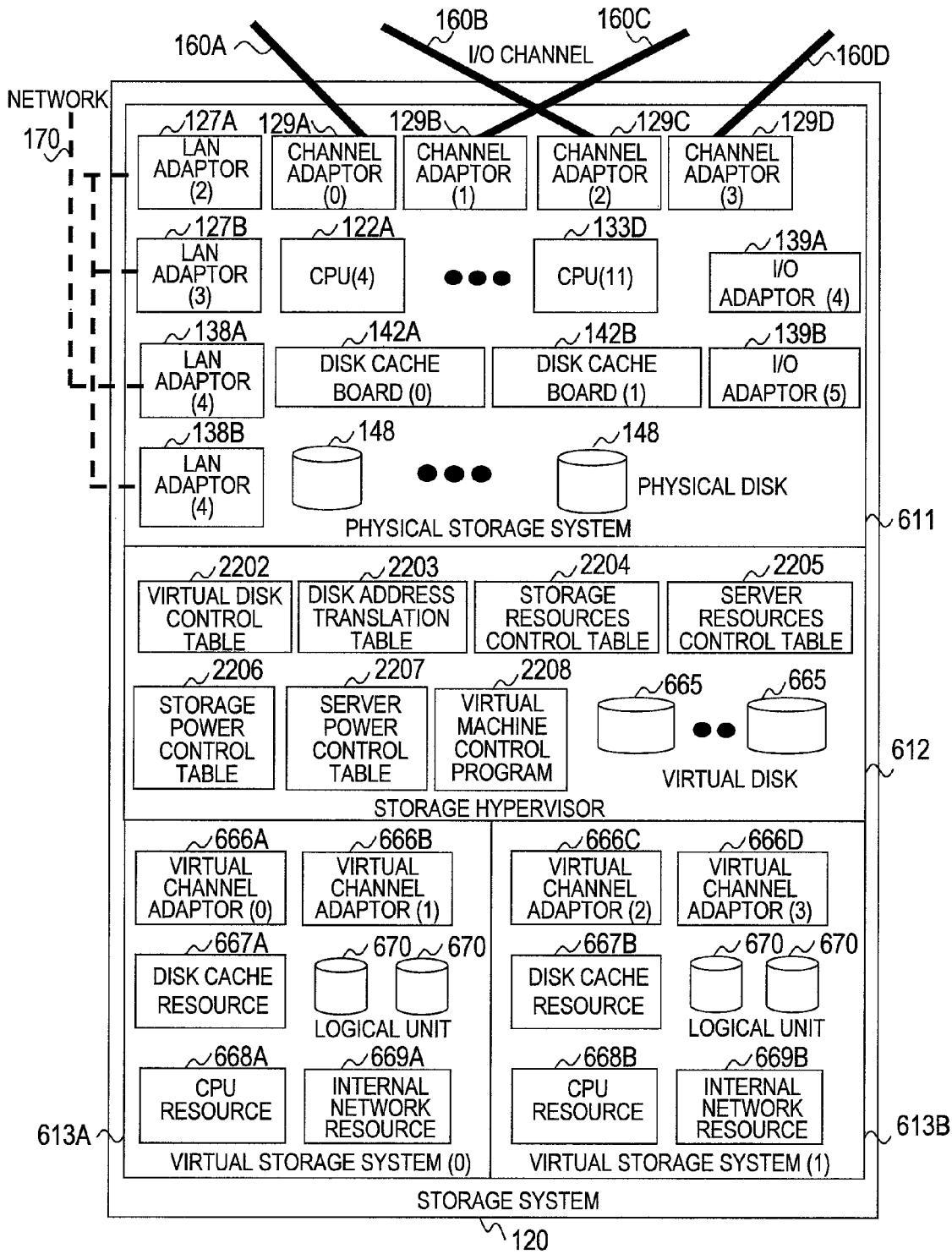
FIG. 22B is a functional block diagram of a storage system according to the third embodiment of this invention.

FIG. 22B is a functional block diagram of the storage system 120 according to the third embodiment of this invention.

The storage system 120 of the third embodiment is similar to that of the first embodiment except for tables and programs included in a storage hypervisor 612.

The storage hypervisor 612 of the third embodiment includes a virtual disk control table 2202, a disk address translation table 2203, a storage resources control table 2204, a server resources control table 2205, a storage power control table 2206, a server power control table 2207, a virtual machine control program 2208, and one or more virtual disks 665. The virtual disk control table 2202, the storage resources control table 2204, the server resources control table 2205, the storage power control table 2206, and the server power control table 2207 hold information for managing the entire computer system. These tables are respectively similar to the virtual disk control table 622, the storage resources control table 621, the server resources control table 623, the storage power control table 625, and the server power control table 624 of the first embodiment, and thus description thereof will be omitted.

A hardware configuration of the computer system of the third embodiment is similar to that of the computer system of the first embodiment except for the console terminal 2201 disposed in place of the control terminal 150 shown in FIGS. 1A, 1B, 1C, 1D, and 1E. Thus, description of the hardware configuration of the computer system according to the third embodiment will be omitted.

Figure 23:
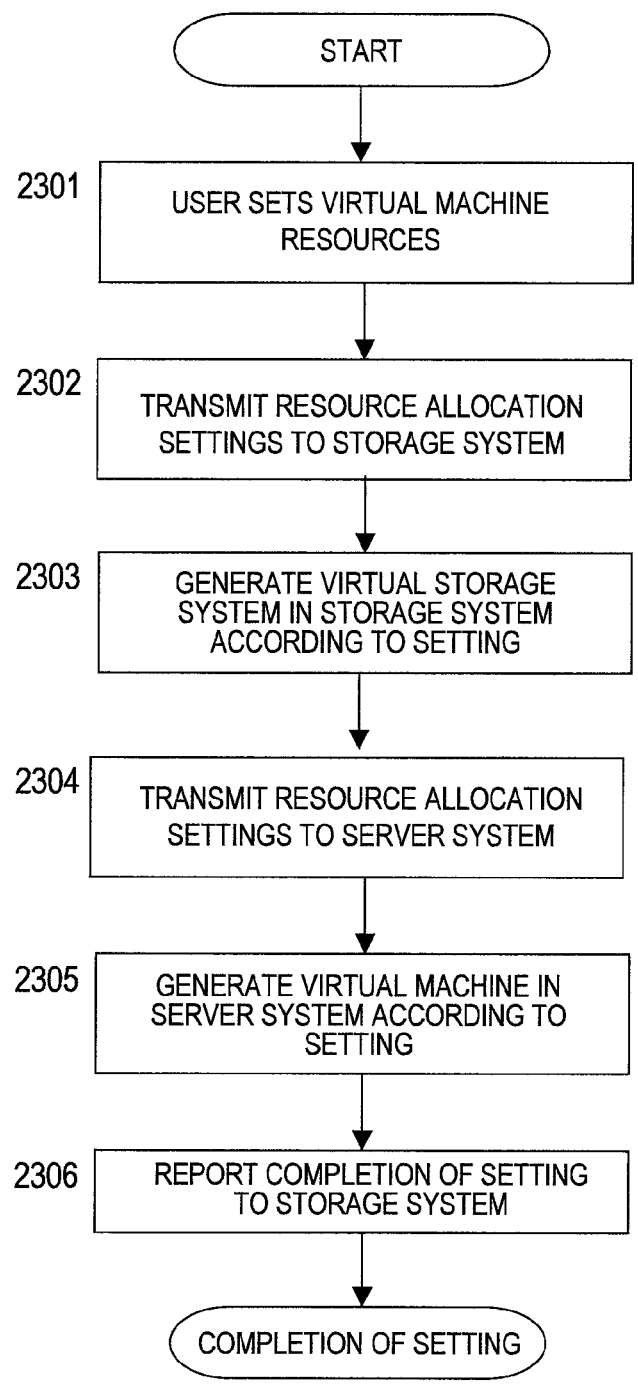
FIG. 23 is a flowchart of resource allocation setting processing executed according to the third embodiment of this invention.

FIG. 23 is a flowchart of resource allocation setting processing executed according to the third embodiment of this invention.

The resource allocation setting processing executed according to the third embodiment is similar to that executed according to the first embodiment shown in FIG. 13 except for some Steps. Detailed description of points of the processing of FIG. 23 similar to those of the processing of FIG. 13 will be omitted.

Steps 2301 to 2306 of FIG. 23 respectively correspond to Steps 1301, 1305, 1306, 1302, 1303 and 1307 of FIG. 13.

The computer system of the third embodiment includes no control terminal 150. Accordingly, in Step 2301, the user operates the console terminal 2201 to set physical resources to be allocated to the virtual machine 602 and the virtual storage system 613. In Step 2302, the console terminal 2201 transmits set contents to the storage system 120. In Step 2303, the storage system 120 generates a virtual storage system 613. In Step 2304, the storage system 120 transmits contents set for the virtual machine 602 to the server system 100. In Step 2305, the server system generates a virtual machine 602. In Step 2306, the server system 100 reports setting completion to the storage system 120.

Figure 24:
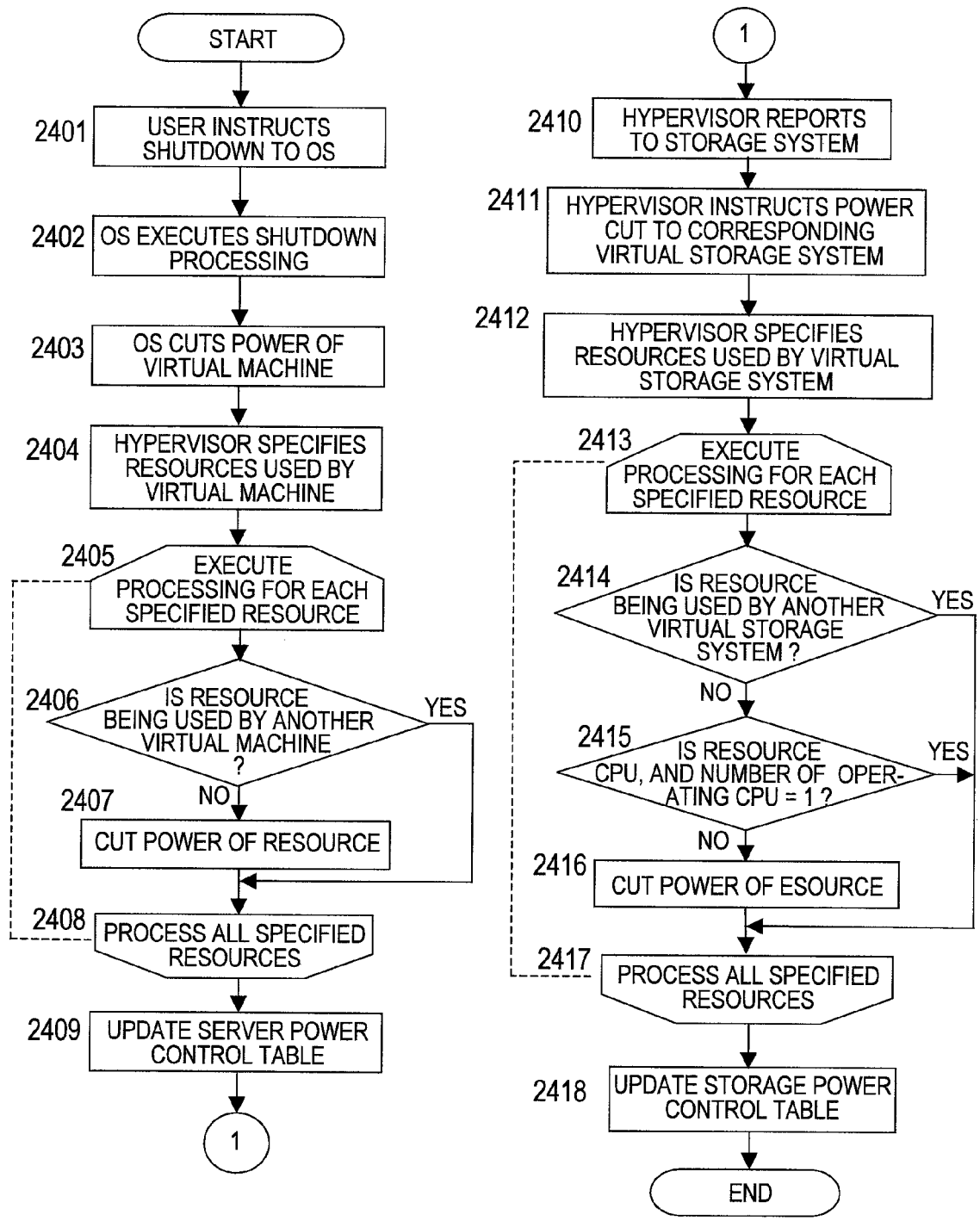
FIG. 24 is a flowchart of shutdown processing of a virtual machine executed according to the third embodiment of this invention.

FIG. 24 is a flowchart of shutdown processing of the virtual machine 602 executed according to the third embodiment of this invention.

The processing of FIG. 24 is executed when the user cuts off power of one of the virtual machines 602. In the description of FIG. 24, the virtual machine 602 which is to be powered off by the user is described as a relevant virtual machine 602.

First, the user operates the console terminal 2201 to instruct shutting-down to an OS 603 operating on the relevant virtual machine 602 (2401). The shutting-down instruction reaches the server system 100 via the storage system 120 and the network 170.

Steps 2402 to 2408 are respectively similar to Steps 1602 to 1608 of FIG. 16, and thus description thereof will be omitted.

When power of one or more resources is cut off as a result of finishing the loop processing of Steps 2405 to 2408 for all the relevant resources, the hypervisor 103 updates the server power control table 651 to reflect the cutting of the power (2409).

Then, the hypervisor 103 reports the executed cutting of power to the storage system 120 (2410). The storage system 120 updates the server power control table 2207 in response to the report.

Next, the storage system 120 instructs to cut off power to the virtual storage system 613 allocated to the relevant computer 602 (2411). Specifically, the storage hypervisor 612 refers to the virtual machine number 1001 and the virtual storage number 1002 of the storage resources control table 2204 to specify a virtual storage system 613 allocated to the relevant computer 602. The virtual storage system 613 specified in Step 2411 is a virtual storage system 613 which is to be powered off by processing described below. The virtual storage system 613 specified in Step 2411 is described as a relevant virtual storage system 613 in the description of FIG. 24.

Next, the storage hypervisor 612 specifies resources allocated to the relevant virtual storage system 613 (2412). This processing is similar to that of Step 1612 of FIG. 16.

Next, the storage hypervisor 612 executes loop processing for the resources specified in Step 2412 (2413 to 2417). The resources specified in Step 2412 are described as relevant resources.

In Step 2414, the storage hypervisor 612 determines whether the relevant resource has also been allocated to the virtual storage system 613 in other than the relevant storage system 613. This determination is executed by the same method as that of Step 1614.

If it is determined in Step 2414 that the relevant resource has also been allocated to the virtual storage system 613 other than the relevant virtual storage system 613, the relevant resource is still used by one of the virtual storage systems 613. Accordingly, the power of the relevant resource cannot be cut off. In this case, the process proceeds to Step 2417 without cutting off the power of the relevant resource.

On the other hand, if it is determined in Step 2414 that the relevant resource has not been allocated to the virtual storage system 613 other than the relevant virtual storage system 613, after the relevant virtual storage system 613 shuts down, the relevant resource is not used by any virtual storage systems 613. Thus, power of the relevant resource can be cut off. However, according to the third embodiment, supplying/cutting of power of the server system 100 and the storage system 120 is controlled by a CPU 122 or the like which executes the storage hypervisor 612 of the storage system 120. Accordingly, when power of all the CPU's 122 or the like of the storage system 120 is cut off, it becomes impossible to turn on the CPU's or the like any more. Thus, when the relevant resource is the only currently operating CPU 122 or the like, the power thereof cannot be cut off.

Thus, if it is determined in Step 2414 that the relevant resource has not been allocated to the virtual machine 602 other than the relevant virtual machine 602, the storage hypervisor 612 determines that the relevant resource is a CPU 122 or 133, and whether the number of currently operating CPU's 122 or the like is one (2415).

If it is determined in Step 2415 that the relevant resource is a CPU 122 or 133, and the number of currently operating CPU's 122 or the like is 1, the relevant resource is the only currently operating CPU 122 or the like. In this case, the process proceeds to Step 2417 without cutting off power of the resource.

If it is determined in Step 2415 that the relevant resource is neither a CPU 122 nor 133, or that the number of currently operating CPU's 122 or the like is not 1, the relevant resource is not the only currently operating CPU 122 or the like. In this case, the storage hypervisor 612 cuts off power of the relevant resource (2416).

When the storage system 120 includes a CPU (not shown) which is not a power control target of the storage hypervisor 612, and this CPU is used only for controlling power source of each resource, it is not necessary to execute the determination of Step 2415. In this case, when "no" is determined in Step 2414, Step 2416 is executed.

When the loop processing has not been finished for all the relevant resources, the process returns to Step 2414 to execute processing for remaining relevant resources (2417).

When power of one or more resources is cut off as a result of finishing the loop processing for all the relevant resources, the storage hypervisor 612 updates the storage power control table 2206 to reflect the cutting of the power (2418).

Thus, the shutdown processing of the virtual machine 602 is finished.

According to the third embodiment, the instruction of supplying/cutting of power is transmitted via the network 170. However, the instruction may be transmitted via the I/O channel 160.

Next, a fourth embodiment of this invention will be described. Differences of the fourth embodiment from the first embodiment will mainly be described below. Thus, points of the fourth embodiment not described are similar to those of the first embodiment.

Figure 25:
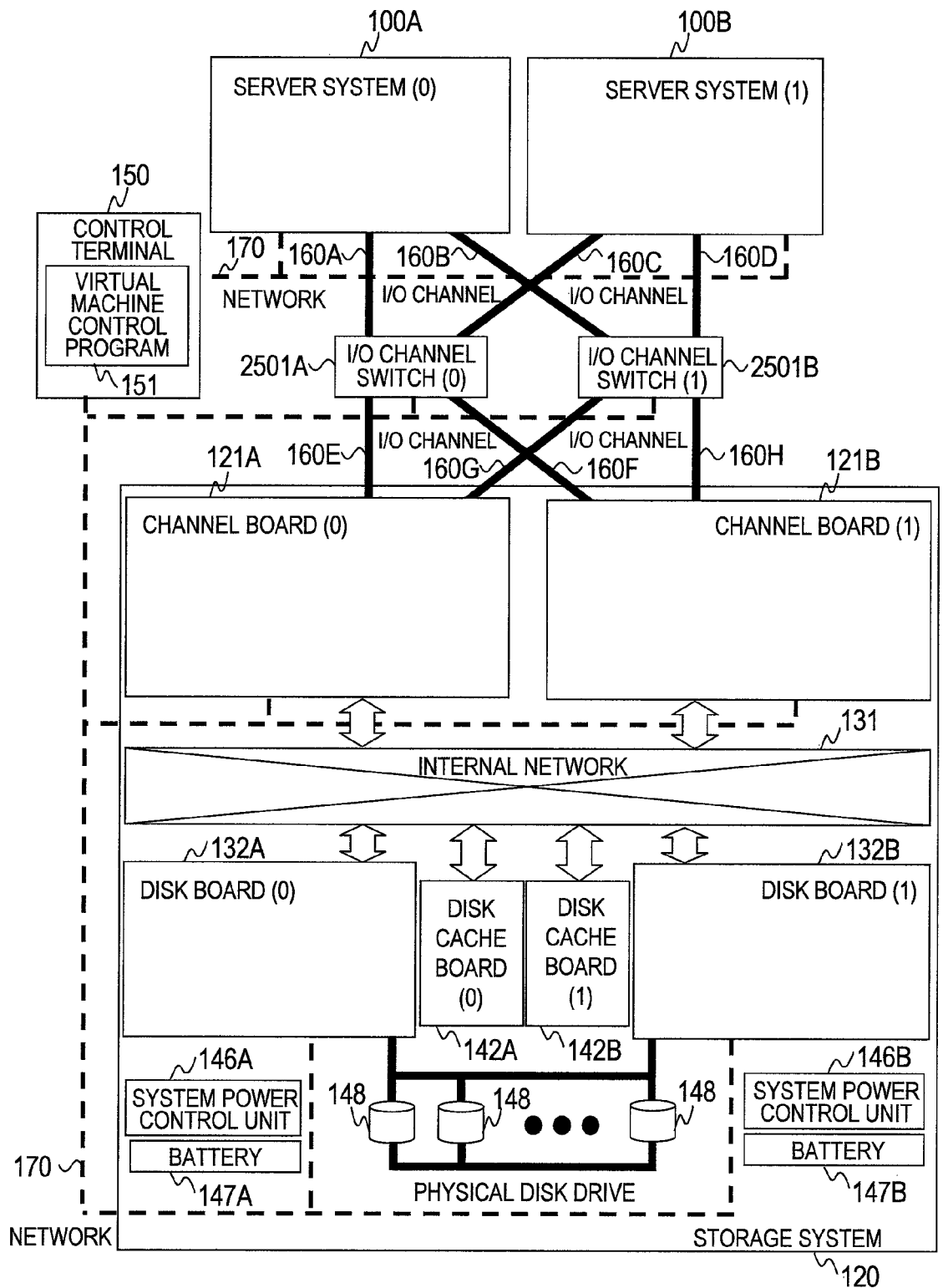
FIG. 25 is a block diagram showing a hardware configuration of a computer system according to a fourth embodiment of this invention.

FIG. 25 is a block diagram showing a hardware configuration of the computer system according to the fourth embodiment of this invention.

The hardware configuration of the computer system of the fourth embodiment is similar to that of the first embodiment shown in FIG. 1 except for interconnection between a server system 100 and a storage system 120 via an I/O channel 160 and an I/O channel switch 2501. Thus, description of components other than the I/O channel 160 and the I/O channel switch 2501 will be omitted.

An I/O channel 160A connects an I/O adaptor (0) 106A with an I/O channel switch (0) 2501A. An I/O channel 160B connects an I/O adaptor (1) 106B with an I/O channel switch (1) 2501B. An I/O channel 160C connects an I/O adaptor (2) 106C with the I/O channel switch (0) 2501A. An I/O channel 160D connects an I/O adaptor (3) 106D with the I/O channel switch (1) 2501B.

An I/O channel 160E connects the I/O channel switch (0) 2501A with a channel adaptor (0) 129A. An I/O channel 160F connects the I/O channel switch (0) 250 1A with a channel adaptor (2) 129C. An I/O channel 160G connects the I/O channel switch (1) 2501B with a channel adaptor (1) 129B. An I/O channel 160H connects the I/O channel switch (1) 2501B with a channel adaptor (3) 129D.

The I/O channel switches (0) 2501A and (1) 2501B are connected to a control terminal 150 via a network 170.

A functional block diagram of the fourth embodiment is similar to that of the first embodiment except for interconnection between the server system 100 and the storage system 120 via the I/O channel 160 and the I/O channel switch 2501. A power supply system of each apparatus of the fourth embodiment, tables held by the apparatus, and processing executed by the apparatus are similar to those of the first embodiment except for those described below. Description of components of the fourth embodiment similar to those of the first embodiment will be omitted.

Figure 26:
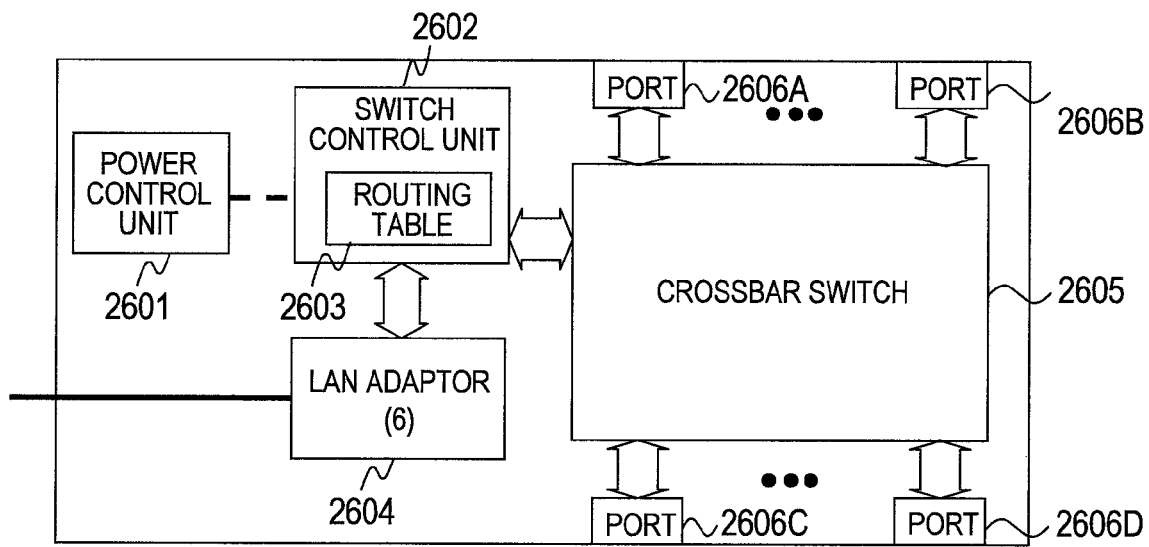
FIG. 26 is a block diagram showing a hardware configuration of an I/O channel switch according to the fourth embodiment of this invention.

FIG. 26 is a block diagram showing a hardware configuration of the I/O channel switch 2501 according to the fourth embodiment of this invention.

The I/O channel switch 2501 includes a power control unit 2601, a switch control unit 2602, a LAN adaptor (6) 2604, a crossbar switch 2605, and a plurality of ports 2606.

Figure 27:
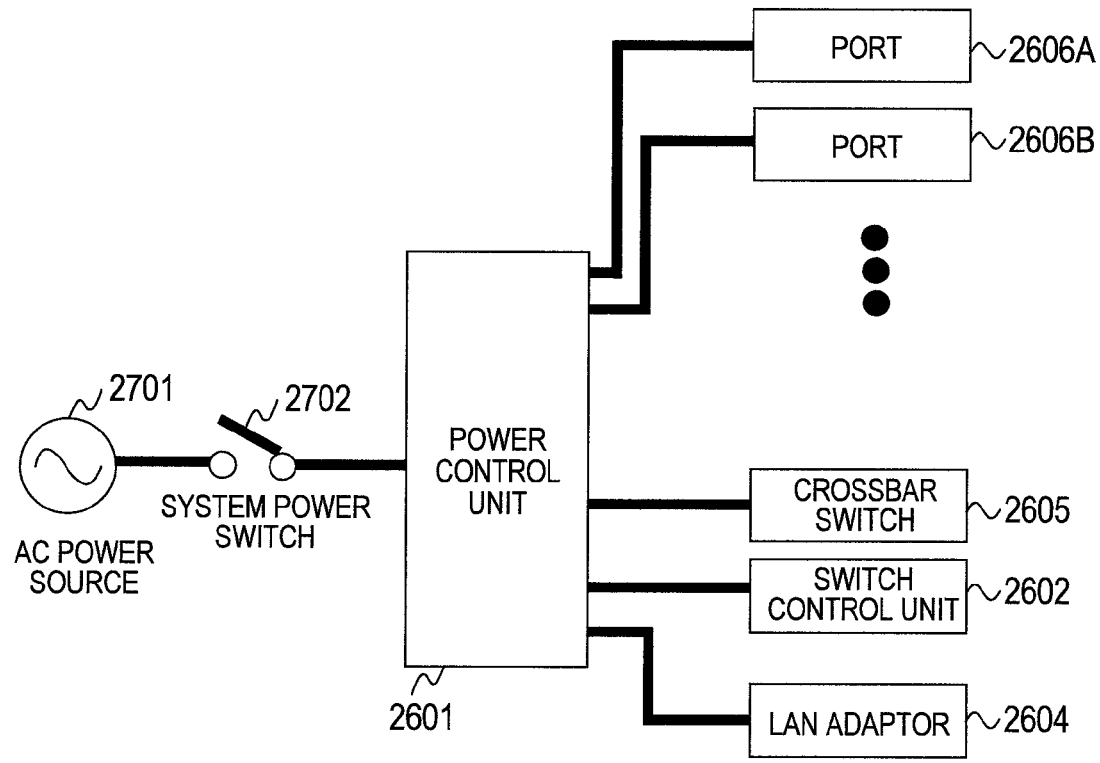
FIG. 27 is an explanatory diagram of a power supply system of the I/O channel switch according to the fourth embodiment of this invention.

Referring to FIG. 27, the power control unit 2601 controls power supply to each physical resource in the I/O channel switch 2501.

Referring to FIG. 28, the switch control unit 2602 controls connection between the ports 2606 by the crossbar switch 2605. Specifically, the switch control unit 2602 stets a combination of ports 2606 to permit/inhibit communication. The switch control unit 2602 holds information indicating the set combination of the ports 2606 as a routing table 2603.

The LAN adaptor (6) 2604 is an interface for communication with an apparatus such as the control terminal 150 via the network 170.

The crossbar switch 2605 switches connection between the ports 2606. Specifically, the crossbar switch 2605 permits/inhibits communication between the ports 2606 according to setting of the switch control unit 2602.

Each port 2606 is connected to the I/O channel 160, and communicates with the server system 100 or the storage system 120 via the I/O channel 160. FIG. 26 shows four ports 2606A, 2606B, 2606C and 2606D. However, the I/O channel switch 2501 may include more ports 2606.

FIG. 27 is an explanatory diagram of a power supply system of the I/O channel switch 2501 according to the fourth embodiment of this invention.

The power supply system of the I/O channel switch 2501 includes an AC power source 2701, a system power switch 2702, a power control unit 2601, and physical resources (i.e., each port 2606, crossbar switch 2605, switch control unit 2602, and LAN adaptor 2604) for receiving power supplies.

The AC power source 2701 is a source of power supplied to the I/O channel switch 2501. The AC power source 2701 may be any types of AC power source as in the case of the AC power source 201 shown in FIG. 2.

The system power switch 2702 is a switch similar to the system power switch 202 of FIG. 2.

The power control unit 2601 receives power supplied from the AC power source 2701 via the system power switch 2702 and controls supplying of the power to each physical resource.

The power supply system of the I/O channel switch 2501 is not divided into a plurality of power supply areas as shown in FIG. 2. The power control unit 2601 can control supplying/cutting of power for each port 2606.

FIG. 28 is an explanatory diagram of a routing table 2603 held by the I/O channel switch 2501 according to the fourth embodiment of this invention.

The routing table 2603 includes an input port number 2801, an output port number 2802, and information indicating communication permission between the ports 2606. The input port number 2801 and output port number 2802 are identifiers assigned to the ports 2606. In the routing table 2603, the information indicating communication permission is represented by "o" when communication is permitted, and "x" when communication is inhibited.

For example, according to the routing table 2603 shown in FIG. 28, data input to a port (0) 2606 can be output from a port (1) 2606, while the data input to the port (0) 2606 cannot be output from a port (n) 2606. Thus, in this case, an apparatus connected to the port (0) 2606 can transmit data to an apparatus connected to the port (1) 2606, but cannot transmit data to an apparatus connected to the port (n) 2606. The ports (0) 2606, (1) 2606, and (n) 2606 are ports respectively having identifiers "0", "1" and "n".

Figure 31:
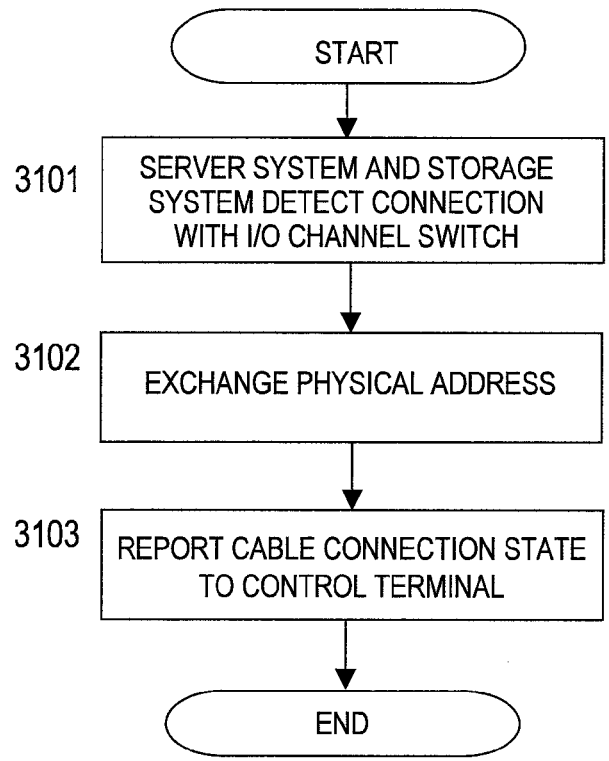
FIG. 31 is a flowchart of processing executed at the time of cable connection according to the fourth embodiment of this invention.
Figure 32:
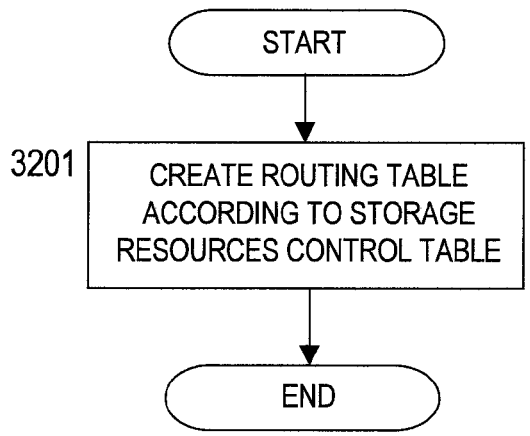
FIG. 32 is a flowchart of processing executed to create a routing table according to the fourth embodiment of this invention.

At the time of booting the computer system of the fourth embodiment, only "o" is set in the routing table 2603, while "x" is not set. In other words, at the time of booting, communication is permitted among all the ports 2606. Referring to FIGS. 31 and 32, after creation of a storage resources control table 621, for example, permission/inhibition of the communication between the ports 2606 is set in response to the instruction by the user.

FIG. 29 is an explanatory diagram of the storage resources control table 621 according to the fourth embodiment of this invention.

The storage resources control table 621 of the fourth embodiment has a configuration in which columns (i.e., storage port 2901 and server port 2902) regarding the ports 2606 are added to the storage resources control table 621 of the first embodiment shown in FIG. 10.

A virtual machine number 1001, a virtual storage system number 1002, a virtual disk number 1003, a disk cache capacity 1004, a CPU 1005 in charge, the internal bandwidth 1006, a virtual channel adaptor 1007, a channel adaptor 1008, an I/O adaptor 1009, and a virtual I/O adaptor 1010 in the storage resources control table 621 of the fourth embodiment are similar to those of FIG. 10, and thus description thereof will be omitted.

The storage port 2901 indicates an identifier of the port 2606 connected to the channel adaptor 129 indicated by the channel adaptor 1008.

The server port 2902 indicates an identifier of the port 2606 connected to the I/O adaptor 106 indicated by the I/O adaptor 1009.

For example, in the example of FIG. 29, "10" and "2" are registered as the storage port 2901 and the server port 2902 corresponding to a value "0" of the channel adaptor 1008 and a value "0" of the I/O adaptor 1009. This means that the channel adaptor (0) 129A is connected to the port (10) 2606, the I/O adaptor (0) 106A is connected to the port (2) 2606, and communication between the ports (10) 2606 and (2) 2606 is permitted.

Figure 30:
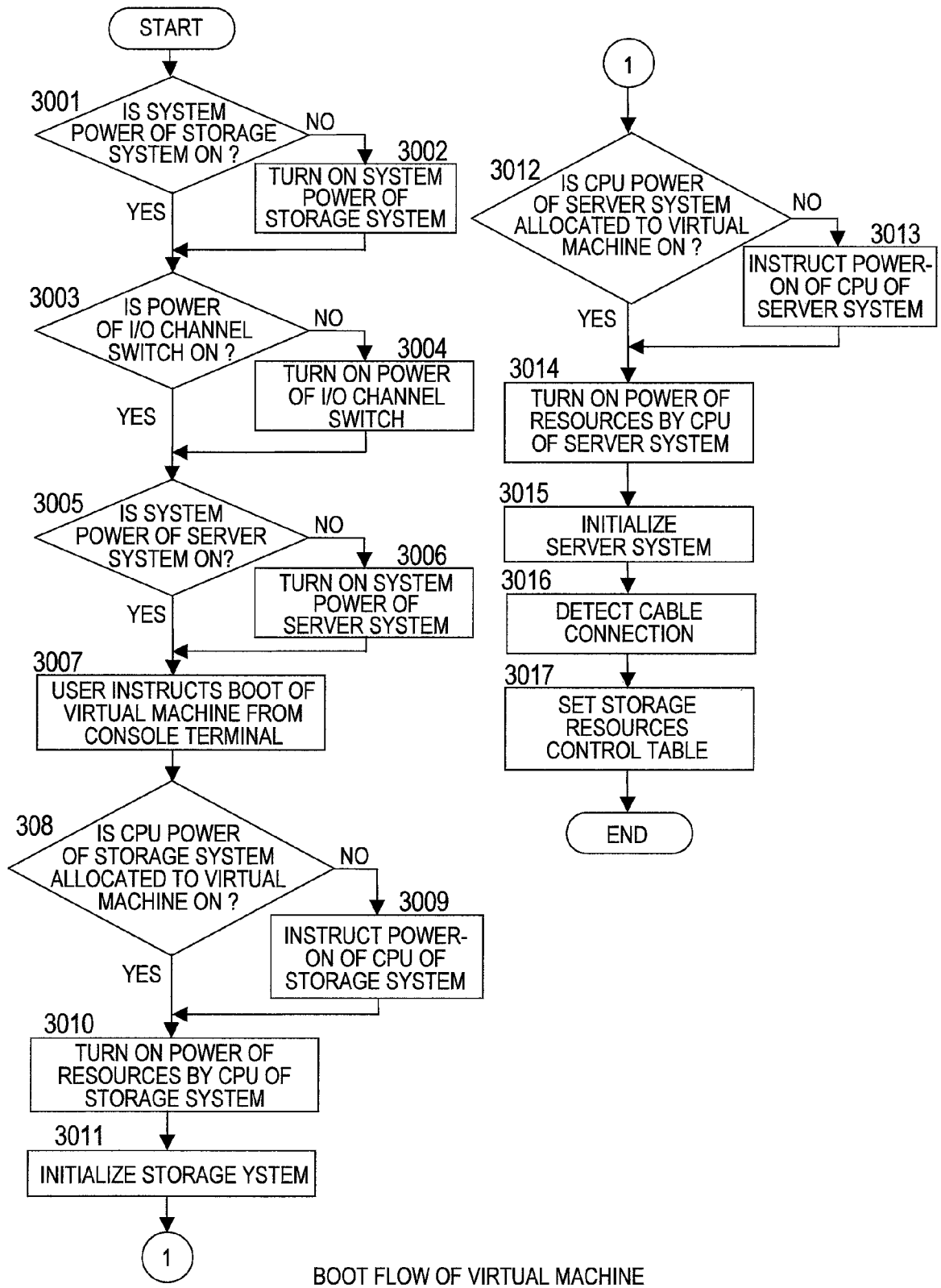
FIG. 30 is a flowchart of boot processing of a virtual machine according to the fourth embodiment of this invention.

FIG. 30 is a flowchart of boot processing of the virtual machine 602 executed according to the fourth embodiment of this invention.

In FIG. 30, Steps 3001 and 3002 are respectively similar to Steps 1401 and 1402 of FIG. 14, and thus, description thereof will be omitted.

After an end of Step 3001 or 3002, the user determines whether the system power switch 2702 of the I/O channel switch 2501 has been turned on (3003).

If it is determined in Step 3003 that the system power switch 2702 has been turned on, the process proceeds to Step 3005. On the other hand, if it is determined in Step 3003 that the system power switch 2702 has not been turned on, the user turns on the system power switch 2702 (3004). Then, the process proceeds to Step 3005.

Steps 3005 to 3017 of FIG. 30 are respectively similar to Steps 1403 to 1415 of FIG. 14, and thus description thereof will be omitted.

FIG. 31 is a flowchart of processing executed at the time of cable connection according to the fourth embodiment of this invention.

First, the server system 100, the storage system 120, and the I/O channel switch 2501 detect connection of a cable (i.e., I/O channel 160) (3101).

Then, the server system 100, the storage system 120, and the I/O channel switch 2501 exchange physical addresses with apparatus communicable via the detected cable (i.e., apparatus connected via the detected cable) (3102). In the example of FIG. 25, the server system 100 obtains a physical address of the port 2606 connected to the I/O adaptor 106. The I/O channel switch 2501 obtains physical addresses of the I/O adaptor 106 and the channel adaptor 129 that are connected to the ports 2606. The storage system 120 obtains a physical address of the port 2606 connected to the channel adaptor 129.

Any physical addresses may be used for exchanging in Step 3102 as long as the ports to which the cable is connected are uniquely specified as described above referring to FIG. 15 (e.g., WWN or MAC address).

Next, the server system 100, the storage system 120, and the I/O channel switch 2501 transmit the cable connection state obtained in Step 3102 to the control terminal 150 via the network 170 (3103). The cable connection state means a set of physical addresses of the I/O adaptor 106 and the port 2606 connected to each other, or a set of physical addresses of the port 2606 and the channel adaptor 129 connected to each other.

Thus, the processing executed at the time of cable connection according to the fourth embodiment is finished. By this processing, a correlation between the channel adaptor 1008 and the storage port 2901, and a correlation between the server port 2902 and the I/O adaptor 1009 in the storage resources control table 621 of FIG. 29 are discovered.

FIG. 32 is a flowchart of processing executed to create the routing table 2603 according to the fourth embodiment of this invention.

The switch control unit 2602 creates the routing table 2603 based on the storage resources control table 621 of FIG. 29 which is created by the processing in FIG. 31 (3202). Specifically, the user may refer to the storage resources control table 621 to input permission of communication with a certain port 2606 to the control terminal 150. The control terminal 150 transmits information input by the user to the I/O channel switch 2501 via the network 170.

As described above referring to FIG. 28, the routing table 2603 permits communication with all the ports 2606 in an initial state. In Step 3202, the switch control unit 2602 inhibits communication for a set other than that of the ports 2606 permitted to communicate by the user.

Thus, the creation of the routing table 2603 is finished.

Figure 33:
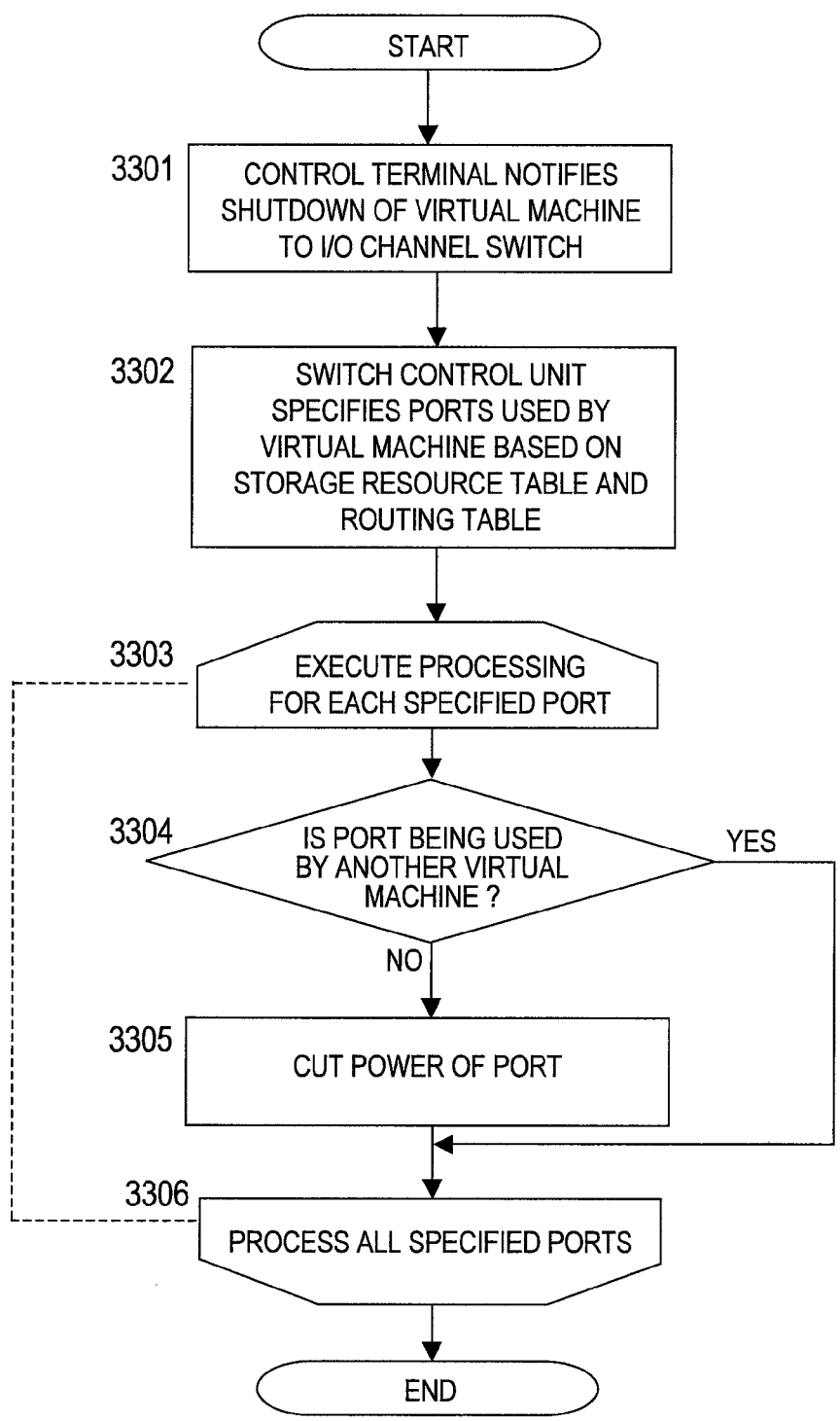
FIG. 33 is a flowchart of shutdown processing of the virtual machine executed according to the fourth embodiment of this invention.

FIG. 33 is a flowchart of shutdown processing of the virtual machine 602 executed according to the fourth embodiment of this invention.

According to the fourth embodiment, when the virtual machine 602 shuts down, the same processing as that of the first embodiment is executed as shown in FIG. 16. Furthermore, according to the fourth embodiment, to cut power of the port 2606 of the I/O channel switch 2501, processing of FIG. 33 is executed. As in the case of FIG. 16, the virtual machine 602 which is to be powered off by the user is described as a relevant virtual machine 602.

First, the control terminal 150 notifies shutting-down of the relevant virtual machine 602 to the I/O channel switch 2501 (3301).

Then, the switch control unit 2602 specifies a port 2606 used by the relevant virtual machine (i.e., port 2606 allocated to the relevant computer) based on the storage resources control table 621 and the routing table 2603 (3302).

Next, the switch control unit 2602 executes loop processing for each port specified in Step 3302 (3303 to 3306). In this case, each port specified in Step 3302 is described as a relevant port 2606.

In Step 3304, the switch control unit 2602 determines whether the relevant port 2606 is used by the other virtual machine 602. In other words, the hypervisor 103 determines whether the relevant port 2606 has been allocated to the virtual machine 602 other than the relevant virtual machine 602. In this case, the virtual machine number 1001, the storage port 2901, and the server port 2902 of the storage resources control table 621 are referred to.

In the example of FIG. 29, the port (10) 2606 is allocated to the virtual machines (0) 602A and (1) 602B. When the virtual machine (0) 602A is a relevant virtual machine 602, and the port (10) 2606 is a relevant port 2606, it is determined that the relevant port 2606 has also been allocated to the virtual machine 602 other than the relevant virtual machine 602.

If it is determined in Step 3304 that the relevant port 2606 has also been allocated to the virtual machine 602 other than the relevant virtual machine 602, the relevant port 2606 is still used by one of the virtual machines 602 even after the relevant virtual machine 602 shuts down. Accordingly, the power of the relevant port 2606 cannot be cut off. In this case, the process proceeds to Step 3306 without cutting off the power of the relevant port 2606.

On the other hand, if it is determined in Step 3304 that the relevant port 2606 has not been allocated to the virtual machine other than the relevant virtual machine 602, after the relevant virtual machine 602 shuts down, the relevant port 2606 is not used by any one of the virtual machines 602. Thus, the switch control unit 2602 cuts off power of the relevant port 2606 (3305).

If the loop processing has not been finished for all the relevant ports 2606, the process returns to Step 3304 to execute processing for remaining relevant ports 2606 (3306).

After an end of the loop processing for all the relevant ports 2606, the processing of FIG. 33 is finished.

Next, a fifth embodiment of this invention will be described. Differences of the fifth embodiment from the first embodiment will mainly be described below. Thus, points of the fifth embodiment not described are similar to those of the first embodiment.

According to the first embodiment, the sever 100 executes the application program which uses the storage system 120. On the other hand, according to the fifth embodiment, a client connected to a network 170 executes an application program which uses a storage system. In this case, a server system operates as a file server for providing files to the client.

Figures 34, 35:
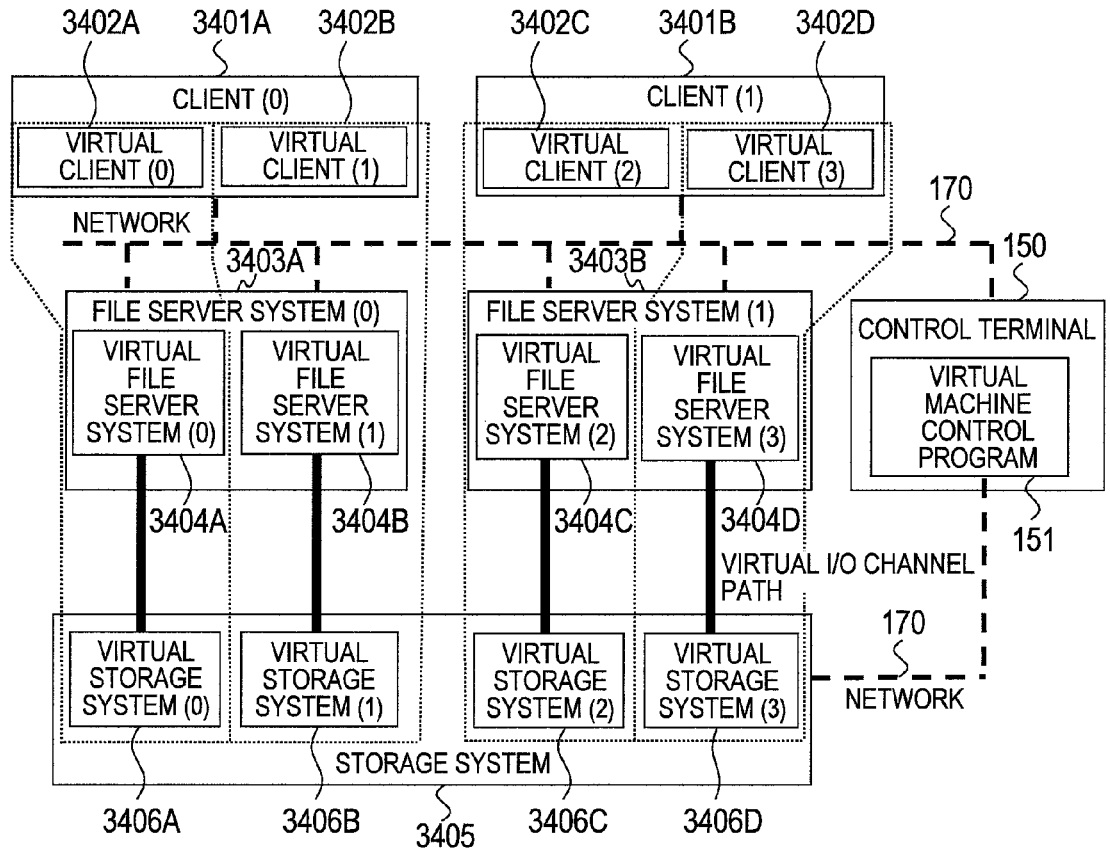
FIG. 34 is a functional block diagram of a computer system according to a fifth embodiment of this invention.
FIG. 35 is an explanatory diagram of a server resources control table according to the fifth embodiment of this invention.

FIG. 34 is a functional block diagram of a computer system according to the fifth embodiment of this invention.

The computer system of the fifth embodiment includes clients (0) 3401A and (1) 3401B, file server systems (0) 3403A and (1) 3403B, a storage system 3405, and a control terminal 150. A configuration of the computer system is similar to that of the first embodiment except for connection of the clients (0) 3401A and (1) 3401B to the network 170. The file server system 3403 corresponds to the server system 100 of the first embodiment. The fifth embodiment will be described below in detail.

Each of the clients (0) 3401A and (1) 3401B is a computer which includes a CPU (not shown), a memory (not shown), and a LAN adaptor (not shown). A memory of each client 3401 stores a program (not shown) for implementing a hypervisor in addition to an application program (not shown). By executing this program, virtual clients (0) 3402A and (1) 3402B are generated for the client (0) 34011A, and virtual clients (2) 3402C and (3) 3402D are generated for the client (1) 3401B.

The file server systems (0) 3403A and (1) 3403B are computers for providing files to the client 3401 via the network 170. Hardware configurations of the file server systems (0) 3403A and (1) 3403B are respectively similar to those of the server systems (0) 100A and (1) 100B of the first embodiment, and thus description thereof will be omitted.

Functional block diagrams of the file server systems (0) 3403A and (1) 3403B are also similar to those of the server systems (0) 100A and (1) 100B of the first embodiment as shown in FIG. 6B, and thus detailed description thereof will be omitted. Each file server system 3403 includes a hypervisor 103 for implementing a virtual file server system 3404. Virtual file server systems (0) 3404A to (3) 3404D of FIG. 34 respectively correspond to the virtual machines (0) 603A to (3) 603D of FIG. 6B. An OS 603 operates in each virtual file server system 3404.

Figure 36:
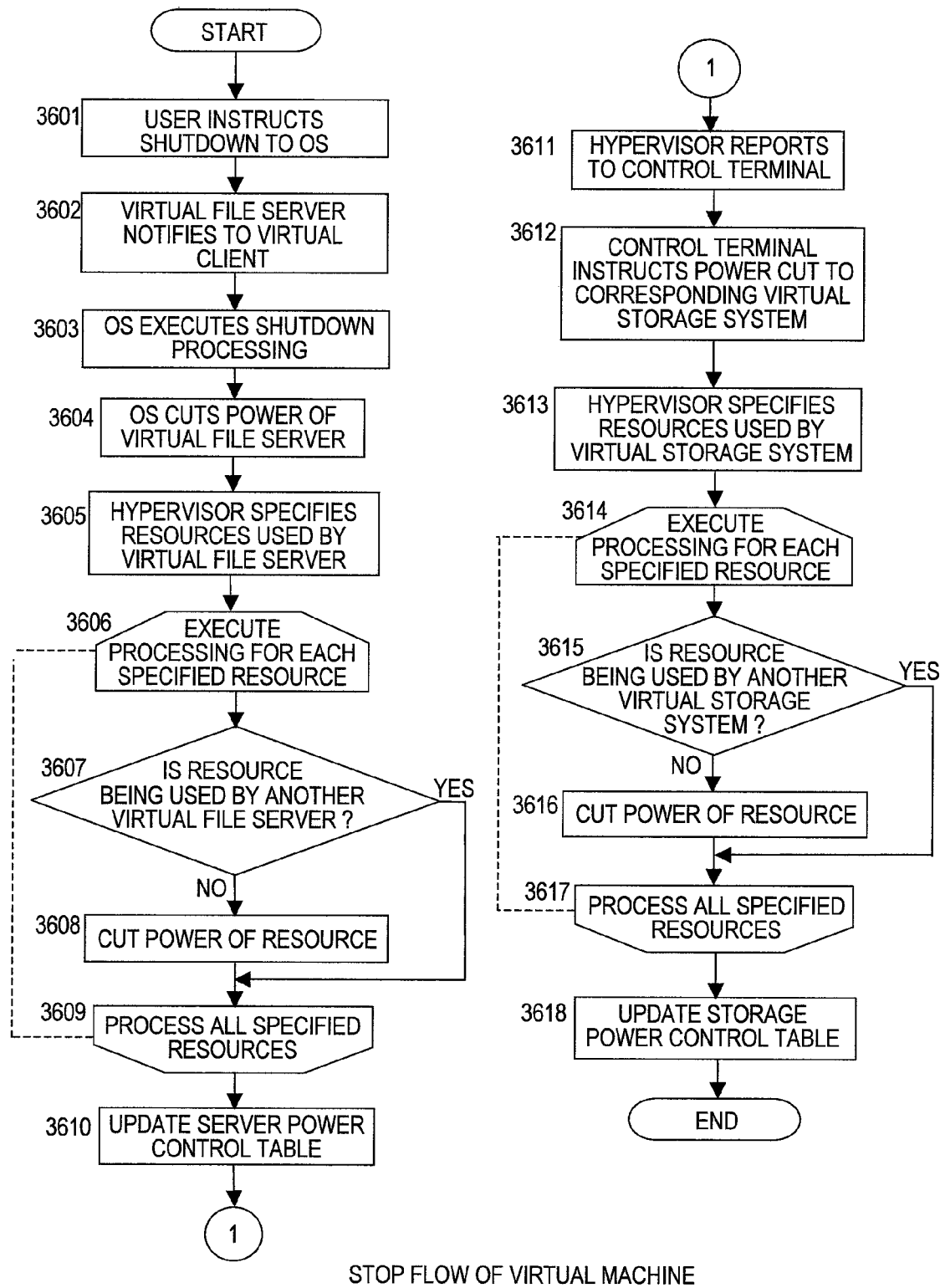
FIG. 36 is a flowchart of shutdown processing of a virtual file server system executed according to the fifth embodiment of this invention.

However, a server resources control table 653 of the fifth embodiment is different from that of the first embodiment as shown in FIG. 35. Virtual file server system shutdown processing executed according to the fifth embodiment is different from the virtual machine shutdown processing executed according to the first embodiment as shown in FIG. 36. Additionally, the virtual file server system 3404 of the fifth embodiment includes a virtual LAN adaptor (not shown).

Referring to FIGS. 1C to 1E, a hardware configuration of the storage system 3405 is similar to that of the storage system 120 of the first embodiment, and thus description thereof will be omitted. A functional block diagram of the storage system 3405 is also similar to that of the storage system 120 of the first embodiment as shown in FIG. 6C, and thus description thereof will be omitted. However, the storage system 3405 of the fifth embodiment includes four virtual storage systems, i.e., virtual storage systems (0) 3406A to (3) 3406D.

In the example of FIG. 34, the virtual file server system (0) 3404A is allocated to the virtual client (0) 3402A, and the virtual storage system (0) 3406A is allocated to the virtual file server system (0) 3404A. In other words, the virtual client (0) 3402A issues a file writing or reading request to the virtual file server system (0) 3404A. The virtual file server system (0) 3404A executes data writing/reading to/from the virtual storage system (0) 3406A in response to the request from the virtual client (0) 3402A. Then, the virtual file server system (0) 3404A returns a result of the executed writing/reading to/from the virtual client (0) 3402A.

Similarly, in the example of FIG. 34, the virtual file server system (1) 3404B is allocated to the virtual client (1) 3402B, and the virtual storage system (1) 3406B is allocated to the virtual file server system (1) 3404B. The virtual file server system (2) 3404C is allocated to the virtual client (2) 3402C, and the virtual storage system (2) 3406C is allocated to the virtual file server system (2) 3404C. The virtual file server system (3) 3404D is allocated to the virtual client (3) 3402D, and the virtual storage system (3) 3406D is allocated to the virtual file server system (3) 3404D.

Referring to FIG. 35, the control terminal 150 is similar to that of the first embodiment, and thus description thereof will be omitted. However, the server resources control table 623 included in the virtual machine control program 151 is different from that of the first embodiment.

FIG. 35 is an explanatory diagram of the server resources control table 623 according to the fifth embodiment of this invention.

A virtual machine number 701, a CPU utilization rate 702, a memory capacity 703, a virtual I/O adaptor number 704, and an I/O adaptor number 705 in the server resources control table 623 of the fifth embodiment are similar to those of the first embodiment as shown in FIG. 7, and thus description thereof will be omitted. However, an identifier of the virtual file server system 3404 is registered in the virtual machine number 701.

The server resources control table 623 of the fifth embodiment has a configuration in which two columns of a virtual LAN adaptor number 3501 and a LAN adaptor number 3502 are added to the server resources control table 623 of the first embodiment. An identifier of the virtual LAN adaptor included in each virtual file server system 3404 is registered in the virtual LAN adaptor number 3501. An identifier of a LAN adaptor 105 allocated to each virtual LAN adaptor is registered in the LAN adaptor number 3502.

FIG. 36 is a flowchart of shutdown processing of the virtual file server system 3404 executed according to the fifth embodiment of this invention.

The processing of FIG. 36 is executed when power of one of the virtual file server systems 3404 is cut off. In the description of FIG. 36, the virtual file server system 3404 which is to be powered off by the user is described as a relevant virtual file server system 3404.

First, the user operates the control terminal 150 to instruct shutting-down to the OS 603 operating in the relevant virtual file server system 3404 (3601).

Next, the relevant virtual file server system 3404 notifies the shutting-down to the virtual client 3402 which uses the relevant virtual file server system 3403 (3602).

Steps 3603 to 3609 are respectively similar to Steps 1602 to 1608 of FIG. 16, and thus description thereof will be omitted. "Virtual machine 602" in the description of FIG. 16 corresponds to "virtual file server system 3404" of FIG. 36.

Next, the hypervisor 103 updates the server power control table 651 to reflect the executed cutting of the power (3610).

Next, the hypervisor 103 reports the cutting of power to the control terminal 150 (3611). The control terminal 150 updates the server power control table 624 to reflect the reported cutting of power.

Next Steps 3612 to 3617 are respectively similar to Steps 1611 to 1616 of FIG. 16, and thus description thereof will be omitted.

Then, the storage hypervisor 612 updates the storage power control table 664 to reflect the executed cutting of power (3618).

Thus, the shutdown processing of the virtual file server system 3404 is finished.

Next, a sixth embodiment of this invention will be described.

In a computer system that must have high access performance or high fault tolerance, redundancy may be given to resources constituting the system. Depending on a situation of using the computer system, power consumption reduction may take precedence over ensuring of performance or fault tolerance. In such a case, maintenance of redundant resources impedes the reduction of power consumption. The system of reducing power consumption by controlling redundancy of resources based on required performance or fault tolerance according to the sixth embodiment will be described below.

The configuration of the first embodiment descried above referring to FIGS. 1 to 16 is applied to the sixth embodiment. Differences of the sixth embodiment from the first will be described.

Figure 37:
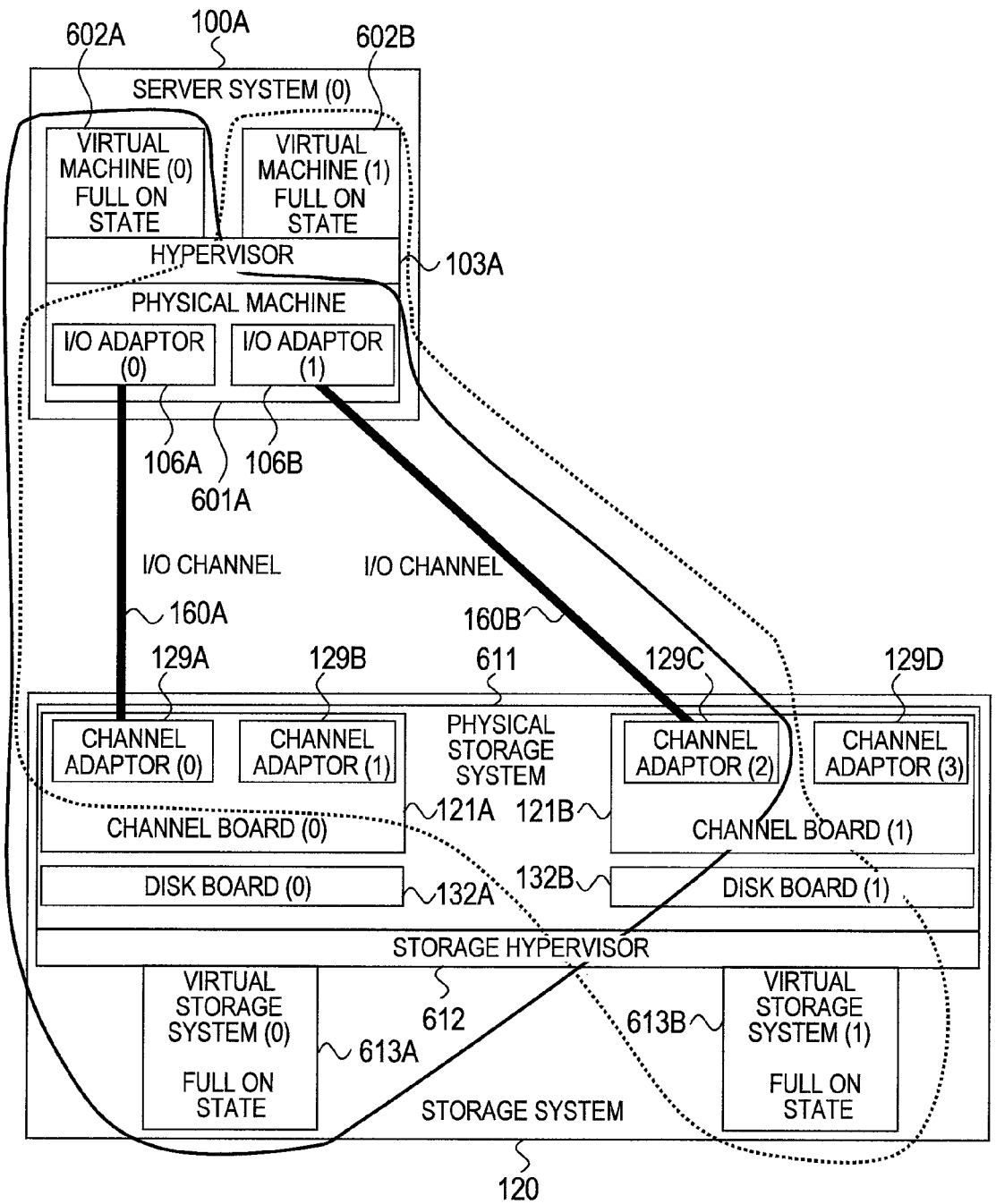
FIG. 37 is an explanatory diagram when two virtual machines operate in a computer system according to a sixth embodiment of this invention.

FIG. 37 is an explanatory diagram when two virtual machines 602 operate in the computer system of the sixth embodiment.

In FIG. 37, sections unnecessary for explanation (e.g., control terminal 150) are omitted.

In a server system (0) 100A of FIG. 37, virtual machines (0) 602A and (1) 602B are fully run (full on).

The virtual machine (0) 602A uses a virtual storage system (0) 613A. On the other hand, the virtual machine (1) 602B uses a virtual storage system (1) 613B.

For an access path from the virtual machine (0) 602A to the virtual storage system (0) 613A, there are two paths, i.e., a path from an I/O adaptor (0) 106A through an I/O channel 160A to reach a channel adaptor (0) 129A of a channel board (0) 121A, and a path from an I/O adaptor (1) 106B through an I/O channel 160B to reach a channel adaptor (2) 129C of a channel board (1) 121B. Those two paths are also used for reaching the virtual storage system (1) 613B from the virtual machine (1) 602B.

In FIG. 37, an area surrounded with a solid-line curve indicates resources allocated to the virtual machine (0) 602A. An area surrounded with a dotted-line curve indicates resources allocated to the virtual machine (1) 602B.

The sixth embodiment will be described by way of example in which redundancy is given to resources constituting the access path.

For example, when one of the virtual machines 602 uses one of the access paths, the other virtual machine 602 uses the other access path so that concentration of loads is prevented. When a fault occurs in one of the two access paths, the other of the two virtual machines 602 uses the other access path so that system down can be prevented. Accordingly, high performance and high fault tolerance are realized by giving redundancy to the resources constituting the access path.

Figure 38:
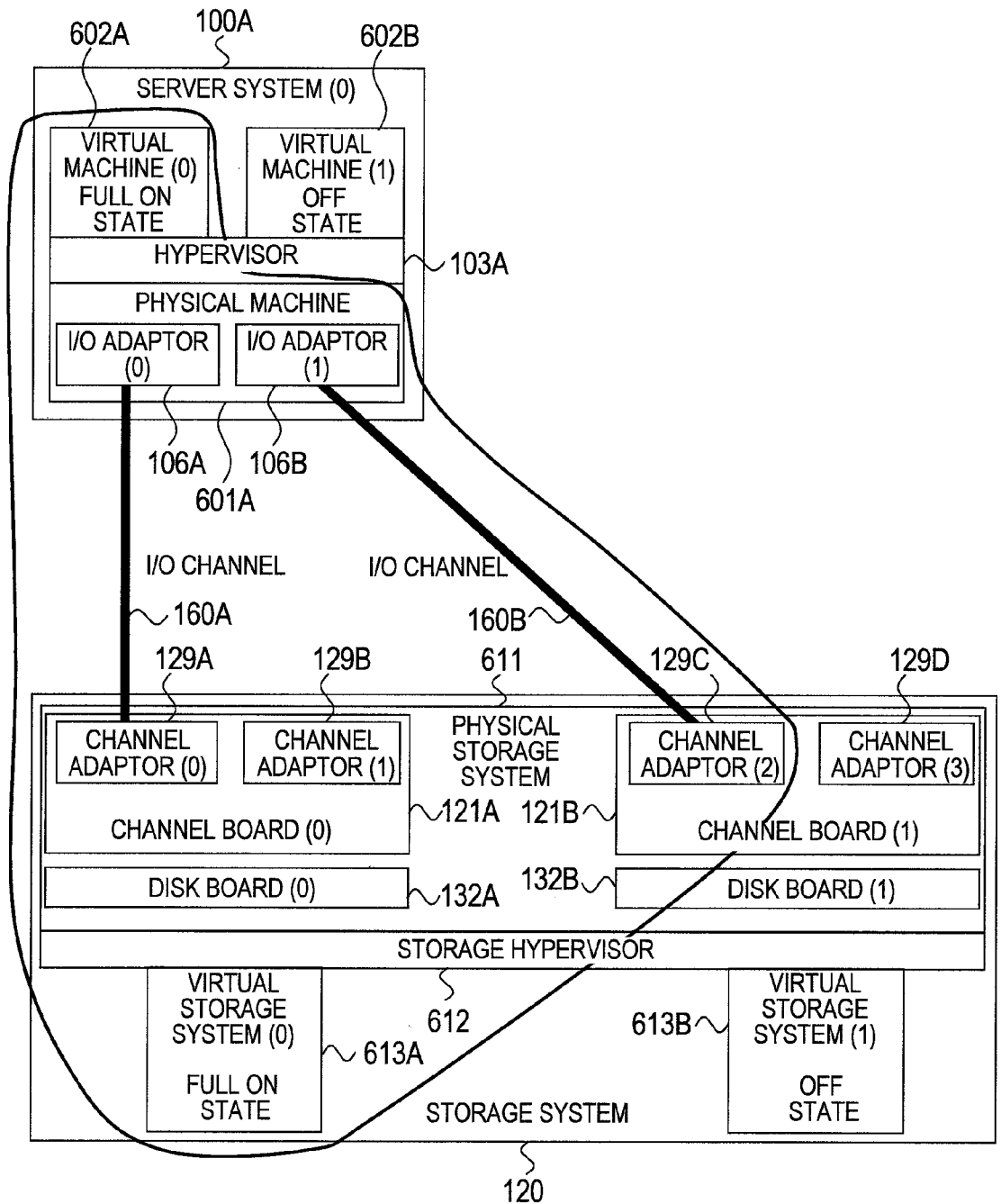
FIG. 38 is an explanatory diagram when one of the virtual machines shuts down in the computer system according to the sixth embodiment of this invention.

FIG. 38 is an explanatory diagram when one of the virtual machines 602 shuts down in the computer system according to the sixth embodiment of this invention.

For example, when the virtual machine (1) 602B shuts down, shutdown processing shown in FIG. 16 for the virtual machine (1) 602B is executed. As a result, power of physical resources used only by the virtual machine (1) 602B (physical resources allocated to the virtual machine (1) 602B only) is cut off.

However, the two access paths are also used by the virtual machine (0) 602A. Thus, power of physical resources constituting the two access paths is not cut off. To ensure performance and fault tolerance, the two access paths should preferably be maintained. In this case, however, the physical resources constituting the access paths continuously consume power.

Figure 39:
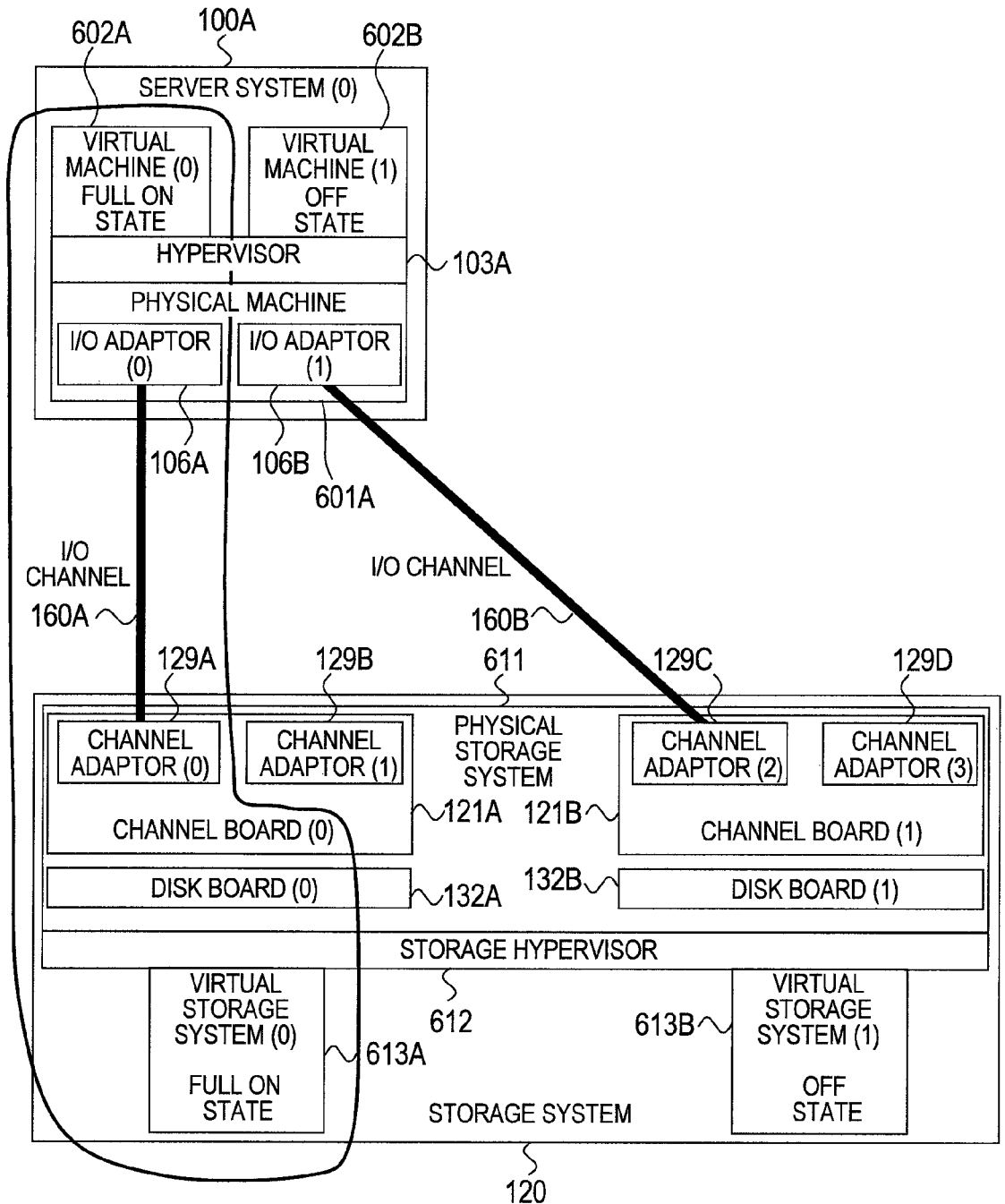
FIG. 39 is an explanatory diagram when resource redundancy is eliminated in the computer system according to the sixth embodiment of this invention.

FIG. 39 is an explanatory diagram when redundancy of the resources is released in the computer system according to the sixth embodiment of this invention.

FIG. 39 shows a state where allocation of one of the two access paths shown in FIG. 38 (path from the I/O adaptor (1) 106B through the I/O channel 160B to the channel adaptor (2) 129C of the channel board (1) 121B) to the virtual machine (0) 602A is released. As a result, power of at least the I/O adaptor (1) 106B and the channel board (1) 121B can be cut off (as long as those are not allocated to the other virtual resources). Thus, power consumption of the computer system is reduced.

Figure 40:
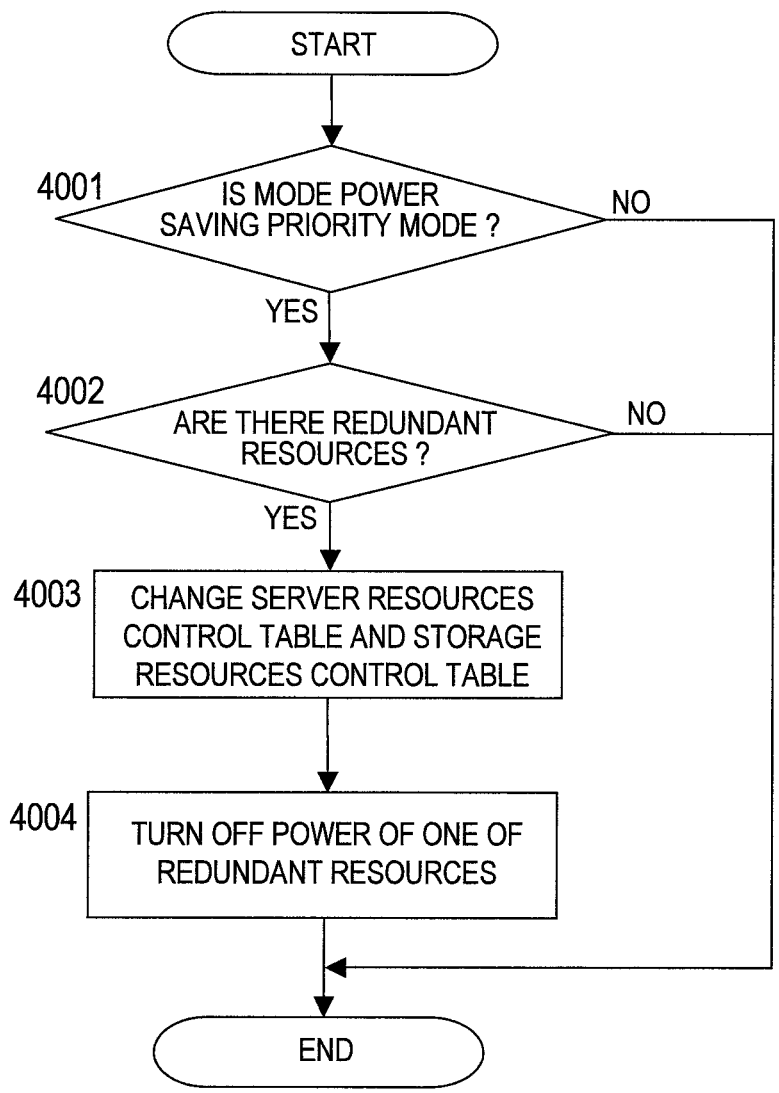
FIG. 40 is an explanatory diagram executed to cut off power of redundant resources according to the sixth embodiment of this invention.

FIG. 40 is an explanatory diagram of processing executed to cut off power of redundant resources according to the sixth embodiment of this invention.

First, the control terminal 150 determines whether a virtual resource of a processing target (e.g., virtual machine 602 or virtual storage system 613) has been set to "power saving priority mode" (4001). This determination is made by referring to a table described below with reference to FIGS. 41 and 42.

If it is determined in Step 4001 that the virtual resource has not been set to the power saving priority mode, resource redundancy cannot be released. In this case, the process is finished without cutting off power of the resource.

On the other hand, if it is determined in Step 4001 that the virtual resource has been set to the power saving priority mode, the control terminal 150 determines whether redundant resources are present (4002). The redundant resources mean multiple physical resources allocated to a single virtual resource (e.g., virtual machine 602) such as the physical resources constituting the two access paths shown in FIG. 38.

If it is determined in Step 4002 that no redundant resource is present, the resource redundancy cannot be released. Thus, the process is finished without cutting off power of the resources.

On the other hand, if it is determined in Step 4002 that when redundant resources are present, to release allocation of the redundant resources to the virtual resource of a processing target, the control terminal 150 updates a server resources control table 623 shown in FIG. 7 and a storage resources control table 622 shown in FIG. 10 (4003).

Next, the control terminal 150 cuts off power of the redundant resources according to the tables updated in Step 4003 (4004).

For example, a case of releasing allocation of the access path from the I/O adaptor (1) 106B through the I/O channel 160B to the channel adaptor (2) 129C of the channel board (1) 121B shown in FIGS. 38 and 39 will be described. In this case, in Step 4003, "1" is deleted from an I/O adaptor number 705 corresponding to a value "0" of a virtual machine number 701. Additionally, "2" is deleted from a channel adaptor 1008 corresponding to a value "0" of a virtual storage system number 1002. Then, in Step 4004, power of the I/O adaptor (1) 106B and the channel adaptor (2) 129C is cut off.

In the description of FIG. 40, the process is executed by the control terminal 150. However, similar processing may be executed by a hypervisor 103 or a storage hypervisor 612.

FIG. 41 is an explanatory diagram of a server system power saving mode table according to the sixth embodiment of this invention.

For example, the server system power saving mode table may be held by the control terminal 150. When the processing shown in FIG. 40 is executed by the hypervisor 103 or the storage hypervisor 612, the server system power saving mode table may be held by the hypervisor 103 or the storage hypervisor 612.

The server system power saving mode table includes at least two columns of a virtual machine number 4101 and a power saving priority mode 4102.

An identifier of a virtual machine 602 is registered in the virtual machine number 4101.

Information indicating a level of a power consumption reduction of each virtual machine 602 is registered in the power saving priority mode 4102. Based on the level registered in the power saving priority mode 4102, determination is made as to whether each virtual machine 602 has been set to a power saving priority mode. For example, when the level registered in the power saving priority mode 4102 is equal to or higher than a predetermined value, it may be determined that the virtual machine 602 has been set to the power saving priority mode. If the virtual machine 602 has been set to the power saving priority mode, a reduction of power consumption takes precedence over ensuring of resource redundancy.

In the example of FIG. 41, one of two values "on" and "off" is registered as the power saving priority mode 4102. "On" indicates that the virtual machine 602 has been set to the power saving priority mode, and "off" indicates that the virtual machine 602 has not been set to the power saving priority mode. In the example of FIG. 41, the virtual machine (0) 602A has been set to the power saving priority mode.

FIG. 42 is an explanatory diagram of a storage system power saving mode table according to the sixth embodiment of this invention.

For example, the storage system power saving mode table may be held by the control terminal 150. When the processing shown in FIG. 40 is executed by the hypervisor 103 or the storage hypervisor 612, the storage system power saving mode table may be held by the hypervisor 103 or the storage hypervisor 612.

The storage system power saving mode table includes at least two columns of a virtual storage system number 4201 and a power saving priority mode 4202.

An identifier of a virtual storage system 613 is registered in the virtual storage system number 4201.

Information indicating a level of a power consumption reduction of each virtual storage system 613 is registered in the power saving priority mode 4202. As in the case of the power saving priority mode 4102, based on the level registered in the power saving priority mode 4202, determination is made as to whether each virtual storage system 613 has been set to a power saving priority mode.

In the example of FIG. 42, one of two values "on" and "off" is registered as the power saving priority mode 4202. "On" indicates that the virtual storage system 613 has been set to the power saving priority mode, and "off" indicates that the virtual storage system 613 has not been set to the power saving priority mode. In the example of FIG. 42, the virtual storage system (0) 613A has been set to the power saving priority mode.

FIG. 43 is an explanatory diagram of an input screen used for allocating resources according to the sixth embodiment of this invention.

FIG. 43 shows an input screen for setting a virtual machine (0) 602A as an example. For example, this input screen is displayed by a screen display (not shown).

In the example of FIG. 43, three CPU's 101, a disk cache 144 of 2 GB, a 20% internal bandwidth 1006, and three virtual disks 665 are allocated to the virtual machine (0) 602A. The virtual machine (0) 602A is set to a power saving priority mode. A user of the control terminal 150 can enter an optional value in the input screen of FIG. 43.

The sixth embodiment has been described by taking the example of giving redundancy to the access path. However, even when other resources are redundant, similar processing to that described above can be applied to the resources.

Next, a seventh embodiment of this invention will be described.

The configuration of the first embodiment described above referring to FIGS. 1 to 16 is applied to the seventh embodiment. Differences of the seventh embodiment from the first will be described below.

Figure 44:
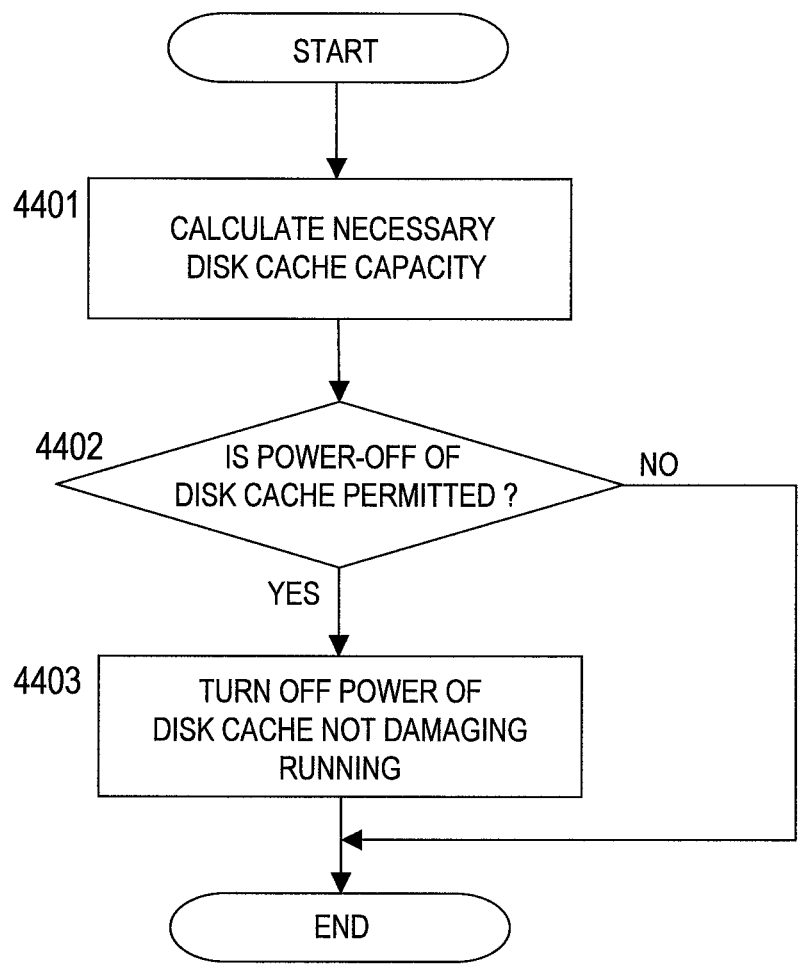
FIG. 44 is an explanatory diagram of processing executed to cut off power of a disk cache according to a seventh embodiment of this invention.

FIG. 44 is an explanatory diagram of processing executed to cut off power of a disk cache 144 according to the seventh embodiment of this invention.

First, a storage hypervisor 612 calculates a capacity necessary for the disk cache 144 (4401). Specifically, the storage hypervisor 612 refers to a storage resources control table 663 as shown in FIG. 10 to sum up values of disk cache capacities 1004 allocated to all virtual storage systems 613.

Next, the storage hypervisor 612 determines whether power of the disk cache 144 can be cut off (4402). In other words, the storage hypervisor 612 determines whether there is a disk cache 144 which does not hinder running of the virtual storage system 613 even when its power is cut off. Specifically, when the capacity calculated in Step 4401 is smaller than a total capacity of all disk caches 144 disposed in a storage system 120, a capacity difference thereof is not allocated to any virtual storage system 613. Thus, even when power of the disk cache 144 equivalent to the capacity difference is cut off, running of the virtual storage system 613 is not hindered.

For example, when a capacity calculated in Step 4401 is 10 gigabytes (GB), and a total of capacities of disk caches 144 actually mounted is 16 GB, even when power of the disk cache 144 of 6 GB is cut off, the running of the virtual storage system 613 is not hindered. Accordingly, it is possible to cut off power of a disk cache 144 of maximum 6 GB.

If it is determined in Step 4402 that power of the disk cache 144 cannot be cut off, the process is finished without cutting off the power of the disk cache 144.

On the other hand, if it is determined in Step 4402 that the power of the disk cache 144 can be cut off, the storage hypervisor 612 cuts off the power of the disk cache 144 which does not hinder the running of the virtual storage system 613 even when its power is cut off (4403).

For example, the power of the disk cache 144 may be cut off for each physical memory module. Alternatively, cutting of power may be permitted for each memory bank. Alternatively, cutting of power may be permitted for each memory page. When power of the memory of 6 GB is cut off as in the case of the aforementioned example, in the case of cutting off power for each memory module of 4 GB, power of only one memory module can be cut off. It is because a cache capacity of 10 GB cannot be ensured when power of two memory modules is cut off. Thus, when the seventh embodiment is applied, the power of the disk cache 144 should preferably be cut off by a unit as small as possible (e.g., each page).

In the example of FIG. 1E, when power of the two disk caches 144 is cut off, it is not preferable to cut off power of two disk caches 144 (e.g., disk caches (0) 144A and (1) 144B) in the single disk cache board 142. It is because since remaining disk caches (e.g., disk caches (2) 144C and (3) 144D) are in the single disk cache board 142 (e.g., disk cache board (1) 142B), all cache data are lost by a fault of the disk cache board 142.

Accordingly, to use a plurality of disk cache boards 142 in any time, the power of the disk cache 144 should preferably be cut off. In the above-mentioned case, for example, it is advised to cut off power of the disk caches (0) 144A and (2) 144C.

According to the seventh embodiment, it is possible to reduce power consumption by cutting off the power of the disk cache 144 which does not hinder the running of the virtual storage system 613 even when its power is cut off.

Next, an eighth embodiment of this invention will be described.

The configuration of the first embodiment described above referring to FIGS. 1 to 16 is applied to the eighth embodiment except for differences described below. Differences of the eighth embodiment from the first will be described below.

The computer system of the first embodiment includes one storage system 120, and two server systems 100 are connected to one storage system 120. On the other hand, a computer system of the eighth embodiment includes two storage systems 120, and one server system 100 is connected to each storage system 120. Remote copying is carried out between the two storage systems 120.

Figures 45, 46:
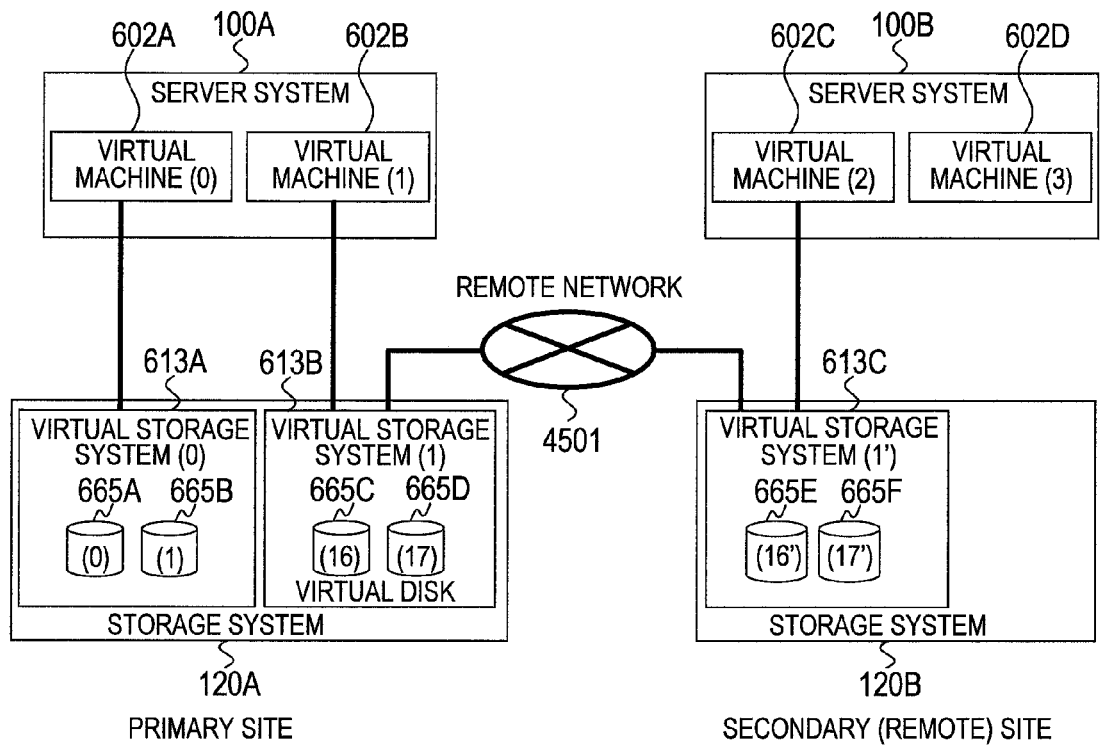
FIG. 45 is a functional block diagram of a computer system according to an eighth embodiment of this invention.
FIG. 46 is an explanatory diagram of a virtual disk control table according to the eighth embodiment of this invention.

FIG. 45 is a functional block diagram of the computer system according to the eighth embodiment of this invention.

The computer system of the eighth embodiment includes server systems 100A and 100B, and storage systems 120A and 120B.

Hardware configurations and functional block diagrams of the server systems 100A and 100B are similar to those of the server system 100 of the first embodiment, and thus detailed description thereof will be omitted. The server system 100A includes virtual machines (0) 602A and (1) 602B. The server system 100B includes virtual machines (2) 602C and (3) 602D.

Hardware configurations and functional block diagrams of the storage systems 120A and 120B are similar to those of the storage system 120 of the first embodiment, and thus detailed description thereof will be omitted.

The storage system 120A includes virtual storage systems (0) 613A and (1) 613B. The virtual storage system (0) 613A includes virtual disks (0) 665A and (1) 665B. The virtual storage system (1) 613B includes virtual disks (16) 665C and (17) 665D.

The storage system 120B includes a virtual storage system (1') 613C. The storage system 120B may include more virtual storage systems 613. The virtual storage system (1') 613C includes virtual disks (16') 665E and (17') 665F.

According to the eighth embodiment, the virtual storage system (0) 613A is allocated to the virtual machine (0) 602A. In other words, the virtual machine (0) 602A uses the virtual storage system (0) 613A. Similarly, the virtual storage system (1) 613B is allocated to the virtual machine (1) 602B. The virtual storage system (1') 613C is allocated to the virtual machine (2) 602C.

The storage systems 120A and 120B are installed in places geographically separate from each other. The virtual storage systems (1) 613B and (1') 613C are interconnected via a remote network 4501. For example, the remote network 4501 is a wide-area communication network to which Internet protocol (IP) is applied.

Remote copying is carried out between the virtual storage systems (1) 613B and (1') 613C. The remote copying is a technology for copying data stored in the storage system 120 to another storage system to prevent a loss of data caused by a disaster or a system fault. More specifically, a copy of the data stored in the storage system 120 is transmitted to another storage system to be stored in a storage system 120 of a transmission destination.

In the example of FIG. 45, the virtual machine (1) 602B requests writing of data in the virtual disk (16) 665C or (17) 665D. The virtual storage system (1) 613B writes data in response to the request, and transmits a copy of data written in the virtual disks (16) 655C and (17) 665D to the virtual storage system (1') 613C via the remote network 4501.

The virtual storage system (1') 613C writes the data written in the virtual disk (16) 665C in a virtual disk (16') 665E, and the data written in the virtual disk (17) 665D in a virtual disk (17') 665F. As a result, the same data is stored in the virtual disks (16) 665C and (16') 665E, and the same data is stored in the virtual disks (17) 665D and (17') 665F.

Thus, a set of virtual disks 665 that store the same data as a result of the remote copying is described as "pair". In the description below, of the virtual disks 665 belonging to a pair, a virtual disk 665 which becomes a copying source of data is described as "primary virtual storage disk 613". A virtual storage system 613 that includes the primary virtual disk 665 is described as "primary virtual storage system 613". A virtual disk 665 that becomes a copying destination of data is described as "secondary virtual disk 665". A virtual storage system 613 that includes the secondary virtual disk 665 is described as "secondary virtual storage system 613".

In the example of FIG. 45, the virtual storage system (1) 613B is a primary virtual storage system 613. The virtual storage system (1') 613C is a secondary virtual storage system 613. The virtual disks (16) 665C and (17) 665D are primary virtual disks 665. The virtual disks (16') 665E and (17') 665F are secondary virtual disks 665.

When data is written in the primary virtual disk 665, the writing may be not be immediately copied to the secondary virtual disk 665. For example, when the remote network 4501 is congested, data transmission for copying may be executed after the congestion is solved.

FIG. 46 is an explanatory diagram of a virtual disk control table 622 according to the eighth embodiment of this invention.

The virtual disk control table 622 holds information for managing allocation of a virtual disk 655 to the virtual machine 602. Additionally, the virtual disk control table 622 of the eighth embodiment holds information for managing a pair of virtual disks 665.

Specifically, the virtual disk control table 622 includes seven columns of a virtual machine number 801, a virtual storage number 802, a logical unit number 803, a virtual disk number 804, a pair state 4601, a secondary virtual storage number 4602, and a secondary virtual disk number 4603.

Referring to FIG. 8, the virtual machine number 801, the virtual storage number 802, the logical unit number 803, and the virtual disk number 804 are similar to those of the first embodiment, and thus description thereof will be omitted.

Information regarding a pair to which the virtual disk 665 indicated by the virtual disk number 804 is registered in the pair state 4601. Specifically, if the virtual disk 665 does not belong to the pair, "0" is registered in the pair state 4601 corresponding to the virtual disk 665. If the virtual disk 665 belongs to the pair, and the virtual disk 665 is a primary virtual disk 665, "1" is registered in the pair state 4601 corresponding to the virtual disk 665. If the virtual disk 665 belongs to the pair, and the virtual disk 665 is a secondary virtual disk 665, "2" is registered in the pair state 4601 corresponding to the virtual disk 665.

Information indicating the secondary virtual disk 665 belonging to the same pair as that of the virtual disk 665 indicated by the virtual disk number 804 is registered in the secondary virtual storage number 4602 and the secondary virtual disk number 4603. An identifier of the virtual storage system 613 including the secondary virtual disk 665 is registered in the secondary virtual storage number 4602, and an identifier of the secondary virtual disk 665 is registered in the secondary virtual disk number 4603. In FIG. 46, "none (n/a)" is shown in the secondary virtual storage number 4602 and the secondary virtual disk number 4603 corresponding to the virtual disk 665 not belonging to the pair.

In the example of FIG. 46, "0", "n/a", and "n/a" are registered in the pair state 4601, the secondary virtual storage number 4602, and the secondary virtual disk number 4603 corresponding to a value "121" of the virtual disk number 804. Those indicate that the virtual disk 665 having an identifier "121" does not belong to the pair.

"1", "1'", and "16'" are registered in the pair state 4601, the secondary virtual storage number 4602, and the secondary virtual disk number 4603 corresponding to a value "16" of the virtual disk number 804. Those indicate that the virtual disk (16) 665C belongs to the pair as a primary virtual disk 665, and the secondary virtual disk 665 of the pair is a virtual disk (16') 665E of the virtual storage system (1') 613C.

As in the case of the first embodiment, each storage system 120 holds a virtual disk control table 661 including information similar to that of the virtual disk control table 622. Accordingly, in the description below, FIG. 46 is referred to also as an explanatory diagram of the virtual disk control table 661. However, the virtual disk control table 661 may include only information regarding a storage system 120 which holds the virtual disk control table 661.

Figure 47:
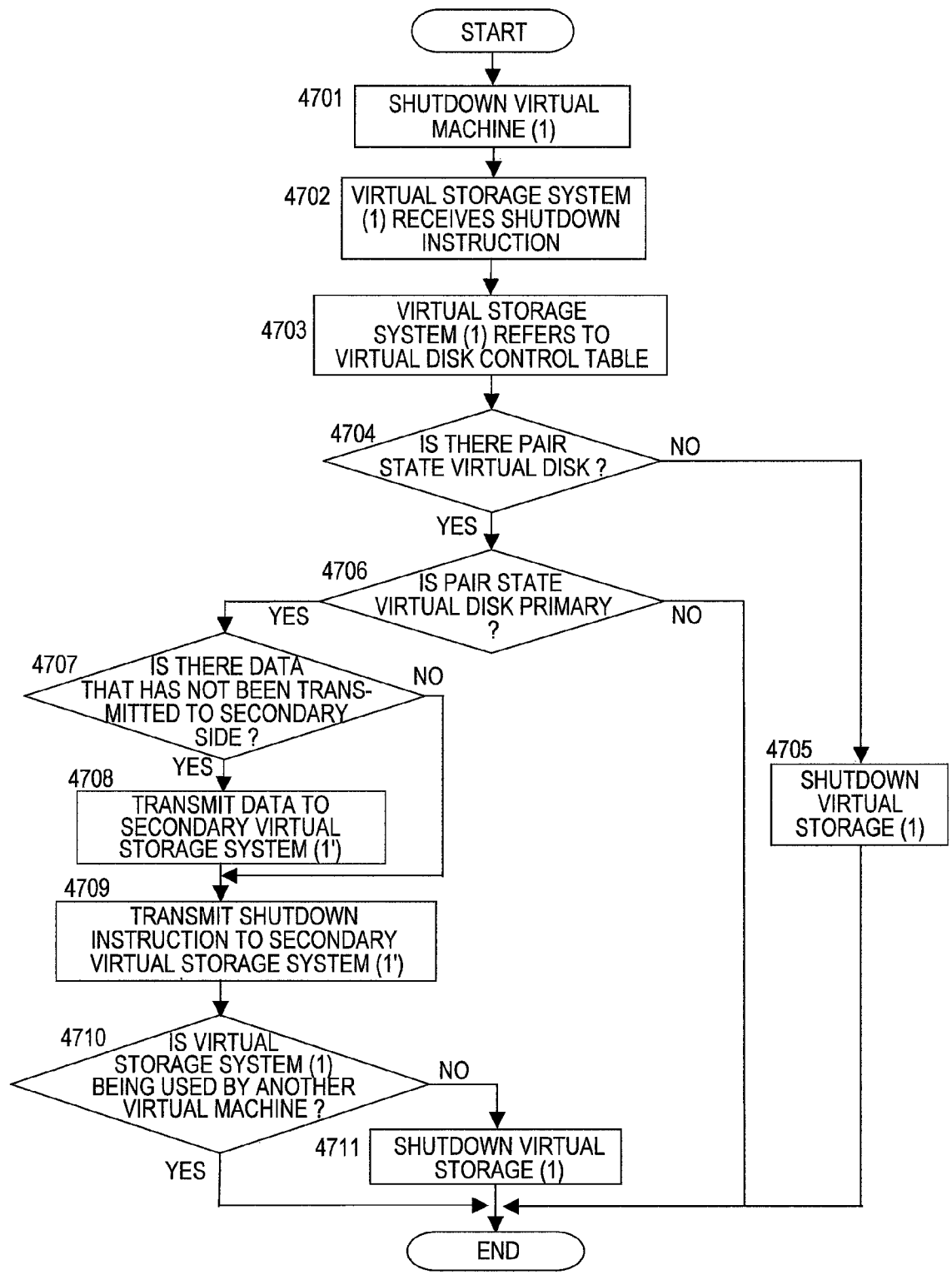
FIG. 47 is a flowchart of processing executed by a storage system when a virtual machine shuts down according to the eighth embodiment of this invention.

FIG. 47 is a flowchart of processing executed by the storage system 120 when the virtual machine 602 shuts down according to the eighth embodiment of this invention.

As an example, referring to FIG. 47, processing executed by the virtual storage system (1) 613B when the virtual machine (1) 602B shown in FIG. 45 shuts down will be described.

First, the virtual machine (1) 602B shuts down (4701).

Then, the virtual storage system (1) 613B receives a shutting-down instruction (4702). As in the case of Step 1611 of FIG. 16, this is an instruction to power off the virtual storage system (1) 613B. For example, the instruction is transmitted from the control terminal 150.

The virtual storage system (1) 613B refers to the virtual disk control table 661 shown in FIG. 46 (4703).

The virtual storage system (1) 613B determines whether the virtual storage system (1) 613B includes a virtual disk 665 belonging to a pair by referring to the virtual disk control table 661 (4704). Specifically, when at least one of values of the pair state 4601 corresponding to a value "1" of the virtual storage number 802 is "1" or "2", it is determined that the virtual storage system (1) 613B includes the virtual disk 665 belonging to the pair.

If it is determined in Step 4704 that the virtual storage system (1) 613B does not include the virtual disk 665 belonging to the pair, the virtual storage system (1) 613B shuts down (4705) and the process is finished. In this case, Steps 1612 to 1618 of FIG. 16 are executed in Step 4705.

On the other hand, if it is determined in Step 4704 that the virtual storage system (1) 613B includes the virtual disk 665 belonging to the pair, the virtual storage system (1) 613B determines whether the virtual disk 665 belonging to the pair is a primary virtual disk 665 (4706).

If it is determined in Step 4706 that the virtual disk 665 belonging to the pair is not a primary virtual disk 665, the virtual storage system (1) 613B includes a secondary virtual disk 665. In this case, as the virtual storage system (1) 613B cannot be shut down, the process is finished without executing shutting-down. The reason is as follows.

When the virtual storage system 613 including the secondary virtual disk 665 shuts down before a copy of data written in the primary virtual disk 665 is transmitted to the secondary virtual disk 665, inconsistency of data occurs between the primary virtual disk 665 and the secondary virtual disk 665. Use of the inconsistent data may be inhibited. The secondary virtual storage system 613 cannot know whether there still remains data not copied in the secondary virtual disk 665 until it obtains information from the primary virtual storage system 613. Accordingly, the secondary virtual storage system 613 cannot be shut down according to a shutting-down instruction from the control terminal 150.

However, as described below referring to FIG. 48, the secondary virtual storage system 613 can be shut down upon reception of a shutting-down instruction from the primary virtual storage system 613.

On the other hand, if it is determined in Step 4706 that the virtual disk 665 belonging to the pair is a primary virtual disk 665, the virtual storage system (1) 613B determines whether there still remains data not transmitted to the secondary virtual storage system 613 (4707). The data not having been transmitted is a copy of data written in the primary virtual disk 665, and not transmitted to the secondary virtual storage system 613 yet.

If it is determined in Step 4707 that there still remains data not having been transmitted, the virtual storage system (1) 613B transmits the untransmitted data (4708). The secondary virtual storage system 613 that has received the data writes the received data in the secondary virtual disk 665.

Next, the virtual storage system (1) 613B transmits a shutting-down instruction to the secondary virtual storage system (in the example of FIG. 45, the virtual storage system (1') 613C) (4709).

On the other hand, if it is determined in Step 4707 that there does not remain data not having been transmitted, the virtual storage system (1) 613B executes Step 4709 without executing Step 4708.

Next, the virtual storage system (1) 613B determines whether the virtual storage system (1) 613B is allocated to the other virtual machine 602 (4710). The other virtual machine 602 means a virtual machine 602 other than the virtual machine (1) 602A shut down in Step 4701. The determination of Step 4701 is executed by referring to the virtual machine number 801 and the virtual storage number 802 of the virtual disk control table 622 shown in FIG. 46.

If it is determined in Step 4710 that the virtual storage system (1) 613B has been allocated to the other virtual machine 602, even after the virtual machine (1) 602A shuts down, the virtual storage system (1) 613B is used by the other virtual machine 602. Accordingly, the process is finished without shutting down the virtual storage system (1) 613B.

On the other hand, if it is determined in Step 4710 that the virtual storage system (1) 613B has not been allocated to any other virtual machines 602, after the virtual machine (1) 602A shuts down, the virtual storage system (1) 613B is not used by any virtual machines 602. In this case, shutting-down of the virtual storage system (1) 613B is executed (4711) and the process is finished. In this case, in Step 4711, Steps 1612 to 1618 of FIG. 16 are executed.

Figure 48:
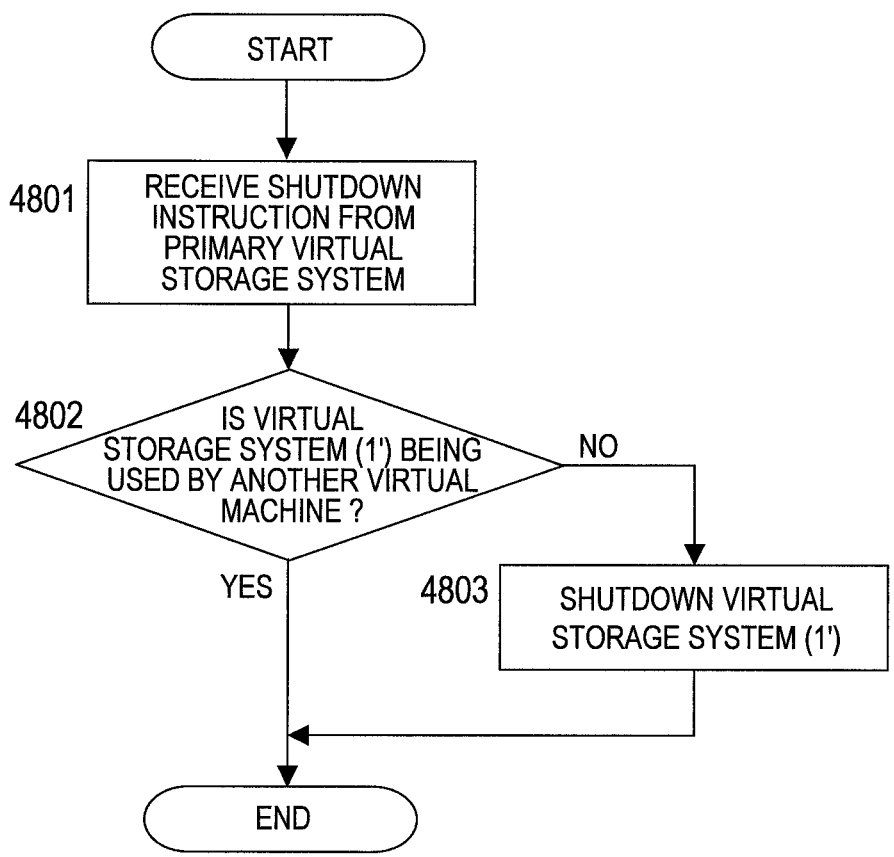
FIG. 48 is a flowchart of processing executed by a secondary virtual storage system which receives a shutdown instruction from a primary virtual storage system according to the eighth embodiment of this invention.

FIG. 48 is a flowchart showing processing executed by the secondary virtual storage system 613 which has received a shutting-down instruction from the primary virtual storage system 613 according to the eighth embodiment of this invention.

The processing of FIG. 48 is executed by the secondary virtual storage system 613 which has received the instruction transmitted in Step 4709 of FIG. 47. A case where the secondary virtual storage system 613 is a virtual storage system (1') 613C as in the case of FIG. 45 will be described below.

First, the virtual storage system (1') 613C receives a shutting-down instruction from the primary virtual storage system (1) 613B (4801). This instruction is transmitted in Step 4709 of FIG. 47.

Next, the virtual storage system (1') 613C determines whether the virtual storage system (1') 613C is allocated to the other virtual machine 602 (4802). The other virtual machine 602 means a virtual machine 602 to which the virtual disk 665 other than the virtual disk 665 belonging to the same pair of the virtual disk 665 allocated to the virtual machine 602 shut down in Step 4701 has been allocated among the virtual machines 602 to which the virtual storage system (1') 613C has been allocated.

In the examples of FIGS. 45 to 47, in Step 4701, the virtual storage system (1) 613B shuts down. Virtual disks (16) 665C and (7) 665D have been allocated to the virtual storage system (1) 613B. The virtual disks (16') 665E and (17') 665F belong to the same pairs of the virtual disks (16) 665C and (17) 665D. Accordingly, a virtual machine 602 to which a virtual disk 665 other than the virtual disks (16') 665E and (17') 665F has been allocated is the other virtual machine 602 in Step 4802.

As shown in FIG. 45, when the virtual storage system (1') 613C does not include virtual disks 665 except for the virtual disks (16') 665E and (17') 665F, in Step 4802, it is determined that the virtual storage system (1') 613C has not been allocated to the other virtual machine 602.

If it is determined in Step 4802 that the virtual storage system (1') 613C has been allocated to the other virtual machine 602, the processing is finished without shutting down the virtual storage system (1') 613C.

On the other hand, if it is determined in Step 4802 that the virtual storage system (1') 613C has not been allocated to the other virtual machine 602, shutting-down of the virtual storage system (1') 613C is executed (4803) and the processing is finished. The shutting-down of Step 4803 is executed as in the case of Step 4711 of FIG. 47.

In Step 4803, the control terminal 150 may transmit a shutting-down instruction to the virtual machine (2) 602C to which the virtual storage system (1') 613C to be shut down has been allocated.

According to the eighth embodiment, when a pair of virtual disks 665 has been generated, and the virtual machine 602 to which the primary virtual storage system 613 has been allocated shuts down, the secondary virtual storage system 613 belonging to the same pair of the primary virtual storage system 613 (i.e., secondary virtual storage system 613 including the secondary virtual disk 665 of the copying destination of the data written in the virtual disk 665 of the primary virtual storage system 613) is shut down. As a result, it is possible to reduce power consumption of the entire computer system.

Next, a ninth embodiment of this invention will be described.

The configuration of the first embodiment described above referring to FIGS. 1 to 16 is applied to the ninth embodiment except for differences described below. Herein, the differences of the ninth embodiment from the first will be described.

The computer system of the first embodiment includes one storage system 120, and the two server systems 100 are connected to one storage system 120. On the other hand, a computer system of the ninth embodiment includes two storage systems 120. One storage system 120 is externally connected to the other storage system 120.

Figure 49:
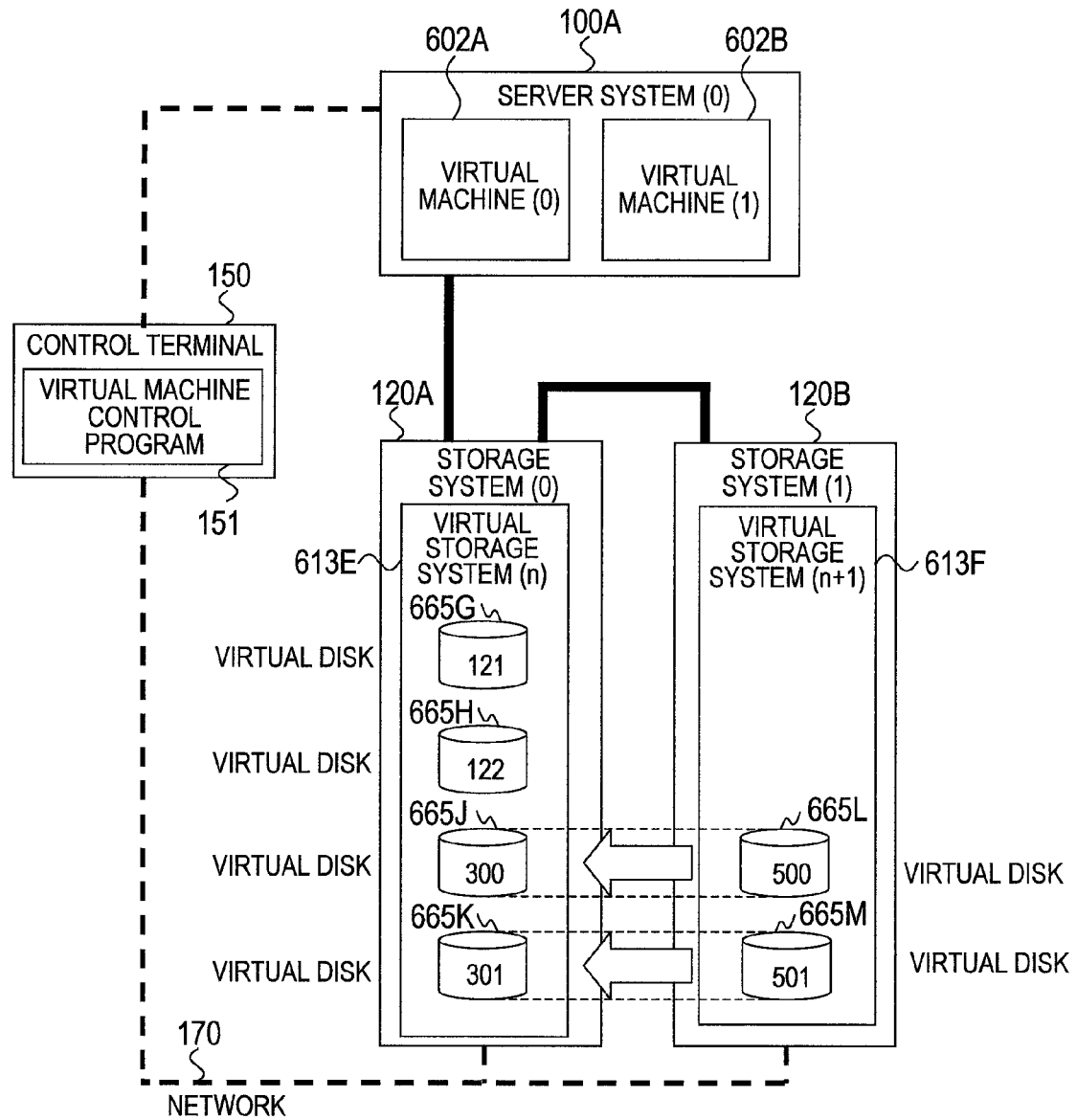
FIG. 49 is a functional block diagram of a computer system according to a ninth embodiment of this invention.

FIG. 49 is a functional block diagram of the computer system according to the ninth embodiment of this invention.

The computer system of the ninth embodiment includes a server system (0) 100A, storage systems (0) 120A and (1) 120B, and a control terminal 150.

A hardware configuration and a functional block diagram of the server system (0) 100A are similar to those of the server system (0) 100A of the first embodiment, and thus detailed description thereof will be omitted. The server system (0) 100A includes virtual machines (0) 602A and (1) 602B.

Hardware configurations and functional block diagrams of the storage systems (0) 120A and (1) 120B are similar to those of the storage system 120 of the first embodiment, and thus detailed description thereof will be omitted.

The storage system (0) 120A includes a virtual storage system (n) 613E. The virtual storage system (n) 613E includes virtual disks (121) 665G, (122) 665H, (300) 665J, and (301) 665K.

The storage system (1) 120B includes a virtual storage system (n+1) 613F. The virtual storage system (n+1) 613F includes virtual disks (500) 665L and (501) 665M.

According to the ninth embodiment, the virtual storage system (n) 613E is externally connected to the virtual storage system (n+1) 613F. In the example of FIG. 49, the virtual disk (500) 665L is externally connected to the virtual disk (300) 665J, and the virtual disk (501) 665M is externally connected to the virtual disk (301) 665K. In this case, no physical disk drive 148 in the storage system (0) 120A is allocated to the virtual disks (300) 665J or (301) 665K.

For example, the virtual machine 602 issues an access request (i.e., writing or reading request) to target the virtual disk (300) 665J. The virtual storage system (n) 613E that has received the access request converts the access request into an access request to the externally connected virtual disk (500) 665L and transmit the converted access request to the virtual storage system (n+1) 613F. The virtual storage system (n+1) 613F that has received the access request executes access according to the request and transmit a response to the request to the virtual storage system (n) 613E. The virtual storage system (n) 613E that has received the response converts the response into a response from the virtual storage system (n) 613E and transmit the converted response to the virtual machine 602.

FIG. 50 is an explanatory diagram of a disk address translation table 662 according to the ninth embodiment of this invention.

The disk address translation table 662 holds information for managing a correlation between the virtual disk 665 in the virtual storage system 613 and the physical disk drive 148 allocated to the virtual disk 665. Additionally, the disk address translation table 662 holds information for managing a correlation between the virtual disk 665 in the virtual storage system 613 and a virtual disk 665 in another storage system 613 externally connected to the virtual disk 665.

Specifically, the disk address translation table 662 of the ninth embodiment includes six columns of a virtual storage system number 5001, a virtual disk number 901, a virtual block address 902, a physical disk number 903, a physical block address 904, and an external disk flag 5002.

The virtual disk number 901 and the virtual block address 902 are similar to those of the first embodiment, and thus description thereof will be omitted.

An identifier of the physical disk drive 148 allocated to the virtual disk 665 is registered in the physical disk number 903. However, when a virtual disk 665 in another virtual storage system 613 is externally connected to the virtual disk 665, an identifier of the externally connected virtual disk 665 is registered in the physical disk number 903.

A physical block address for uniquely identifying a logical block of the physical disk drive 148 allocated to the virtual disk 665 in each physical disk drive is registered in the physical block address 904. However, when a virtual disk 665 in another virtual storage system 613 is externally connected to the virtual disk 665, a virtual block address of the externally connected virtual disk 665 is registered in the physical block address 904.

An identifier of the virtual storage system 613 including the virtual disk 665 indicated by the virtual disk number 901 is registered in the virtual storage system number 5001.

Information indicating external connection of another virtual disk 665 to the virtual disk 665 indicated by the virtual disk 901 is registered in the external disk flag 5002. In the example of FIG. 50, when the virtual disk 665 is externally connected, "1" is registered in the external disk flag 5002. In this case, an identifier of the externally connected virtual disk 655 and a virtual block address in the externally connected virtual disk 655 are registered in the physical disk number 903 and the physical block address 904, respectively.

As an example, referring to FIGS. 49 and 50, each column corresponding to a value "300" of the virtual disk number 901 will be described. In this example, "n" is registered in the virtual storage system number 5001. This indicates that the virtual disk (300) 665J is included in the virtual storage system (n) 613E.

"1" is registered in the external disk flag 5002 corresponding to the virtual disk (300) 665J. This indicates that another virtual disk 665 is externally connected to the virtual disk (300) 665J. In this case, an identifier of the externally connected virtual disk 665 and a virtual block address are registered in the physical disk number 903 and the physical block address 904.

"0x00000000", "500", and "0x00000000" are registered in the virtual block address 902, the physical disk number 903, and the physical block address 904 corresponding to the virtual disk (300) 665J, respectively. This indicates that the virtual disk (500) 665L is externally connected to the virtual disk (300) 665J, and the address "0x00000000" in the virtual disk (300) 665J corresponds to an address "0x00000000" in the virtual disk (500) 665L.

In this case, upon reception of an access request targeting the address "0x00000000" of the virtual disk (300) 665J, the virtual storage system (n) 613E transmits an access request obtained by converting the target of the received access request into an address "0x00000000" of the virtual disk (500) 665L to the virtual storage system (n+1) 613F.

FIG. 51 is an explanatory diagram of a storage resources control table 621 according to the ninth embodiment of this invention.

The storage resources control table 621 of the ninth embodiment includes ten columns of a virtual machine number 1001, a virtual storage system number 1002, a virtual disk number 1003, a disk cache capacity 1004, a CPU 1005 in charge, the internal bandwidth 1006, a virtual channel adaptor 1007, a channel adaptor 1008, an I/O adaptor 1009, and a virtual I/O adaptor 1010. Description of those columns will be omitted as those are similar to those of the first embodiment as shown in FIG. 10.

By assigning a unique identifier in the entire computer system including one or more virtual machines 602 and one or more virtual storage systems 613 to each resource in the computer system, it is possible to manage the resources in a unified manner (no matter which apparatus the resources belong to).

Figure 52:
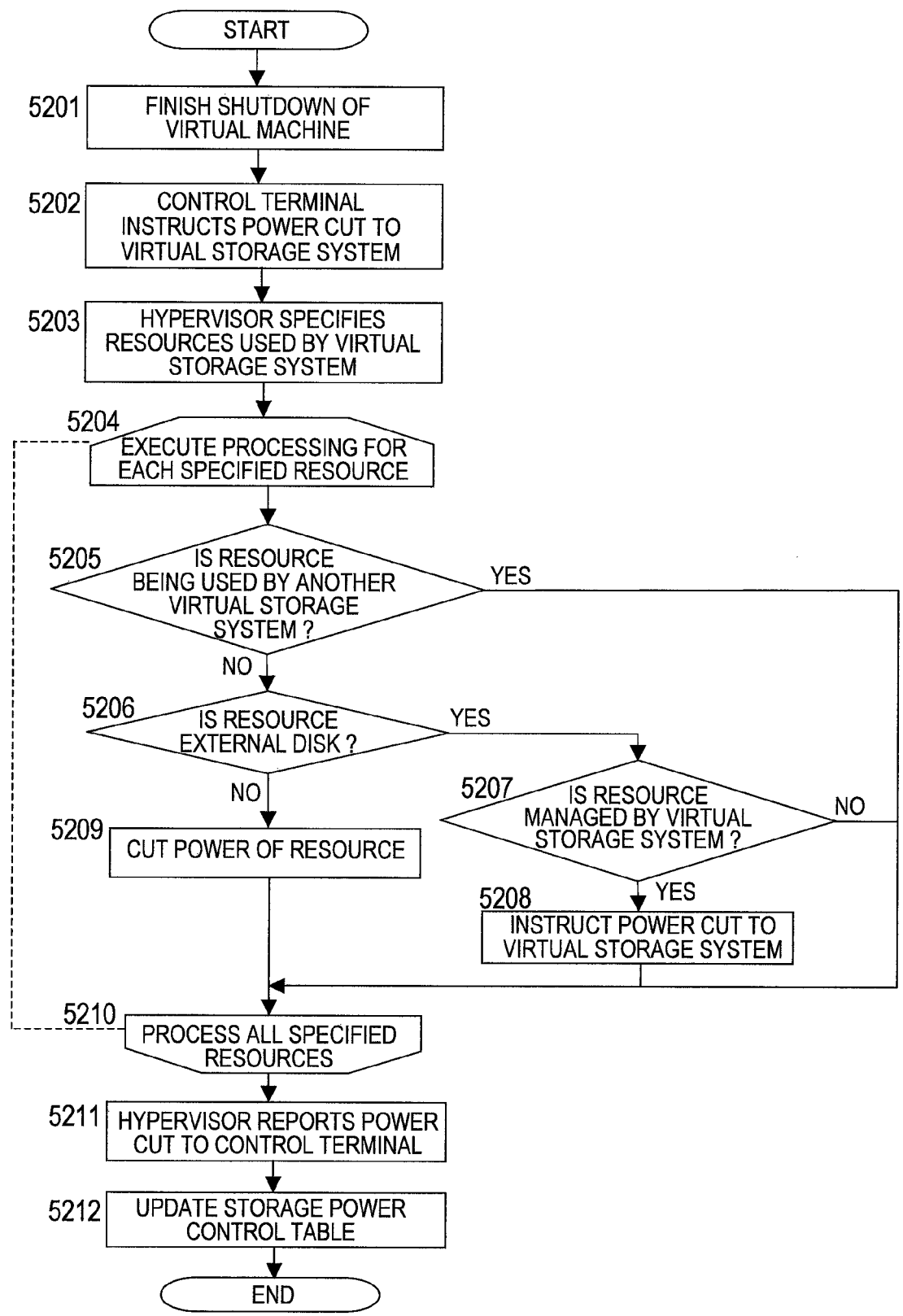
FIG. 52 is a flowchart of shutdown processing of a virtual machine executed according to the ninth embodiment of this invention.

FIG. 52 is a flowchart of shutdown processing of the virtual machine 602 executed according to the ninth embodiment of this invention.

The processing of FIG. 52 is executed when the user cuts off power of one of the virtual machines 602. The shutdown processing shown in FIG. 52 of the virtual machine 602 of the ninth embodiment is similar to that of the first embodiment shown in FIG. 16 except for differences below. Differences of the shutdown processing of the virtual machine 602 of the ninth embodiment from that of the first embodiment will be described below. Meanings of "relevant resource", "relevant virtual storage system 613" and the like are as described above referring to FIG. 16.

First, shutting-down of the virtual machine is executed (5201). This processing corresponds to Steps 1601 to 1610 of FIG. 16, and thus description thereof will be omitted.

Steps 5202 to 5205 are respectively similar to Steps 1611 to 1614 of FIG. 16, and thus description thereof will be omitted.

If it is determined in Step 5205 that the relevant resource has not been allocated to the virtual storage system 613 other than the relevant virtual storage system 613, a storage hypervisor 612 determines whether the relevant resource is an external disk (5206). "Relevant resource is external disk" means that the relevant virtual storage system 613 converts an access request to the relevant resource into an access request to the externally connected virtual storage system to transmit the access request. When the external disk flag 5002 corresponding to the relevant resource is "1", it is determined in Step 5206 that the relevant resource is an external disk.

If it is determined in Step 5206 that the relevant resource is an external disk, the relevant resource is included in a storage system 120 different from that including the relevant virtual storage system 613. Accordingly, the storage hypervisor 612 of the storage system 120 including the relevant storage system 613 cannot directly control power of the relevant resource. In this case, the storage hypervisor 612 determines whether the relevant resource is managed by one of the virtual storage systems 613 (5207).

If it is determined in Step 5207 that the relevant resource is managed by one of the virtual storage systems 613, the storage hypervisor 612 transmits an instruction to power off the relevant resource to the virtual storage system 613 which manages the relevant resource (5208).

On the other hand, if it is determined in Step 5207 that the relevant resource is not managed by any virtual storage system 613, the process proceeds to Step 5210 without cutting off the power of the relevant resource.

If it is determined in Step 5206 that the relevant resource is not an external disk, the relevant resource is included in the storage system 120 which includes the relevant virtual storage system 613. In this case, the process proceeds to Step 5209. Steps 5209 to 5212 are respectively similar to Steps 1615 to 1618 of FIG. 16, and thus description thereof will be omitted.

Referring to FIGS. 49 to 52, a case of shutting-down the virtual machine (0) 602A will be described. In this case, in Step 5201, the shutting-down of the virtual machine (0) 602A is finished. Virtual disks (121) 665G, (122) 665H, (300) 665J, and (301) 665K have been allocated to the virtual machine (0) 602A as shown in FIG. 51.

Physical disk drives (8) 148 and (9) 148 have been allocated to the virtual disk (121) 665G as shown in FIG. 50. A physical disk drive (10) 148 has been allocated to the virtual disk (122) 665H. An externally connected virtual disk (500) 665L has been allocated to the virtual disk (300) 665J. An externally connected virtual disk (501) 665M has been allocated to the virtual disk (301) 665K.

In this case, for the physical disk drives (8) 148, (9) 148, and (10) 148, in Step 5206, it is determined that the relevant resource is not an external disk. On the other hand, for the virtual disks (500) 665L and (501) 665M, in Step 5206, it is determined that the relevant resource is an external disk.

According to the ninth embodiment of this invention, the externally connected virtual storage system 613 is allocated to the virtual machine 602. When the virtual machine 602 shuts down, power of physical resources allocated to the externally connected virtual storage system 613 is shut down. As a result, it is possible to reduce power consumption of the entire computer system.

Next, a tenth embodiment of this invention will be described.

The configuration of the first embodiment described above referring to FIGS. 1 to 16 is applied to the tenth embodiment except for differences described below. The differences of the tenth embodiment from the first embodiment will be described below.

According to the first to ninth embodiments, when the virtual storage system 613 shuts down, it is determined whether the physical resources allocated to the device have been allocated to the other device. Then, the power of the physical resources not allocated to the other device is cut off as shown in FIG. 16 or the like. On the other hand, when even a resource allocated to the shut-down virtual storage system 613 has been allocated to the other virtual storage system 613, power of the resource cannot be cut off.

However, a load imposed on the resource allocated to the virtual storage system 613 is to be reduced as a result of shutting down the virtual storage system 613. Thus, it is possible to cut off power of resources unnecessary for the virtual storage system 613 can be cut off according to the reduced load. In other words, only resources necessary for covering loads imposed by the running virtual storage system are left, and power of the other resources is cut off. Accordingly, it is possible to reduce power consumption without lowering performance of the virtual storage system.

Figure 53:
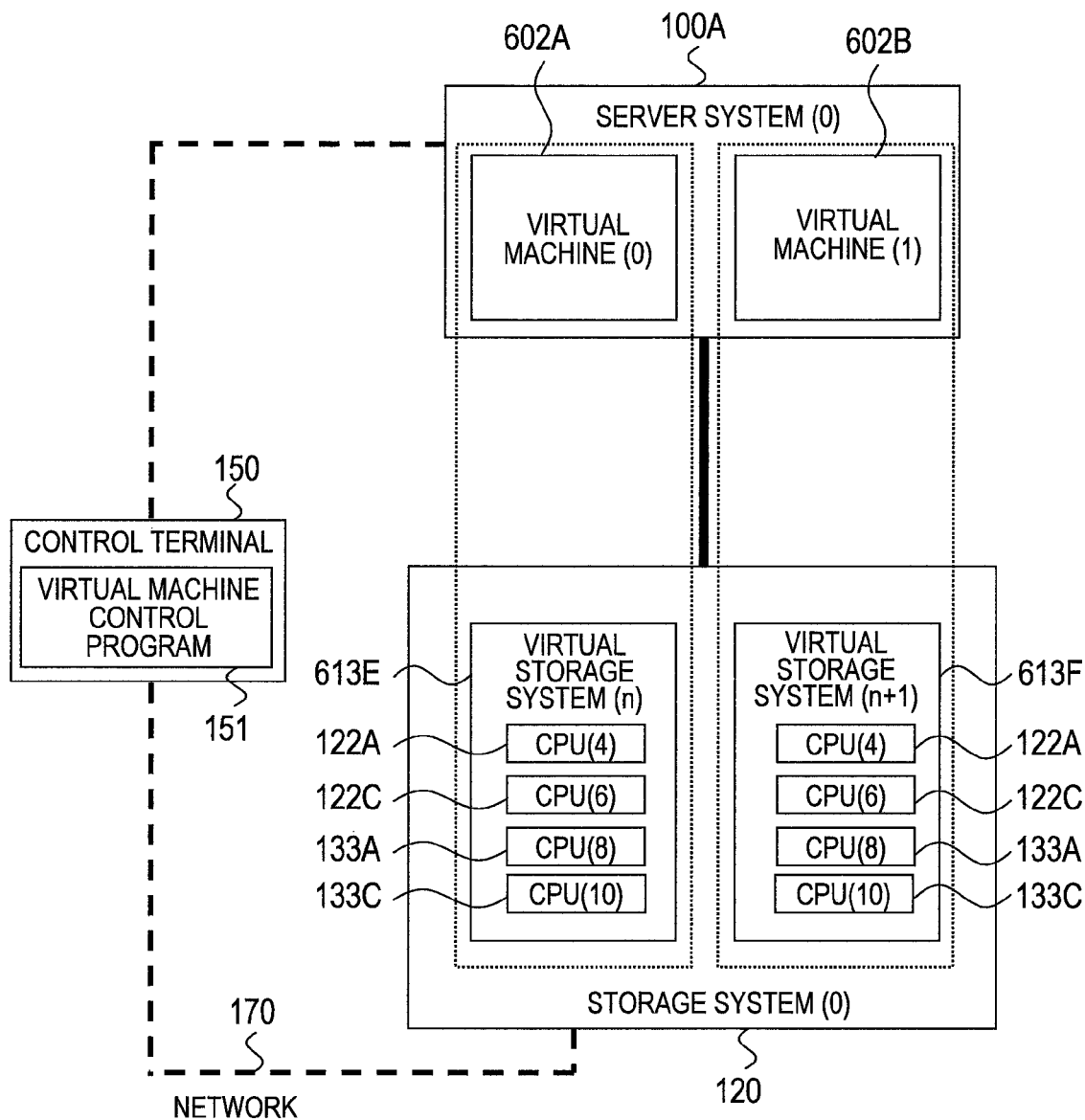
FIG. 53 is a functional block diagram of a computer system according to a tenth embodiment of this invention.
Figure 54:
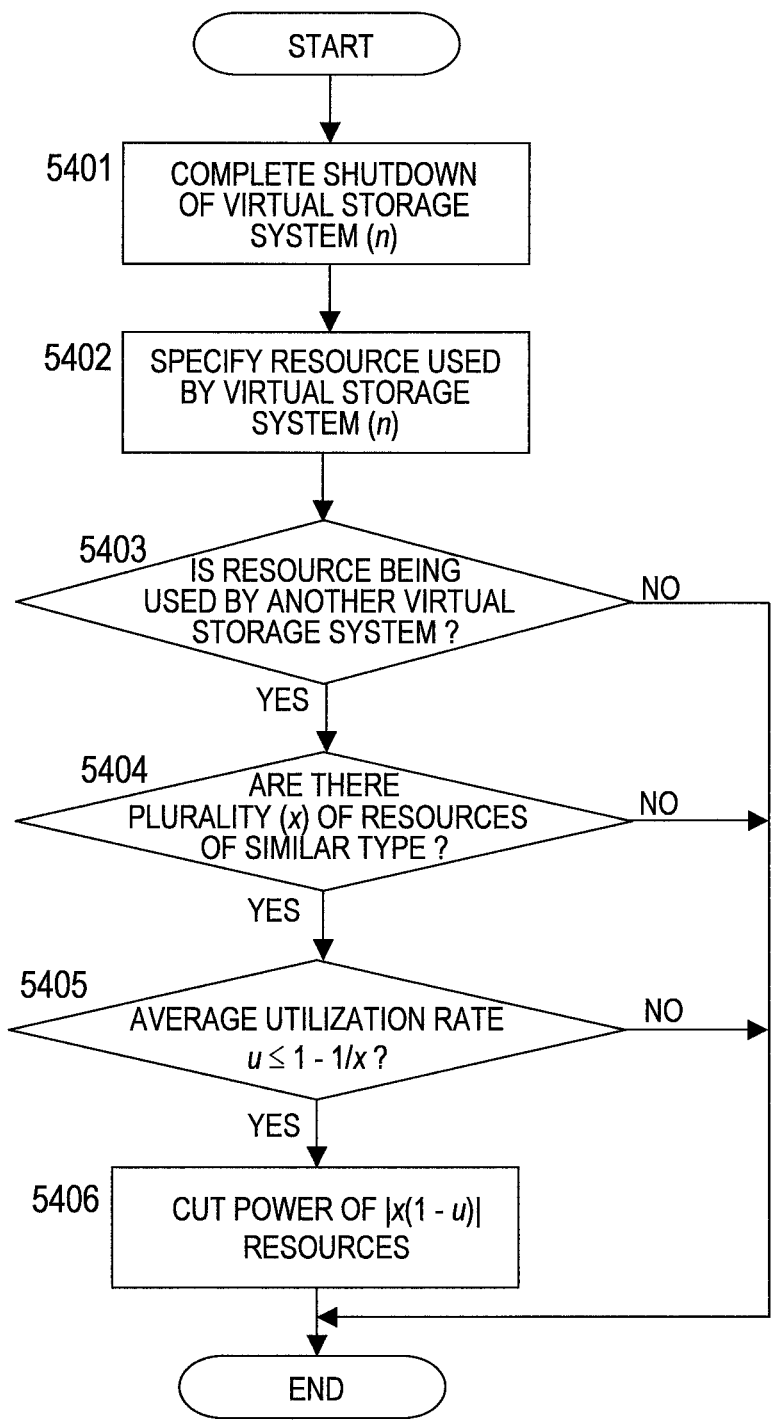
FIG. 54 is a flowchart of processing to power off physical resources based on a utilization rate according to the tenth embodiment of this invention.

Thus, according to the tenth embodiment, it is determined whether power of physical resources is powered based on a utilization rate of the physical resources. Referring to FIGS. 53 and 54, the tenth embodiment will be described below in detail.

FIG. 53 is a functional block diagram of a computer system according to the tenth embodiment.

The computer system of the tenth embodiment includes a server system (0) 100A, a storage system (0) 120, and a control terminal 150.

A hardware configuration and a functional block diagram of the server system (0) 100A are similar to those of the server system (0) 100A of the first embodiment, and thus detailed description thereof will be omitted. The server system (0) 100A includes virtual machines (0) 602A and (1) 602B.

A hardware configuration and a functional block diagram of the server system (0) 120 are similar to those of the storage system 120 of the first embodiment, and thus detailed description thereof will be omitted.

The storage system (0) 120 includes virtual storage systems (n) 613E and (n+1) 613F. CPU's (4) 122A, (6) 122C, (8) 133A, and (10) 133C have been allocated to the virtual storage system (n) 613E. Similarly, CPU's (4) 122A, (6) 122C, (8) 133A, and (10) 133C have been allocated to the virtual storage system (n+1) 613F. In other words, according to the tenth embodiment, each CPU 122 or the like has been allocated to two virtual storage systems 613.

Presuming that the first embodiment is applied to the example of FIG. 53, when the virtual machine (0) 602A shuts down, the virtual storage system (n) 613E allocated to the virtual machine (0) 602A also shuts down. However, the CPU's (4) 122A, (6) 122C, (8) 133A, and (10) 133C have all been allocated to the virtual storage system (n+1) 613F. Accordingly, power of these CPU's cannot be cut off.

However, when a load imposed on the CPU 122 or the like because of the shutting-down of the virtual storage system (n) 613E, the number of CPU's 122 or the like necessary for covering the load is reduced.

For example, it is presumed in FIG. 53 that an average utilization rate of the four CPU's 122 or the like is 100% as a result of imposing the same amount of loads on the storage system 120 by the virtual machines (0) 602A and (1) 602B. In this case, when the virtual machine (0) 602A and the virtual storage system (n) 613E shut down, the average utilization rate of the four CPU's 122 or the like is reduced to 50%.

When power of the two of the four CPU's 122 or the like is cut off, an average utilization rate of the remaining two CPU's 122 or the like is expected to be 100%. In other words, the virtual machine (1) 602B needs only two CPU's 122. In other words, the load imposed on the CPU 122 or the like can be covered by the remaining two CPU's 122 or the like. Accordingly, by cutting off power of the two CPU's 122 or the like, it is possible to reduce power consumption without lowering performance of the virtual storage system (n+1) 613F. Referring to FIG. 54, processing thus executed will be described.

FIG. 54 is a flowchart of processing to power off physical resources based on a utilization rate executed according to the tenth embodiment of this invention.

Referring to FIG. 54, a case where the virtual storage system (n) 613E shuts down in FIG. 53 will be described as an example.

First, shutting-down of the virtual storage system (n) 613E is completed (5401). The completion of this shutting-down is equivalent to an end of Step 1618 of FIG. 16.

Then, the storage hypervisor 612 specifies a resource allocated to the shut-down virtual storage system (n) 613E (5402). This specification is executed as in the case of Step 1612 of FIG. 16.

Next, the storage hypervisor 612 determines whether the resource specified in Step 5402 (i.e., relevant resource) has also been allocated to the virtual storage system 613 other than the shut-down virtual storage system (n) 613E (5403). This determination is executed as in the case of Step 1614 of FIG. 16.

If it is determined in Step 5403 that the relevant resource has not been allocated to the virtual storage system 613 other than the shut-down virtual storage system (n) 613E, power of the relevant resource can be cut off. In this case, the process is finished without executing cutting off of the power in Step 5406 described below.

On the other hand, if it is determined in Step 5403 that the relevant resource has also been allocated to the virtual storage system 613 other than the shut-down virtual storage system (n) 613E, the storage hypervisor 612 determines whether there are a plurality of resources similar in kind to the relevant resource and capable of individual controlling of power (5404). In other words, it is determined whether the relevant resource includes a plurality of devices whose power can be individually controlled.

In the example of FIG. 53, four CPU's 122 or the like are allocated to the virtual storage system (n+1) 613F. In this case, a CPU group constituted of four CPU's 122 or the like includes a plurality of devices (i.e., CPU 122 or the like) whose power can individually be controlled. In this case, in Step 5404, it is determined that a plurality of resources similar in kind to the relevant resource are present.

If it is determined in Step 5403 that a plurality of resources similar in kind to the relevant resource are not present, the power of the relevant resource cannot be cut off. In this case, the process is finished without executing cutting off of the power in Step 5406 described below.

On the other hand, if it is determined in Step 5403 that a plurality of resources similar in kind to the relevant resource are present, the storage hypervisor 612 determines whether an average utilization rate u of the plurality of resources is equal to or less than $1-1/x$ (5405). Here, x is a total value of the number of the relevant resource detected in Step 5404 and the resources similar in kind to the relevant resource.

If it is determined in Step 5405 that the average utilization rate u is larger than 1−1/x, when the power of the relevant resource (or one of the resources of the similar kind) is cut off, the remaining resources cannot cover loads imposed thereon. Thus, the processing is finished without executing cutting-off of the power in Step 5406 described below.

On the other hand, if it is determined in Step 5405 that the average utilization rate u is equal to or less than 1−1/x, even when power of at least one resource is cut off, the remaining resources can cover loads imposed thereon. Thus, the storage hypervisor 612 cuts off power of x(1−u) resources among the relevant resource and the resources of the similar kind (5406). However, when x(1−u) is not an integer, values after the decimal point are discarded. An integer part of x(1−u) indicates the number of resources unnecessary for the virtual storage system 613.

For example, when the average utilization rate of the four CPU's 122 or the like is 60%, u is "0.6" and x is "4". In this case, 1−1/x is 0.75, "yes" is determined in Step 5405. Because x(1−u) is 1.6, power of one CPU 122 or the like is cut off in Step 5406.

Thus, the process is finished.

According to the tenth embodiment of this invention, the processing of FIG. 54 is executed after the processing of FIG. 16 is finished. As a result, it is possible to cut off power of resources which are not necessary any more as the loads are reduced among resources whose power cannot be cut off by the processing of FIG. 16.

Next, an eleventh embodiment of this invention will be described.

Figure 55:
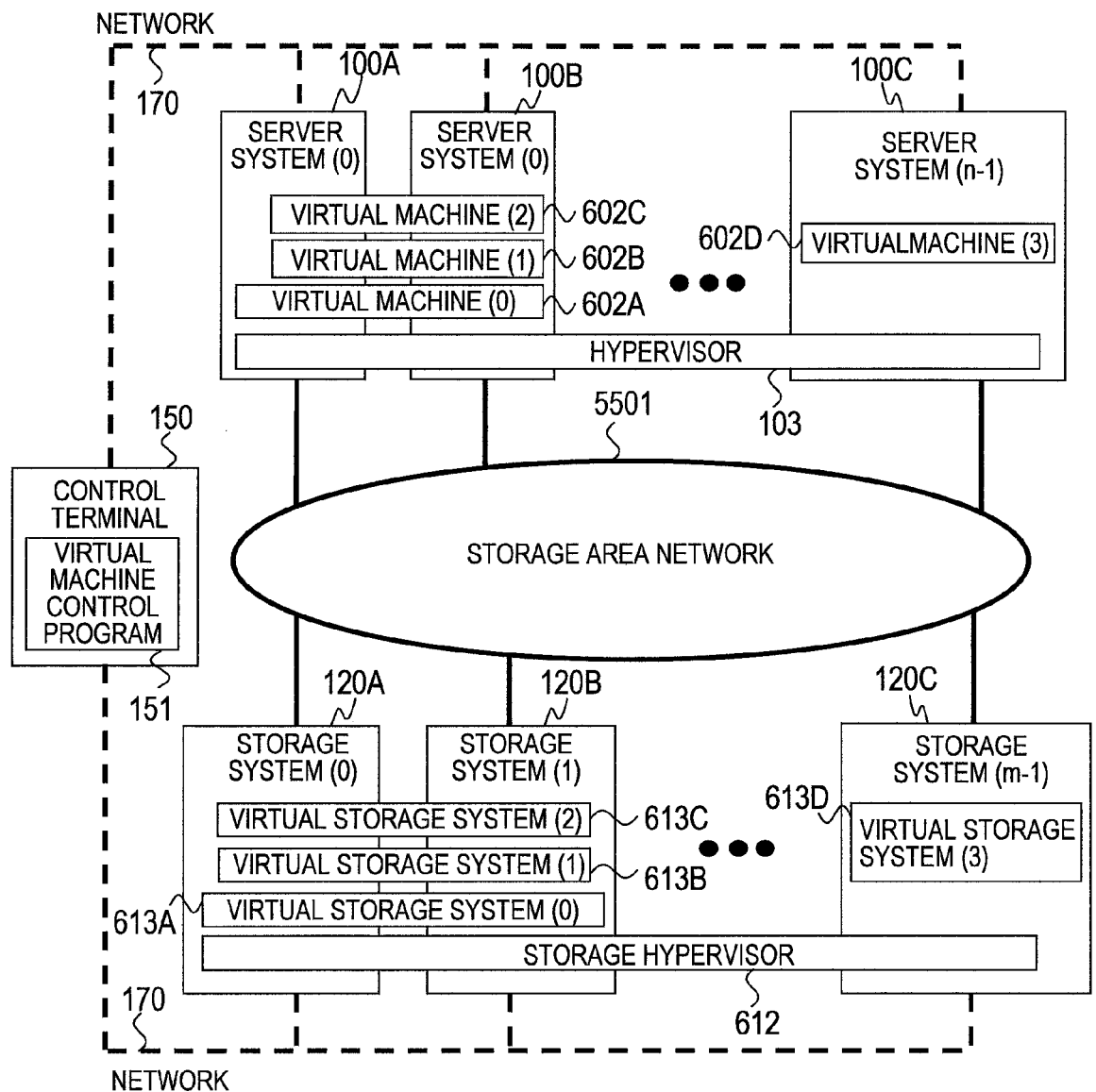
FIG. 55 is a functional block diagram of a computer system according to an eleventh embodiment of this invention.

FIG. 55 is a functional block diagram of a computer system according to the eleventh embodiment of this invention.

According to the first to tenth embodiments described above, the hypervisor 103 implements the plurality of virtual machines 602 in one computer by setting the logical partitions in each server system 100. Similarly, the storage hypervisor 612 implements the plurality of virtual storage systems 613 in one storage system 120. However, these hypervisors can allocate physical resources of a plurality of devices to one virtual device (i.e., virtual machine 602 or virtual storage system 613) by setting logical partitions over the plurality of devices.

The computer system of the eleventh embodiment shown in FIG. 55 includes n server systems 100 constituted of server systems (0) 100A to (n−1) 100C, and m storage systems 120 constituted of storage systems (0) 120A to (m−1) 120C. The server system 100 and the storage system 120 are connected to each other via a storage area network (SAN) 5501. Additionally, the server system 100 and the storage system 120 are connected to a control terminal 150 via a network 170.

In the example of FIG. 55, a hypervisor 103 that manages all the server systems 100 realizes a plurality of virtual machines 602. Specifically, virtual machines (0) 602A, (1) 602B, and (2) 602C are set over the server systems (0) 100A and (1) 100B. Physical resources of the server systems (0) 100A and (1) 100B are allocated to these virtual machines 602. Additionally, a virtual machine (3) 602D to which physical resources of the server system (n−1) 100C alone are allocated is set.

On the other hand, a storage hypervisor 612 that manages all the storage systems 120 realizes a plurality of virtual storage systems 613. Specifically, virtual storage systems (0) 613A, (1) 613B, and (2) 613C are set over the storage systems (0) 120A and (1) 120B. Physical resources of the storage systems (0) 120A and (1) 120B are allocated to these virtual storage systems 613. Additionally, a virtual storage system (3) 613D to which physical resources of the storage system (m−1) 120C alone is set.

Thus, the first to tenth embodiments can be applied to the computer system where the physical resources of the plurality of devices are allocated to the virtual machine 602 and the virtual storage system 612. In this case, processing similar to the aforementioned processing is executed.

What is claimed is:

1. A computer system, comprising:

a computer;

a storage system for storing data, wherein the storage system is coupled to the computer through an input/output (I/O) channel; and a management terminal, which is coupled to the computer and the storage system, wherein the storage system includes a first control module logically allocating first resources included in the storage system to a plurality of virtual storage systems, wherein the computer includes a second control module logically allocating second resources included in the computer to a plurality of virtual machines, wherein the management terminal stores first information indicating a relationship between the plurality of virtual storage systems and the plurality of virtual machines, wherein when the computer receives a first instruction from the management terminal, the first instruction instructing the computer to power off a first virtual machine of the plurality of virtual machines, the second control module determines whether a part of the second resources, which is allocated to the first virtual machine, is also allocated to any of the plurality of virtual machines other than the first virtual machine, and the second control module powers off the part of the second resources when the part of the second resources is not allocated to any of the plurality of virtual machines other than the first virtual machine, wherein after powering off the part of the second resources allocated to the first virtual machine, the management terminal specifies a first virtual storage system which is allocated to the first virtual machine by referring the first information, and sends a second instruction instructing to power off the specified first virtual storage system to the storage system, wherein when the storage system receives the second instruction, the first control module determines whether a part of the first resources, which is allocated to the first virtual storage system, is allocated to any of the plurality of virtual storage systems other than the first virtual storage system, and powers off the part of the first resources when the part of the first resources is not allocated to any of the plurality of virtual storage systems other than the first virtual storage system, wherein the first control module determines whether the part of the first resources is allocated to any of the plurality of virtual storage systems other than the first virtual storage system by referring to a storage power control table to determine whether a used virtual storage system of an entry corresponding to the first virtual storage system includes an identifier other than an identifier of the first virtual storage system, wherein a determination is made that the part of the first resources is not allocated to any of the virtual storage systems other than the first virtual storage system when the used virtual storage system number of the entry corresponding to the first virtual storage system does not include an identifier other than the identifier of the first virtual storage system, and wherein when the part of the first resources is powered off, the first control module reports a power cut to the management terminal, and a power state of the part of the first resources is updated in the storage power control table.

2. The computer system according to claim 1, wherein the first control module maintains powering on the part of the first resources when the part of the first resources is allocated to the plurality of virtual storage systems other than the first virtual storage system.

3. The computer system according to claim 1,
wherein the computer and the storage system are coupled via a channel switch,
wherein the channel switch includes a plurality of ports, and stores routing information indicating permission of communication among the plurality of ports,
wherein at least one first port of the plurality of ports is coupled to the computer and at least one second port of the plurality of ports is coupled to the storage system,
wherein the first information includes information indicating a correlation between the port and the computer coupled to the port and information indicating a correlation between the port and the storage system coupled to the port,
wherein the channel switch specifies the port allocated to the first virtual machine which is to be powered off,
wherein a determination is made as to whether the specified port is allocated to at least one virtual machine of the plurality of virtual machines which is not to be powered off, and
wherein the specified port is powered off when the specified port is not allocated to the at least one virtual machine of the plurality of virtual machines which is not to be powered off.

4. The computer system according to claim 1,
wherein the computer system further stores third information indicating a reduction level of power consumption, and
wherein the first control module determines presence of a redundant first resource when the level indicated by the third information is higher than a predetermined value, and powers off the redundant first resource when the redundant first resource is present.

5. The computer system according to claim 1,
wherein the storage system further includes a cache memory for temporarily storing at least one of data written by the computer and data read by the computer,
wherein the first resources include the cache memory, and
wherein the first control module calculates a capacity of the cache memory not allocated to any of the plurality of virtual machines based on the first information, and powers off the cache memory equivalent to the calculated capacity.

6. The computer system according to claim 1,
wherein the first virtual storage system includes a first virtual disk in which data is to be written,
wherein a virtual storage system of the plurality of virtual storage systems other than the first virtual storage system includes a second virtual disk, and
wherein the first control module for operating the first virtual storage system converts a received write request into a write request to write data in the second virtual disk upon reception of the write request to write data in the first virtual disk, transmits the converted write request, and transmits an instruction to power off the plurality of virtual storage systems other than the first virtual storage system including the second virtual disk when the first virtual storage system is a virtual storage system which is to be powered off.

7. The computer system according to claim 1, wherein the first control module determines whether the part of the first resources include a plurality of individually power-controllable devices, calculates the amount of the first resources necessary for the first virtual storage system based on an average utilization rate of the specified first resources when the specified first resources include the plurality of individually power-controllable devices, and powers off the devices included in the first resources to satisfy the calculated amount of the resources.

8. The computer system according to claim 1,
wherein the second control module determines whether the part of the second resources is allocated to any of the plurality of virtual machines other than the first virtual machine by referring to a server power control table to determine whether a used virtual machine number of an entry corresponding to the first virtual machine includes an identifier other than an identifier of the first virtual machine,
wherein a determination is made that the part of the second resources is not allocated to any of the virtual machines other than the first virtual machine when the used virtual machine number of the entry corresponding to the first virtual machine does not include an identifier other than the identifier of the first virtual machine, and
wherein when the part of the second resources is powered off, the second control module reports a power cut to the management terminal, and a power state of the part of the second resources is updated in the server power control table.

9. A storage system that stores data, wherein the storage system is coupled to a computer and a management terminal, the storage system comprising:
a first control module logically allocating first resources included in the storage system to a plurality of virtual storage systems,
wherein the storage system is coupled to the computer through an input/output (I/O) channel,
wherein the management terminal is coupled to the computer and the storage system,
wherein the computer comprises a second control module logically allocating second resources included in the computer to a plurality of virtual machines,
wherein the management terminal stores first information indicating a relationship between the plurality of virtual storage systems and the plurality of virtual machines,
wherein when the computer receives a first instruction from the management terminal, the first instruction instructing the computer to power off a first virtual machine of the plurality of virtual machines, the second control module determines
whether a part of the second resources, which is allocated to the first virtual machine, is also allocated to any of the plurality of virtual machines other than the first virtual machine, and the second control module powers off the part of the second resources when the part of the second resources is not allocated to any of the plurality of virtual machines other than the first virtual machine,
wherein after powering off the part of the second resources allocated to the first virtual machine, the management terminal specifies a first virtual storage system which is allocated to the first virtual machine by referring the first information, and sends a second instruction instructing to power off the specified first virtual storage system to the storage system, wherein when the storage system receives the second instruction, the first control module determines whether a part of the first resources, which is allocated to the first virtual storage system, is allocated to any of the plurality of virtual storage systems other than the first virtual storage system, and powers off the part of the first resources when the part of the first resources is not allocated to any of the plurality of virtual storage systems other than the first virtual storage system, wherein the first control module determines whether the part of the first resources is allocated to any of the plurality of virtual storage system other than the first virtual storage system by referring to a storage power control table to determine whether a used virtual storage system number of an entry corresponding to the first virtual storage system includes an identifier other than identifier of the first virtual storage system, wherein a determination is made that the part of the first resources is not allocated to any of the virtual storage systems other than the first virtual storage system when used virtual storage system number of the entry corresponding to the first virtual storage system does not include an identifier other than the identifier of the first storage system, and wherein when the part of the first resources is powered off, the first control module reports a power cut to the management terminal, and a power state of the part of the first resources is updated in the storage power control table.

10. The storage system according to claim 9, wherein the first control module maintains powering on the part of the first resources when the part of the first resources is allocated to the plurality of virtual storage systems other than the first virtual storage system.

11. The storage system according to claim 9,
wherein the storage system further stores third information indicating a reduction level of power consumption, and
wherein the first control module determines presence of redundant first resource when the level indicated by the third information is higher than a predetermined value, and powers off the redundant first resource when the redundant first resource is present.

12. The storage system according to claim 9 further comprising:
a cache memory that temporarily stores at least one of data written by the computer and data read by the computer,
wherein the first resources include the cache memory, and
wherein the first control module calculates a capacity of the cache memory not allocated to any of the plurality of virtual machines based on the first information, and powers off the cache memory equivalent to the calculated capacity.

13. The storage system according to claim 9,
wherein the first virtual storage system includes a first virtual disk in which data is to be written, and is coupled to a virtual storage system of the plurality of virtual storage systems other than the first virtual storage system which includes a second virtual disk, and
wherein the first control module converts a received write request into a write request to write data in the second virtual disk upon reception of the write request to write data in the first virtual disk, transmits the changed write request, and transmits an instruction to power off the plurality of virtual storage systems other than the first virtual storage system including the second virtual disk when the first virtual storage system including the first virtual disk is a virtual storage system which is to be powered off.

14. The storage system according to claim 9, wherein the first control module determines whether the part of the first resources include a plurality of individually power-controllable devices, calculates the amount of the first resources necessary for the first virtual storage system based on an average utilization rate of the part of the first resources when the part of the first resources include the plurality of individually power-controllable devices, and powers off the devices included in the first resources to satisfy the calculated amount of the resources.

* * * * *